United States Patent [19]

Fujimoto et al.

[11] Patent Number: 5,033,089

[45] Date of Patent: Jul. 16, 1991

[54] METHODS FOR FORMING REFERENCE VOICE PATTERNS, AND METHODS FOR COMPARING VOICE PATTERNS

[75] Inventors: Junichiroh Fujimoto, Yokohama; Seigou Yasuda, Yokosuka, both of Japan

[73] Assignee: Ricoh Company, Ltd., Japan

[21] Appl. No.: 464,638

[22] Filed: Jan. 5, 1990

Related U.S. Application Data

[63] Continuation of Ser. No. 355,074, May 19, 1989, abandoned, which is a continuation of Ser. No. 105,524, Oct. 2, 1987, abandoned.

[30] Foreign Application Priority Data

| Oct. 3, 1986 | [JP] | Japan | 61-236901 |
| Oct. 3, 1986 | [JP] | Japan | 61-236902 |
| Nov. 19, 1986 | [JP] | Japan | 61-275655 |
| Nov. 19, 1986 | [JP] | Japan | 61-275656 |
| Nov. 21, 1986 | [JP] | Japan | 61-278053 |
| Nov. 21, 1986 | [JP] | Japan | 61-278054 |
| Dec. 5, 1986 | [JP] | Japan | 61-290067 |
| Dec. 5, 1986 | [JP] | Japan | 61-290068 |
| Sep. 21, 1987 | [JP] | Japan | 62-238336 |
| Sep. 21, 1987 | [JP] | Japan | 62-238337 |
| Sep. 22, 1987 | [JP] | Japan | 62-238510 |

[51] Int. Cl.[5] .............................. G10L 5/06
[52] U.S. Cl. .................................. 381/43
[58] Field of Search .................. 381/41–46; 364/513.5

[56] References Cited

U.S. PATENT DOCUMENTS

| Re. 32,172 | 6/1986 | Johnston et al. | 381/46 |
| 4,696,041 | 9/1987 | Sakata | 381/46 |
| 4,720,802 | 1/1988 | Damoulakis et al. | 381/43 |
| 4,731,845 | 3/1988 | Matsuki et al. | 381/43 |
| 4,751,737 | 6/1988 | Gerson et al. | 381/43 |
| 4,802,224 | 1/1989 | Shiraki | 381/41 |
| 4,827,519 | 5/1989 | Fujimoto et al. | 381/43 |

FOREIGN PATENT DOCUMENTS 2137791 10/1984 United Kingdom .

Primary Examiner—Gary V. Harkcom
Assistant Examiner—John A. Merecki
Attorney, Agent, or Firm—Mason, Fenwick & Lawrence

[57] ABSTRACT

A method for forming a reference voice pattern to be stored in a library for use in identifying an unknown input sound. The method comprises the steps of inputting a first sound pronounced for a particular letter combination by a speaker to form a first voice pattern, the first voice pattern represented by a sound energy level as a function of time; examining the first voice pattern to determine whether or not an intermediate voiceless interval is present within a predetermined time period at least from either a beginning or terminating end of the first voice pattern; repeating the inputting and examining steps for a second sound; combining the first and second voice patterns to define the reference voice pattern, wherein, if either of the first and second voice patterns has a voiced portion in the predetermined time period and the other of the first and second voice patterns does not have a corresponding voiced portion in the predetermined time period, the combining step comprises adding the voiced portion to said other of the first and second voice patterns.

11 Claims, 73 Drawing Sheets

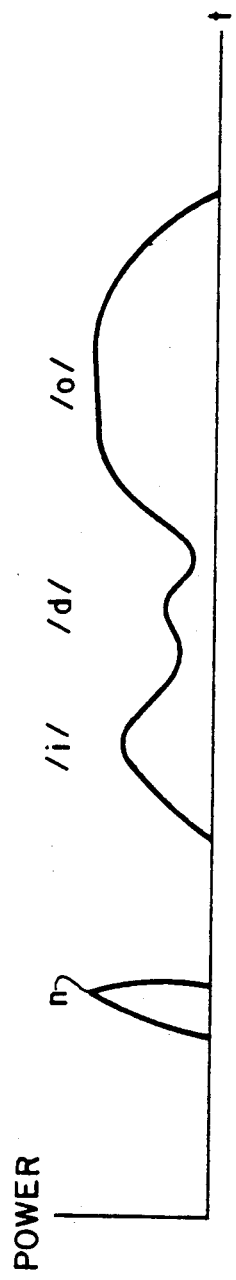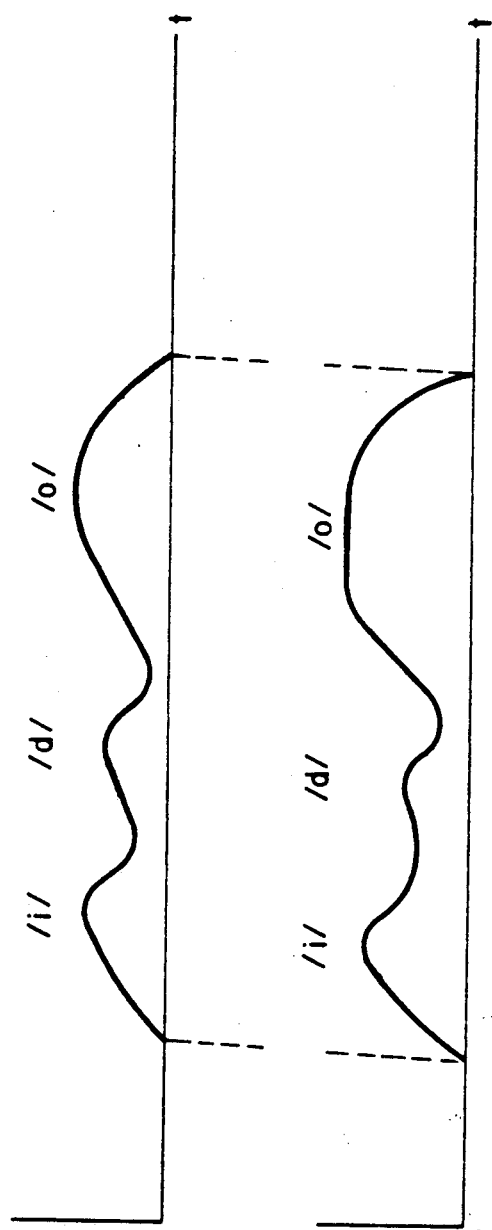
FIG. 4a
FIG. 4b
FIG. 4c

FIG. 7a
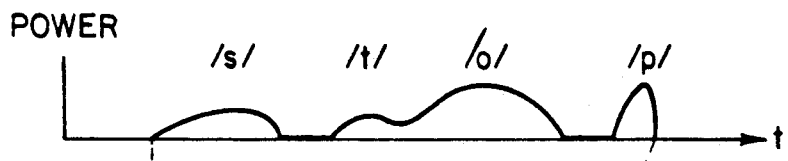
FIG. 7b
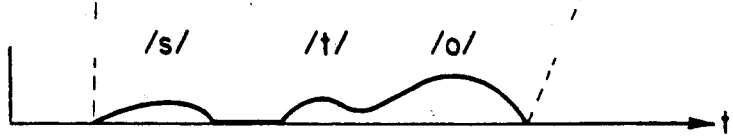
FIG. 8
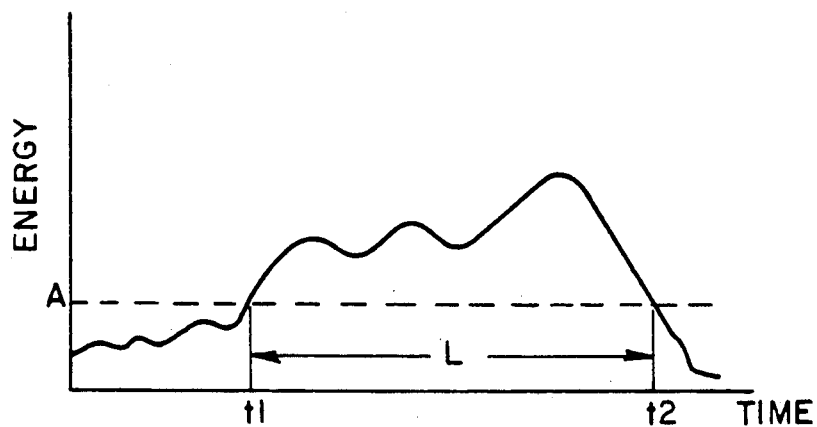
FIG. 9a
| /t/ | /a/ | /m/ | /i/ | /l/ | i |
FIG. 9b
| /a/ | /m/ | /i/ | /l/ | i |

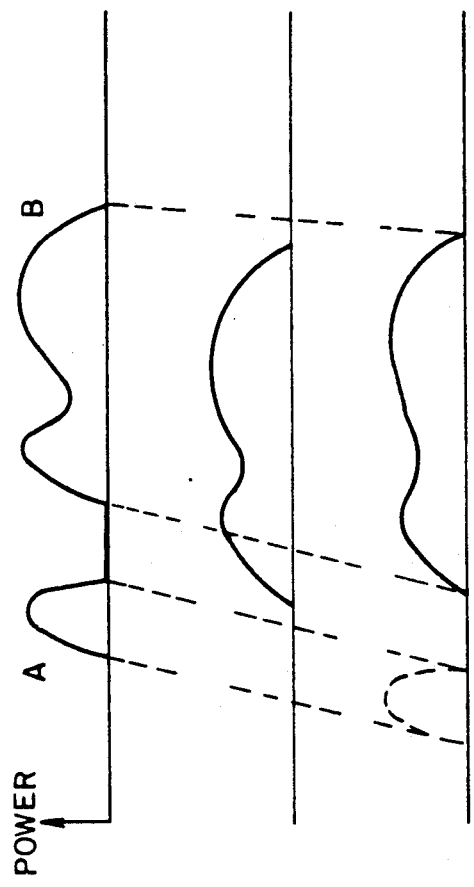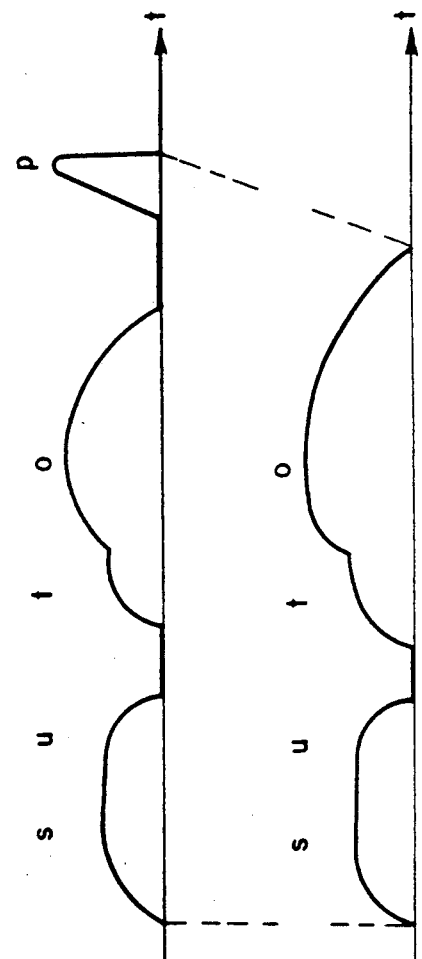

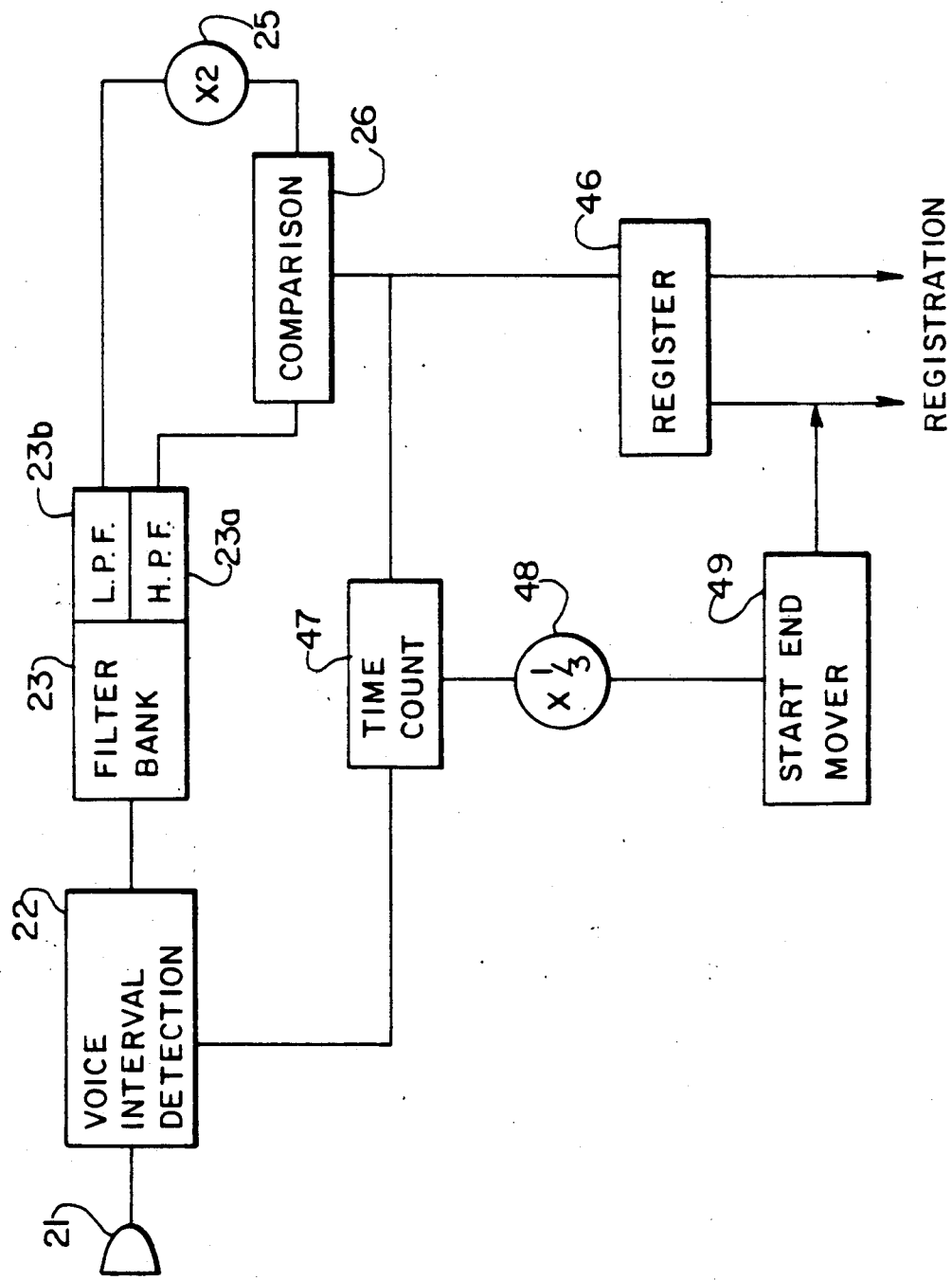

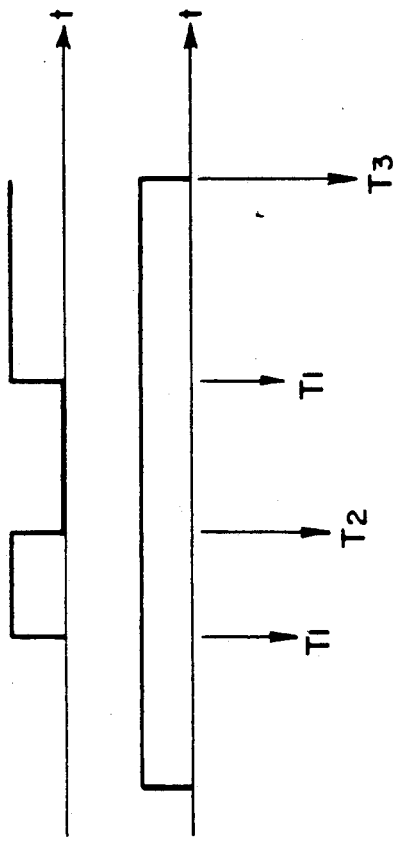
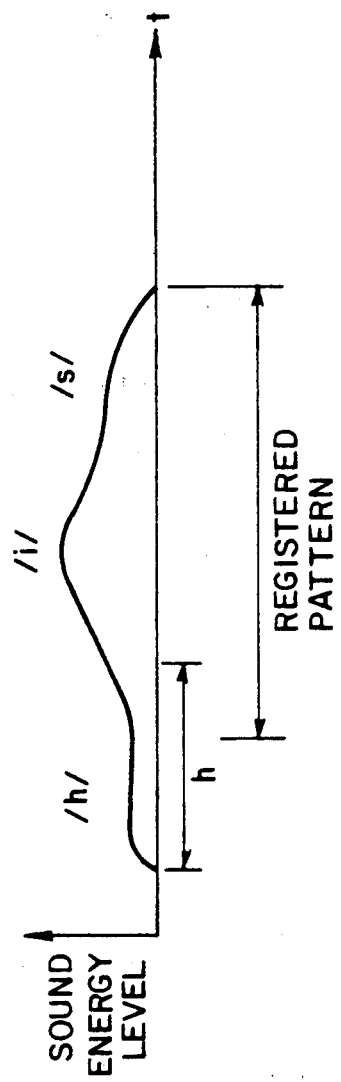
FIG. 15a
FIG. 15b
FIG. 16

| FIG.24a | FIG.24b |

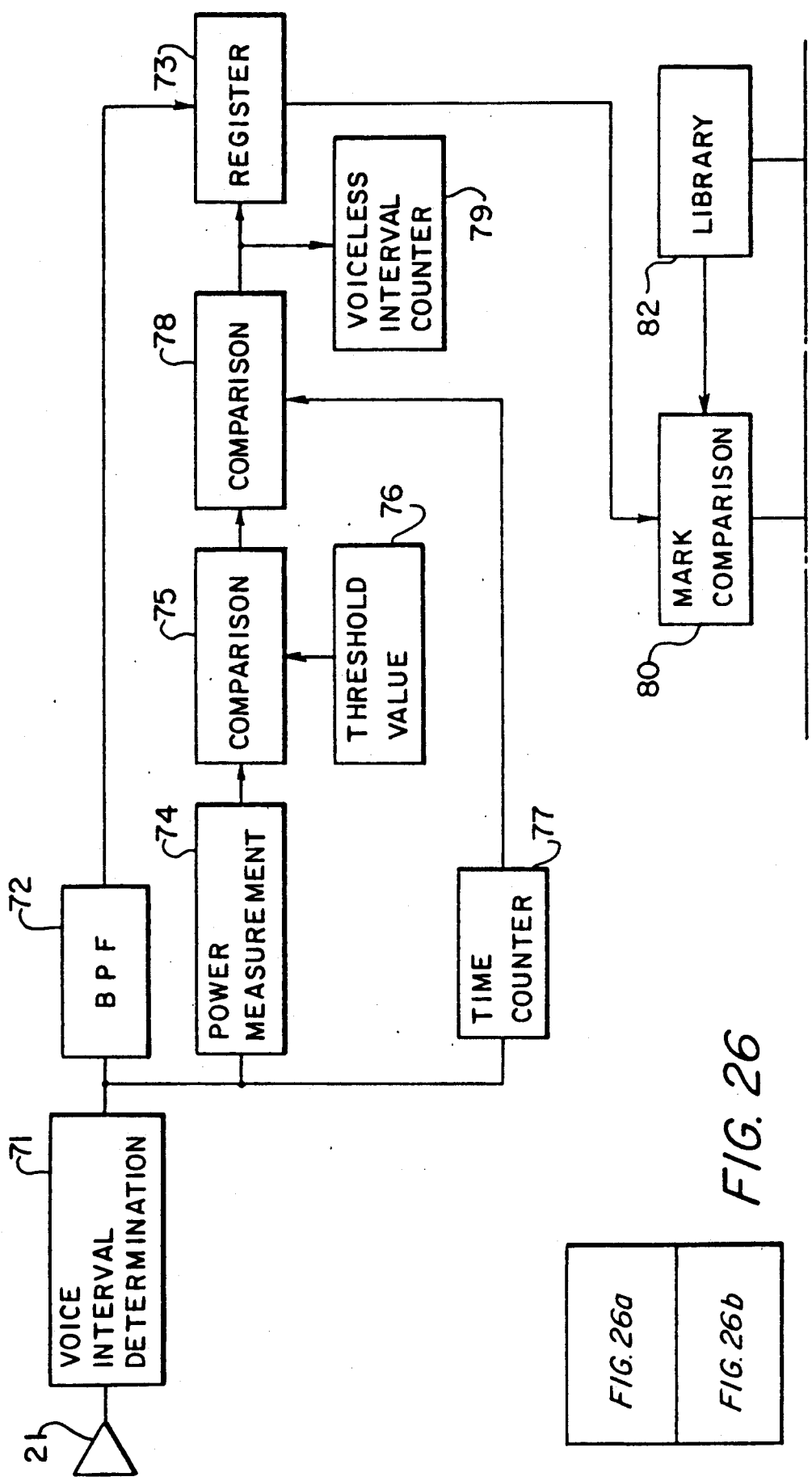

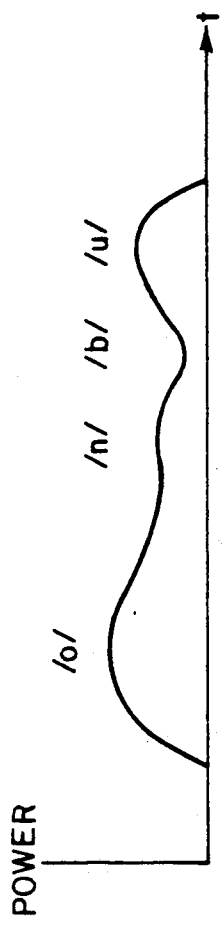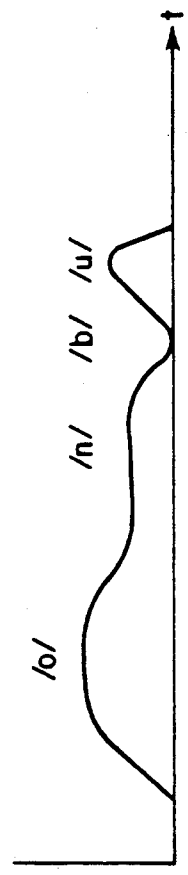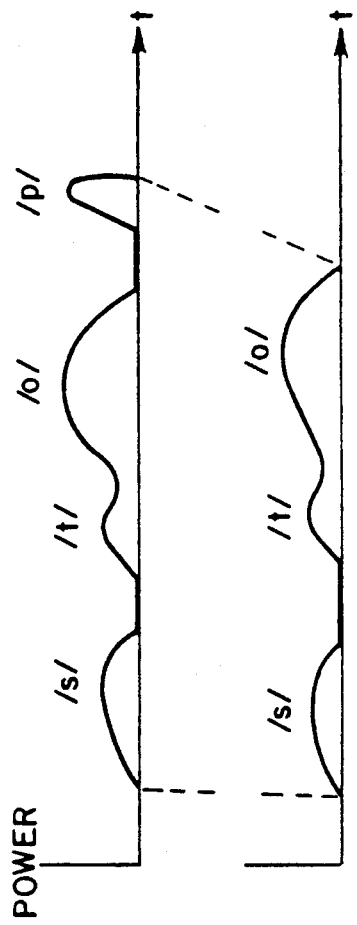
FIG. 27a
FIG. 27b
FIG. 28a
FIG. 28b

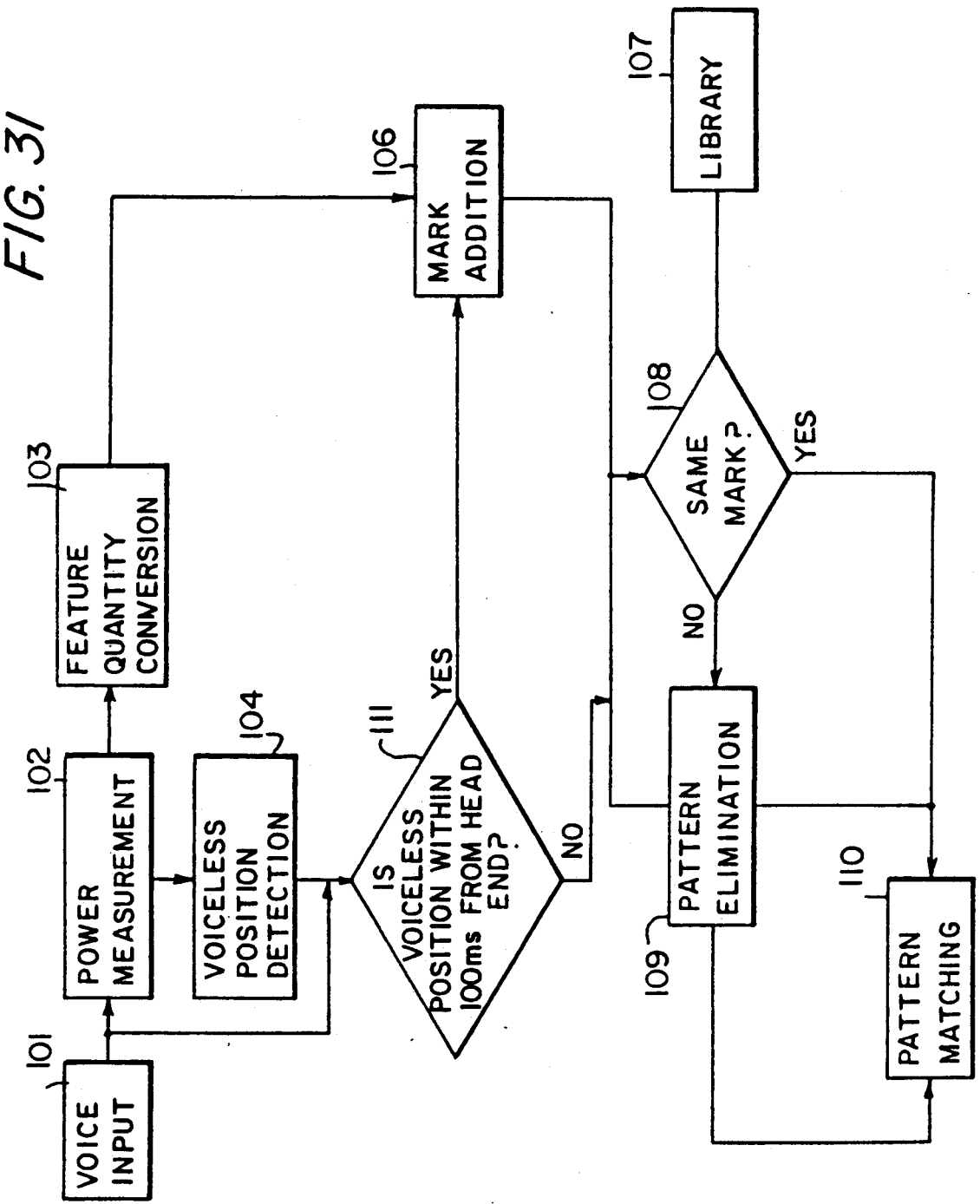

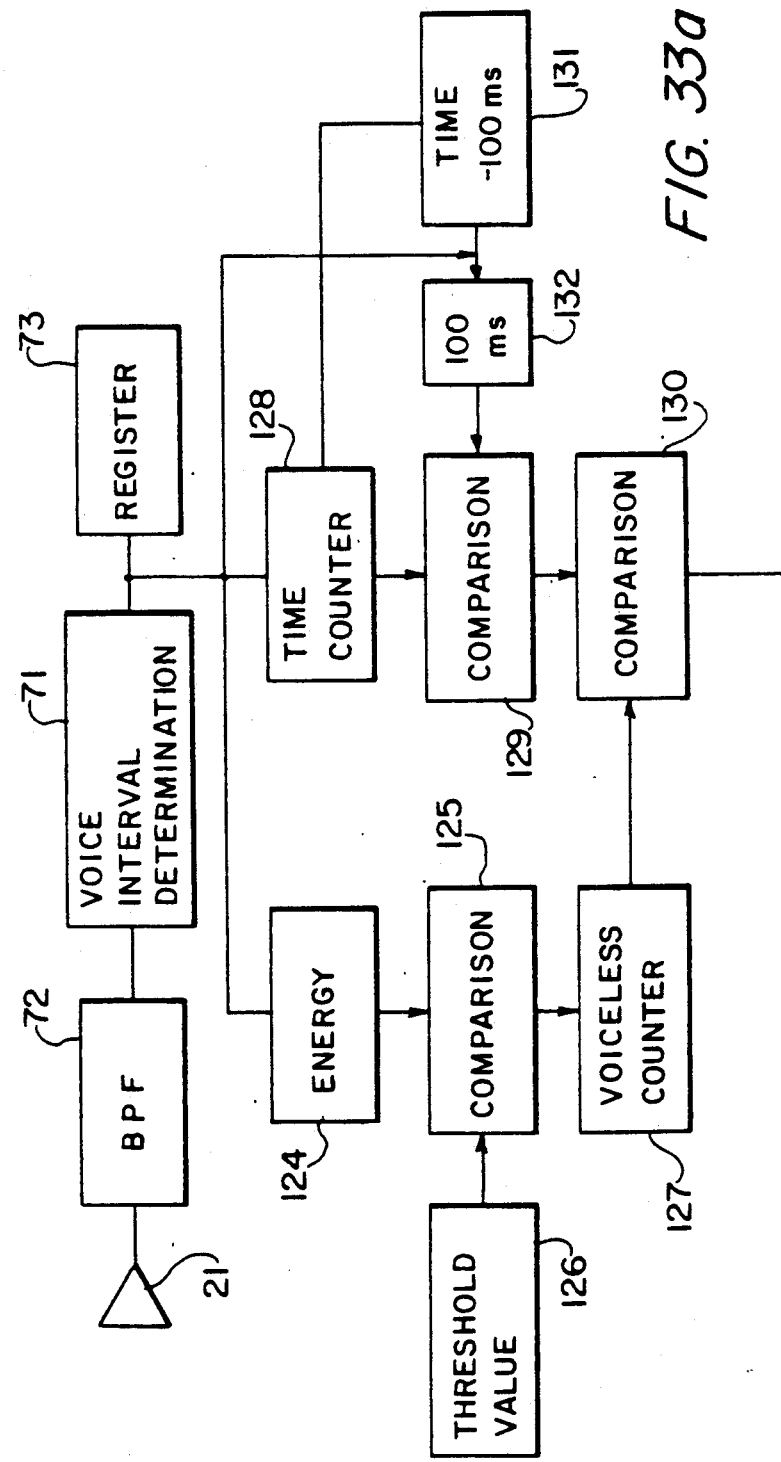

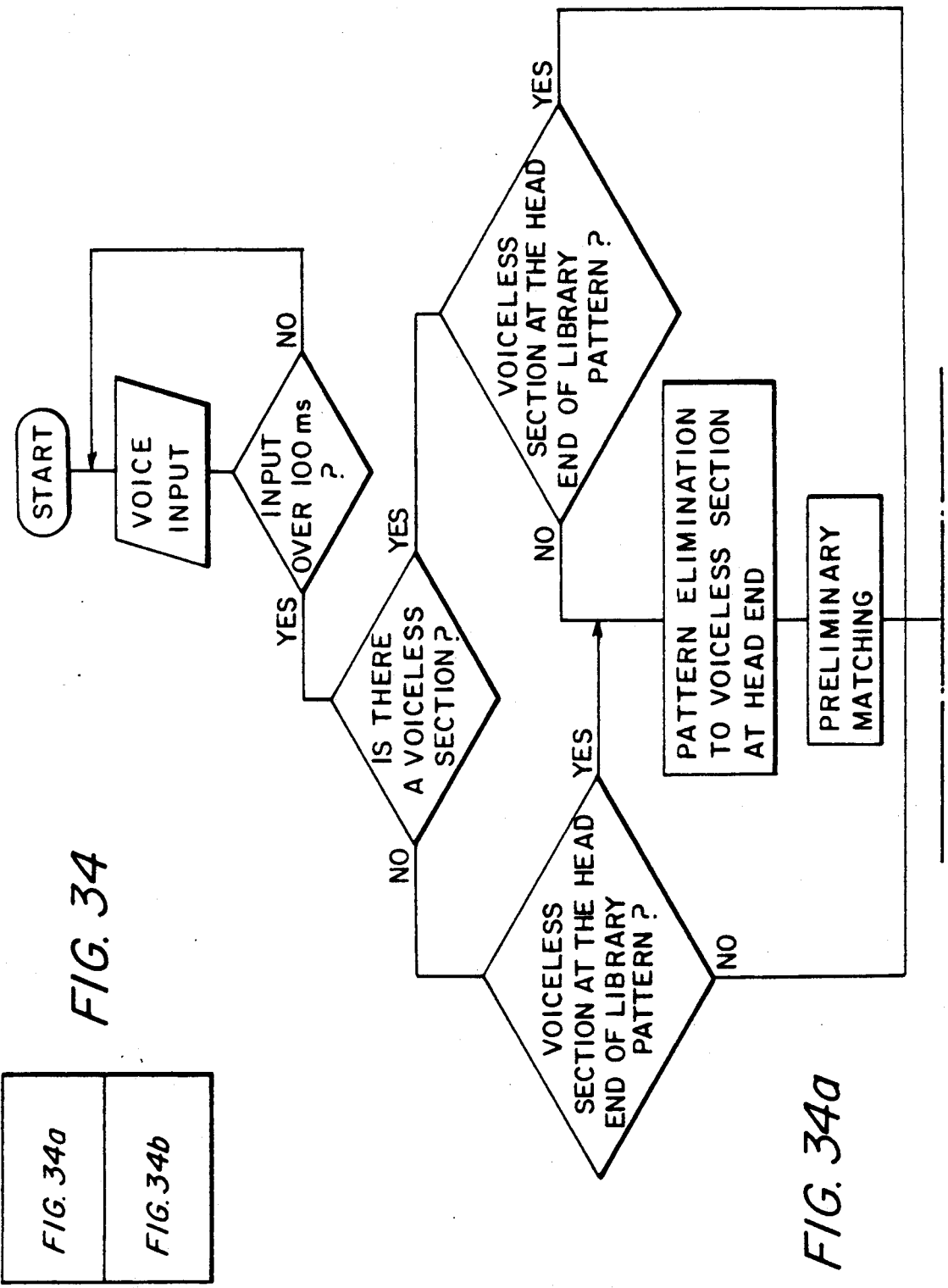

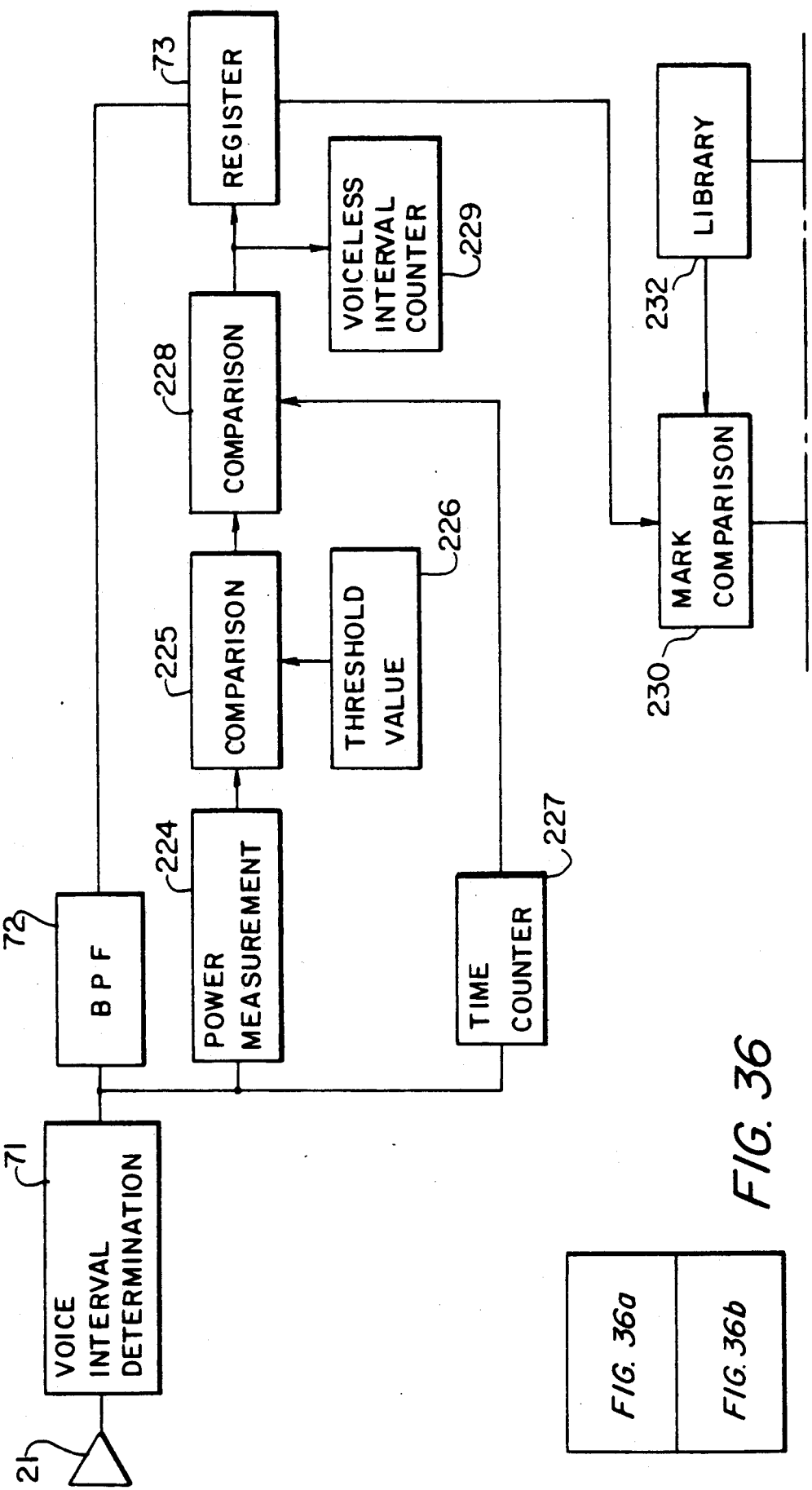

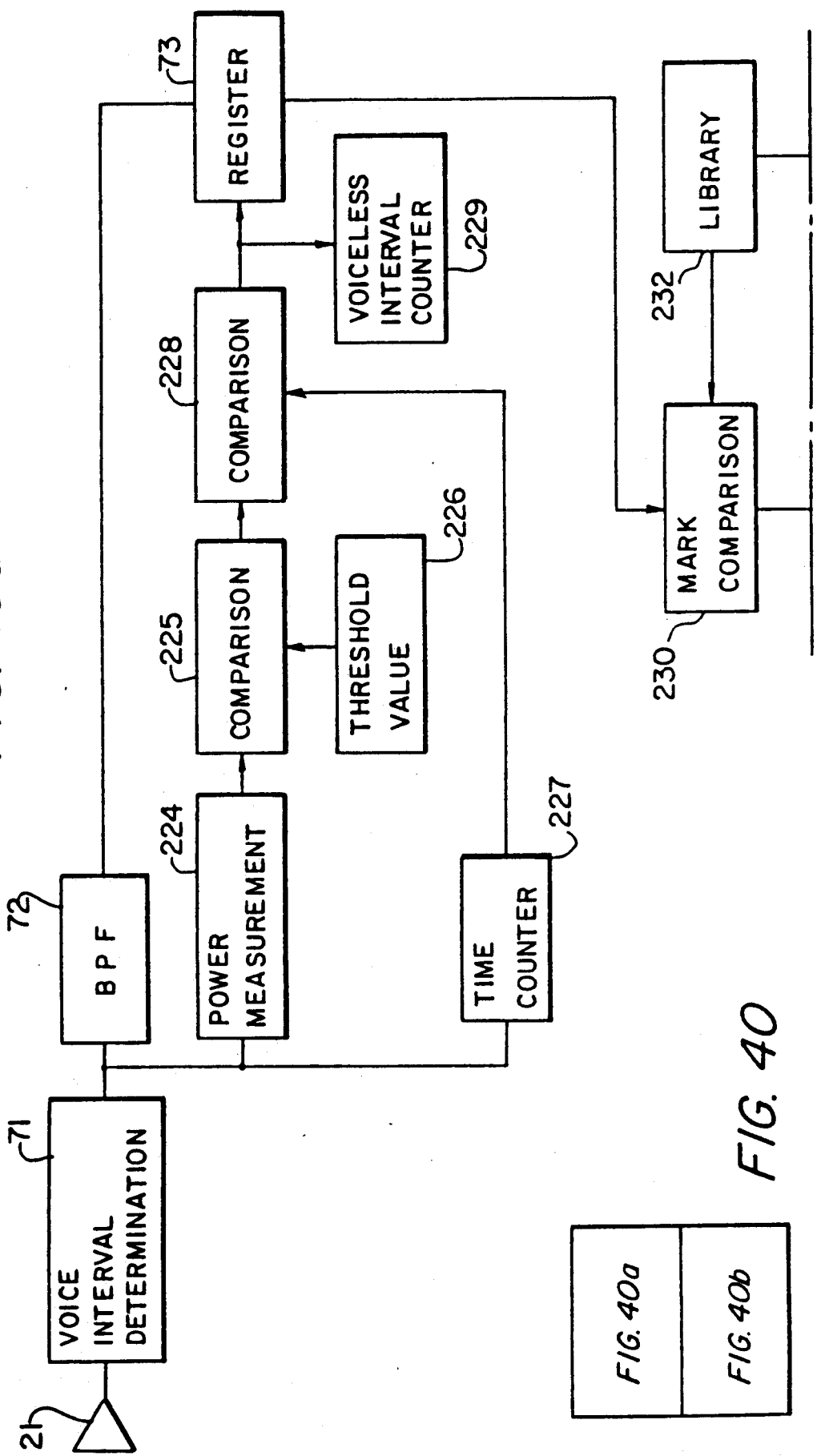

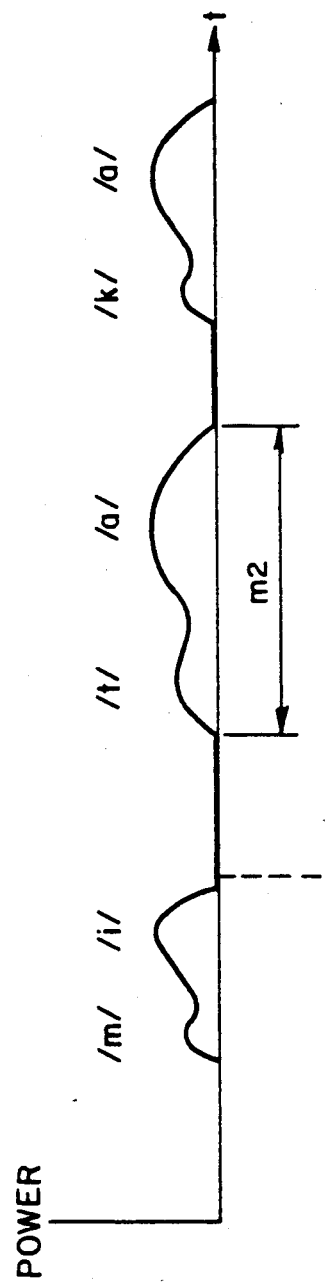
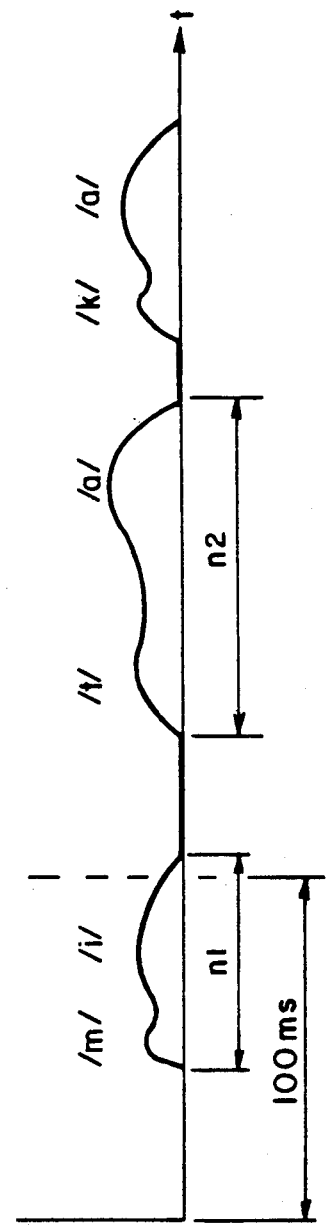
FIG. 4/a
FIG. 4/b

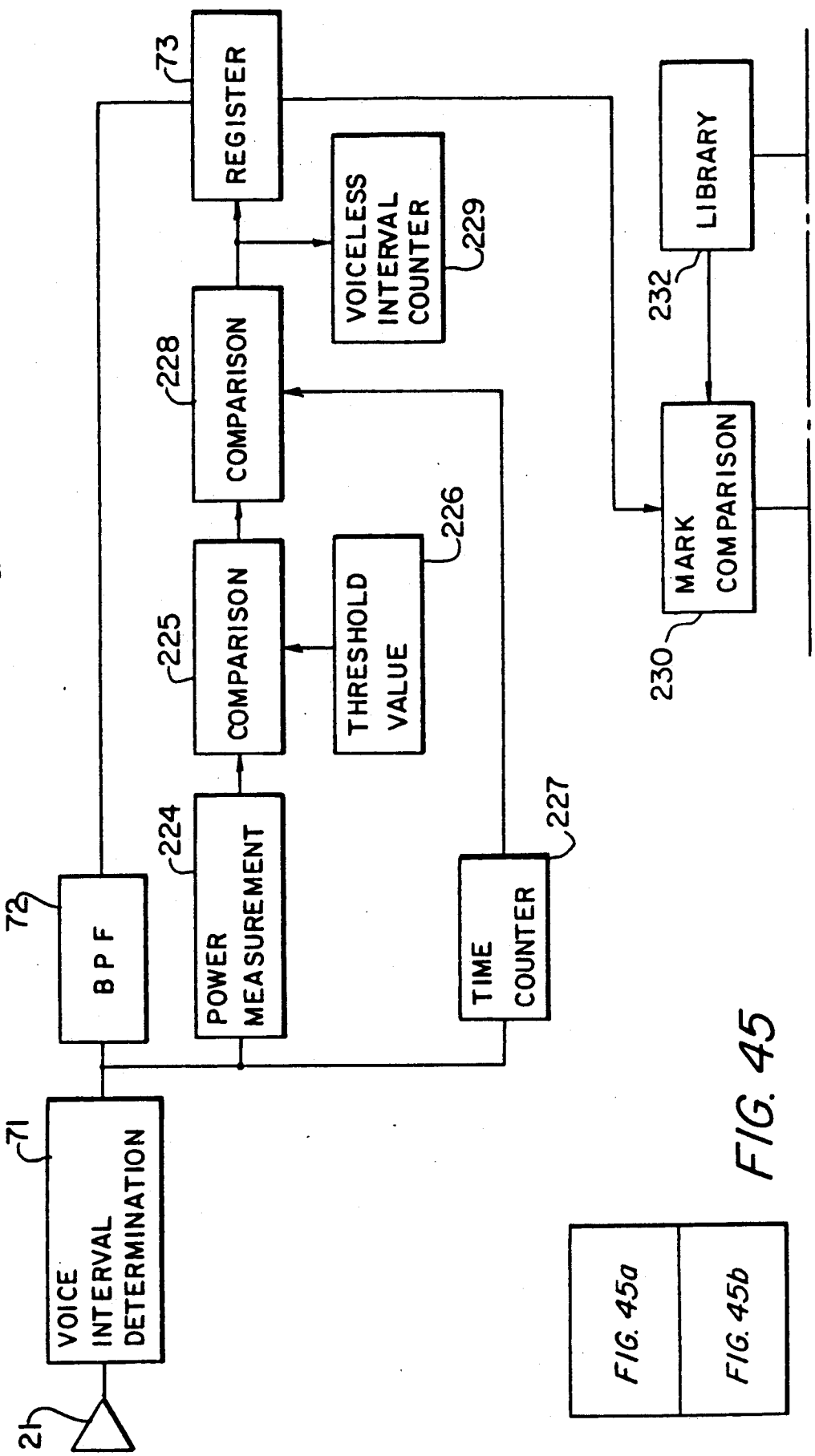

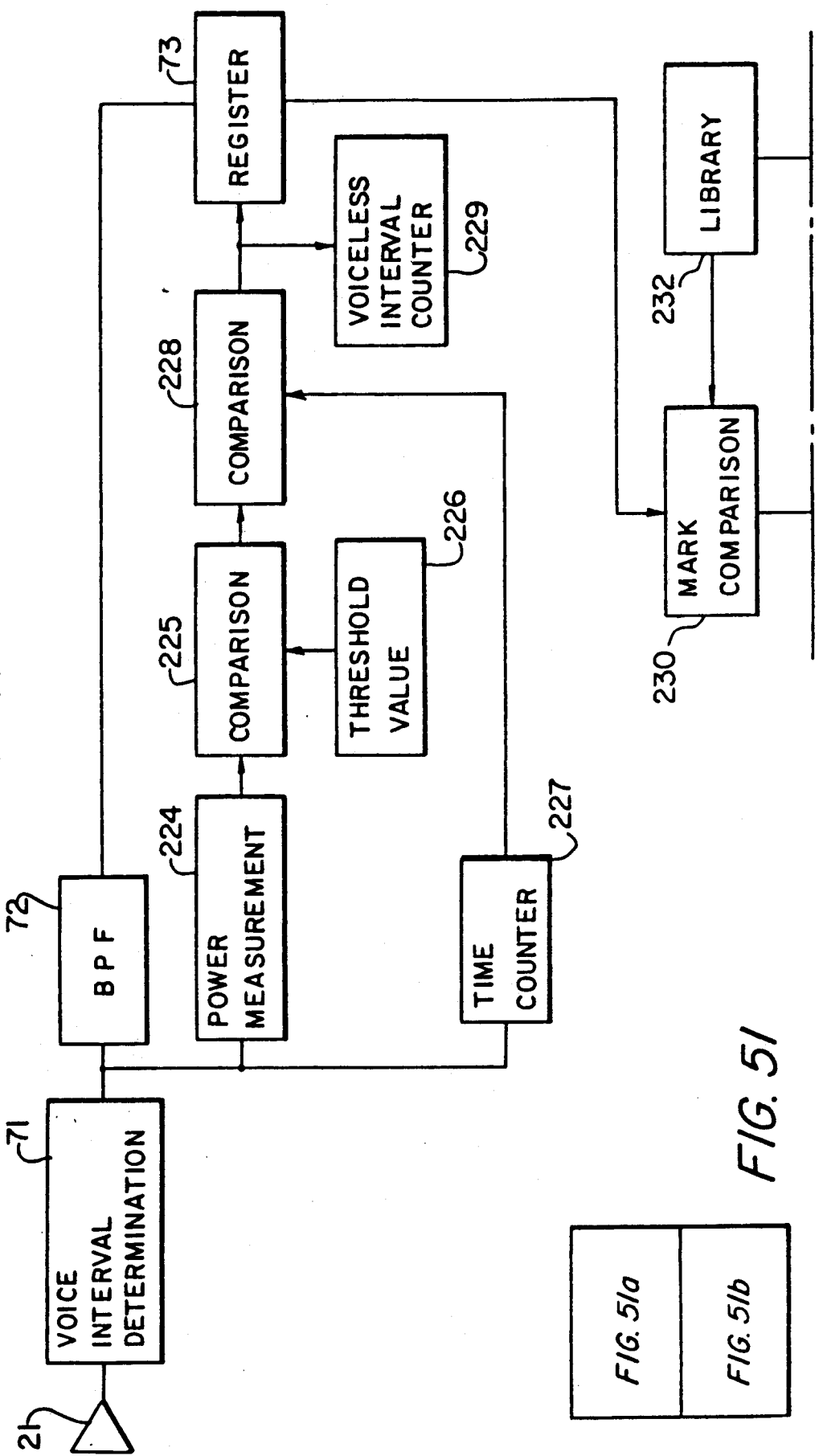
FIG. 5la
FIG. 5l
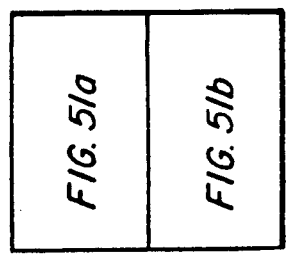

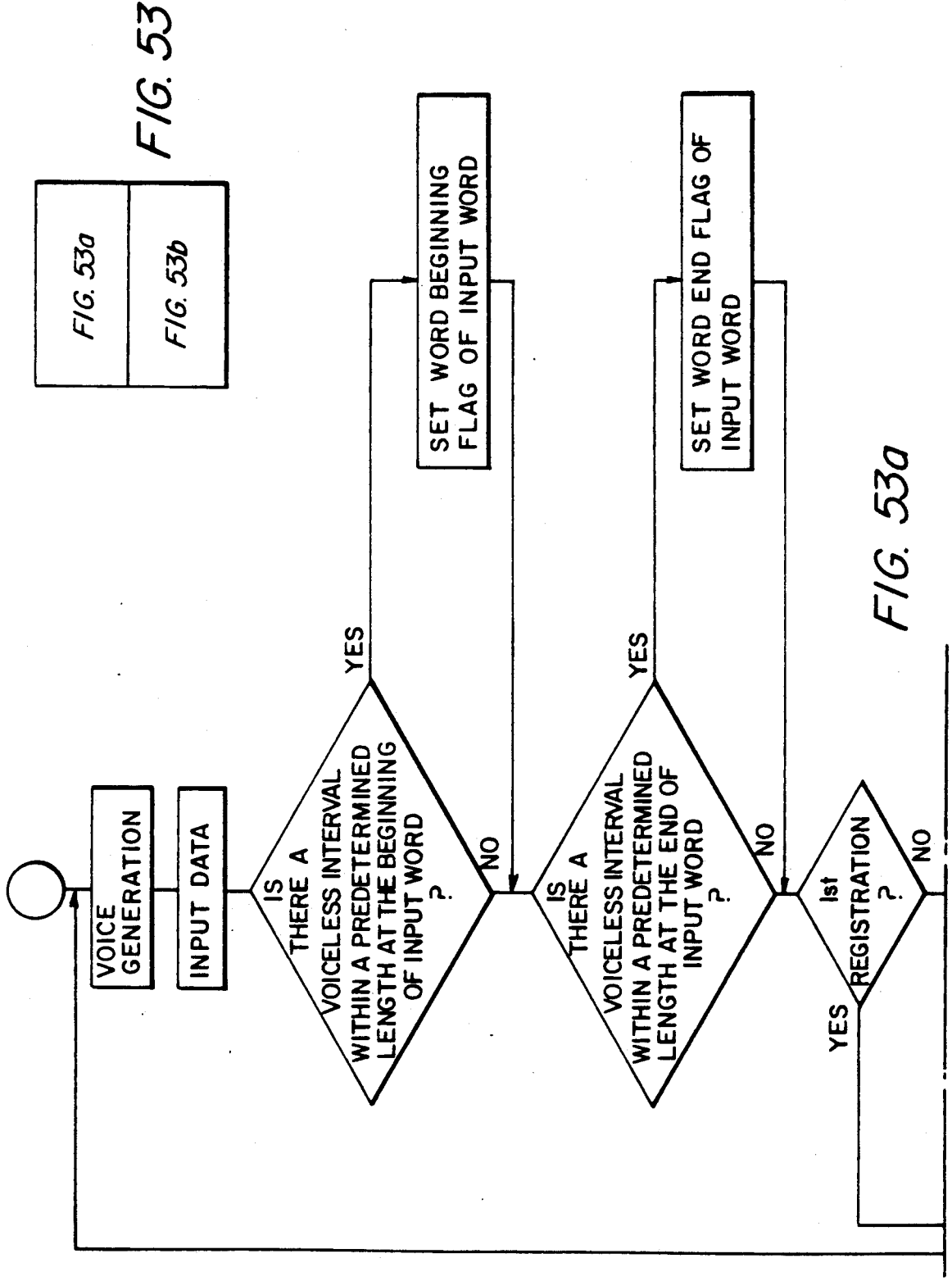

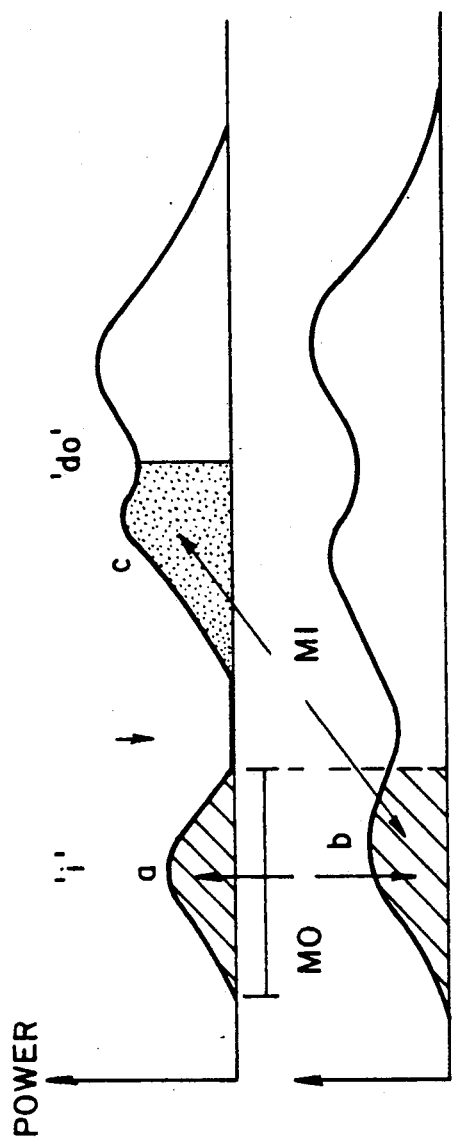
FIG. 54a
FIG. 54b
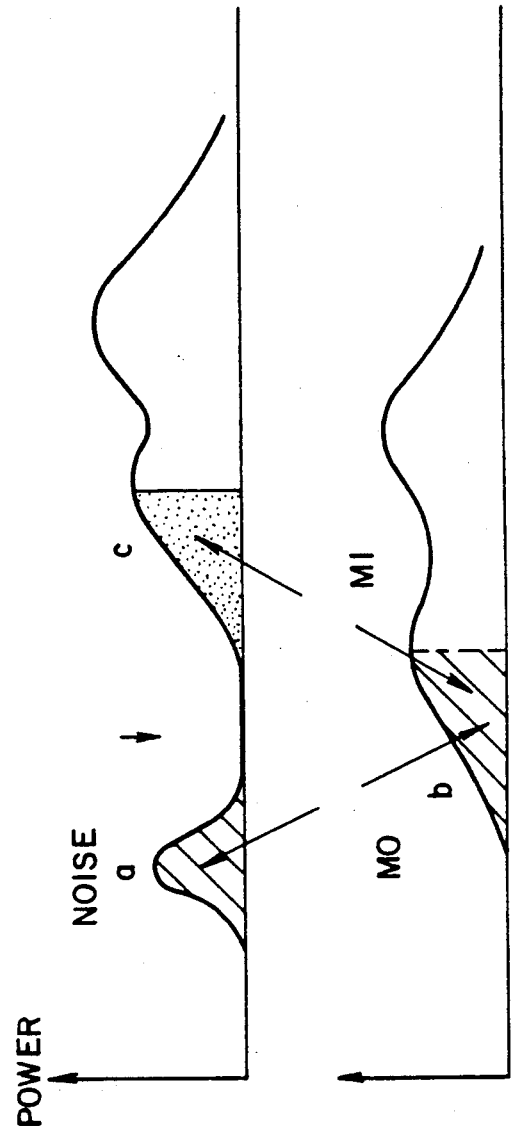
FIG. 55a
FIG. 55b

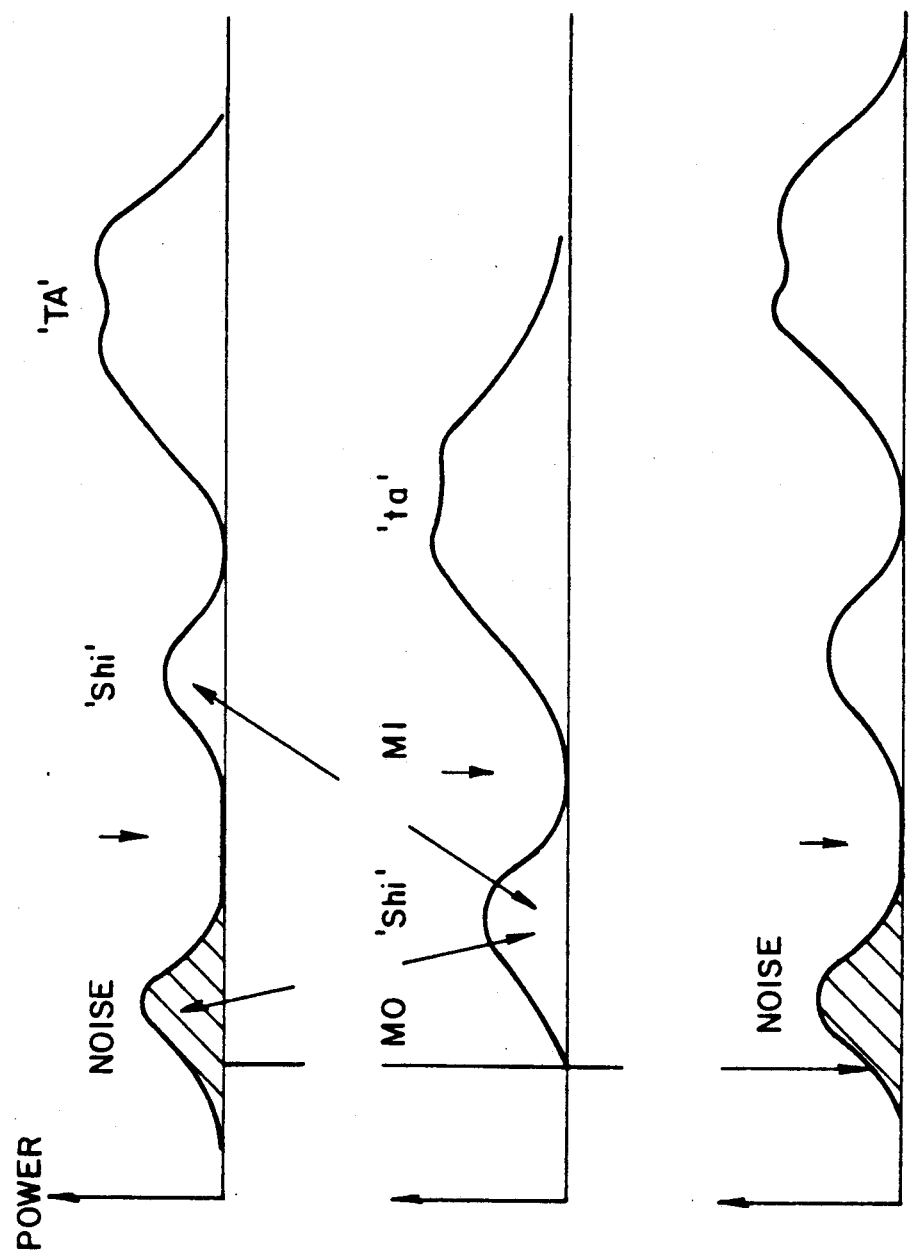

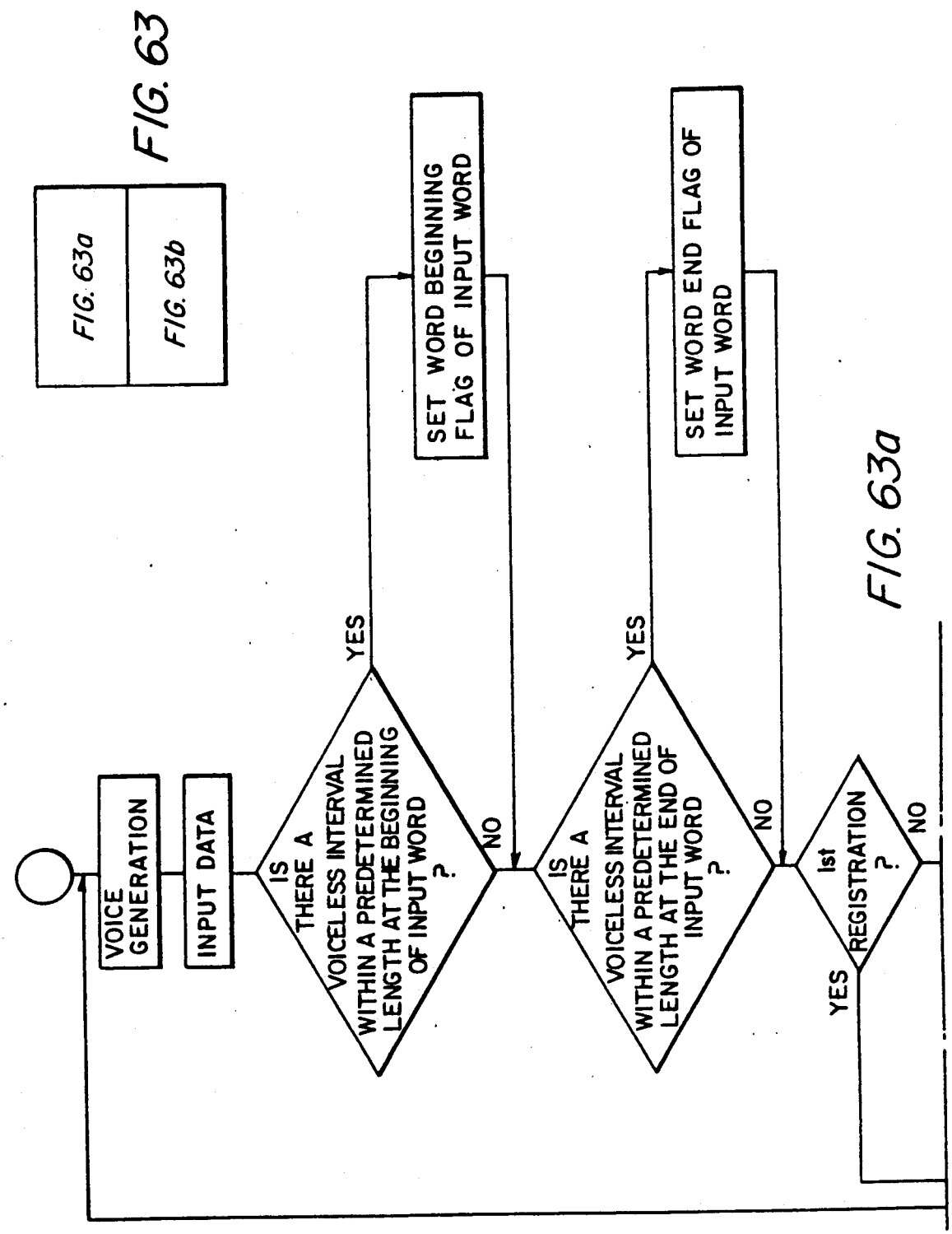

FIG. 64a
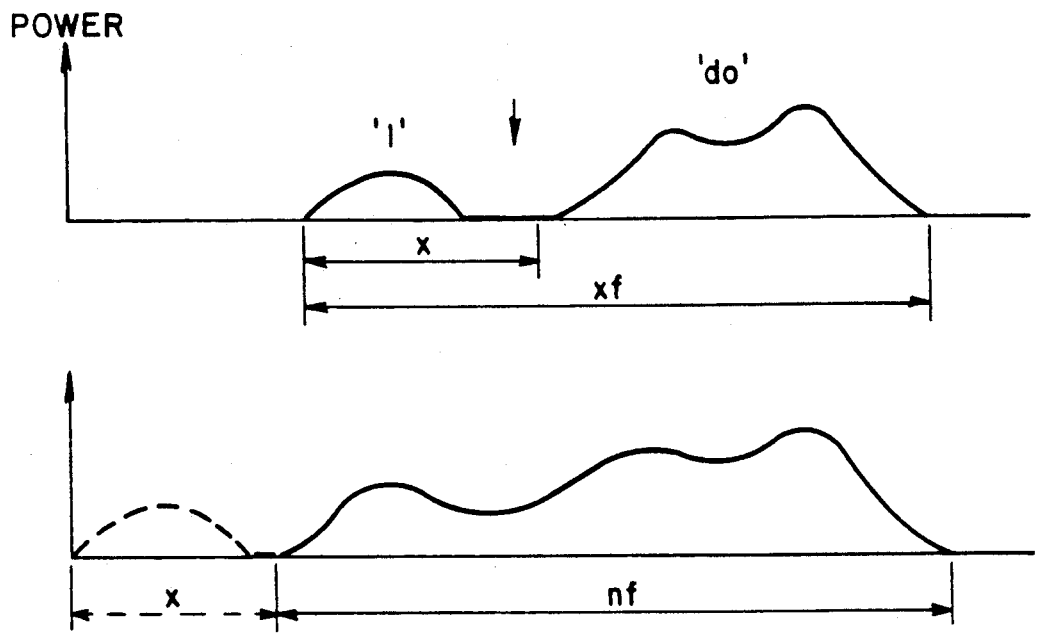
FIG. 64b
FIG. 65a
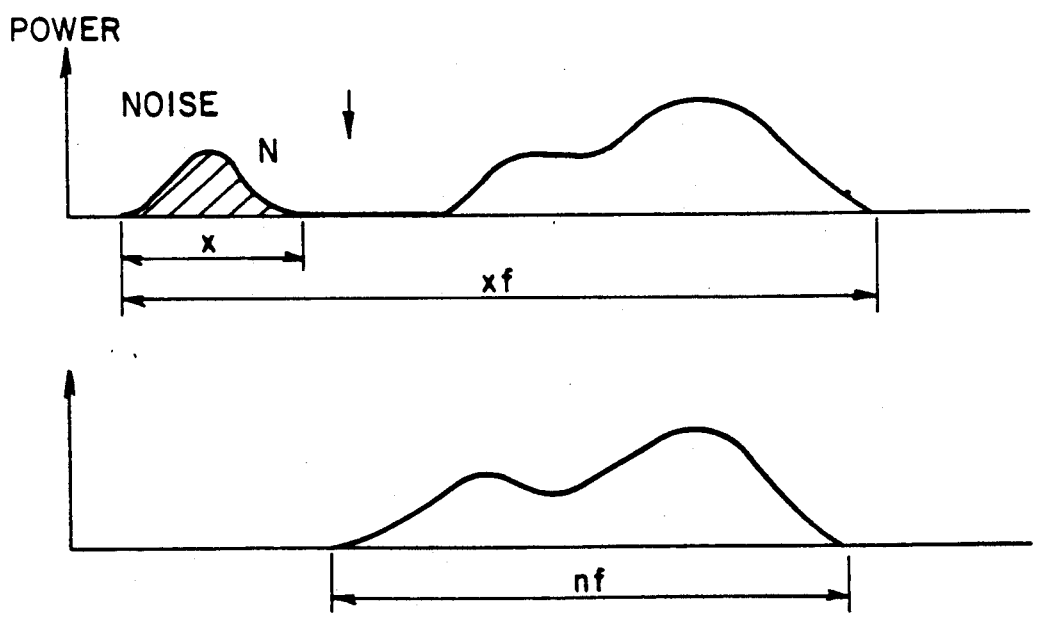
FIG. 65b

METHODS FOR FORMING REFERENCE VOICE PATTERNS, AND METHODS FOR COMPARING VOICE PATTERNS

This application is a continuation of application Ser. No. 07/355,074, filed May 19, 1989, now abandoned in favor of the present patent application which is a continuation of application Ser. No. 105,524, filed Oct. 2, 1987, now abandoned.

BACKGROUND OF THE INVENTION

1. Field of the Invention

This invention generally relates to a method and system for comparing an unknown pattern with a plurality of known patterns to determine the identity of the unknown pattern, and, in particular, to a pattern recognition method and system. More specifically, the present invention relates to a method and system for recognizing a pattern, such as a voice pattern, which is particularly useful for application to voice and character recognition

2. Description of the Prior Art

One of the most common pattern comparing method is the one utilizing pattern matching In accordance with the pattern matching method, the degree of similarity between an input, unknown pattern and each of a plurality of registered, known reference patterns is determined, and, then, the input pattern is identified by one of the reference patterns having the highest degree of similarity. When this method is actually used, there is a problem of the surrounding noise being mixed with an input pattern. For example, in the case of applications to voice recognition, when a sporadic noise has been produced in the background during a recognition process, or when the opening and closing sound of the mouth has been introduced in a voice during pronunciation, an input voice is compared with reference patterns with the presence of noise, so that a proper similarity cannot be determined. As described above, if it is very sensitive to noise, there occurs a problem of addition of noise into an input voice; on the other hand, if the sensitivity to noise is lowered, it is true that the chance of picking up noise is reduced, but there arises another problem of failure to sample part of a voice. For example, in the case of a word "stop" wherein the word end is a consonant which is pronounced by itself, it is often the case that the last sound /p/ fails to be detected.

FIGS. 7a and 7b illustrate the case where the word voice for "stop" is to be recognized by pattern matching. FIG. 7a illustrates a reference pattern and FIG. 7b illustrates an input pattern to be identified. The reference pattern of FIG. 7a has an accurate pattern representing the word "stop" in its entirety; however, the input pattern of FIG. 7b lacks the last sound /p/. As a result, when these two patterns are compared by pattern matching, the pattern end /p/ of the reference pattern of FIG. 7a is made to correspond to the pattern end /o/ of the input pattern of FIG. 7b. For this reason, the degree of similarity between these two patterns becomes lower, thereby leading to an erroneous result of recognition. Such an erroneous correspondence may be prevented from occurring by using the dynamic matching scheme with a free end point; however, there are also cases in which a portion of a pattern at its head end or tail end is lost or a noise is added, which would necessarily increase the amount of calculations, though this method inherently requires a large amount of calculations.

As described above, in accordance with the pattern matching method, the degree of similarity is determined by comparing an input, unknown pattern with each of a plurality of reference patterns which have been formed in some way before-hand, and then the identity of the input pattern is determined by one of the reference patterns which has the highest degree of similarity. Thus, it is extremely important in the pattern matching scheme how accurately a pattern can be extracted and this importance is not limited only to the application to voice recognition. In particular, in order to prevent the surrounding noise from being introduced when a voice is extracted or when a voice interval is to be determined, a threshold level must be properly determined so as not to pick up a small noisy sound.

One typical method of detecting a voice interval is illustrated in FIG. 8, in which the energy level of a voice is used to separate the voice from the background noise. In accordance with this method, a voice energy threshold level A for cutting noises has been determined prior to inputting of a voice, and a voice interval L is determined as a time period from a point in time $t_1$ when the voice energy level has exceeded the threshold level A to a point in time $t_2$ when the voice energy level has decreased below the threshold level A. This is the basic idea in detecting a voice interval, but various improvements have also been made so as to separate a voice of interest from noises. In addition, as a feature quantity, it is not necessary to use a specific one, and use may be made of any desired feature, most typically such as power spectrum, LPC or cepstrum Taking the case of power spectrum as an example, this can be implemented by applying an input voice to a band-pass filter bank, and the method of analysis can be freely varied by selecting the characteristic of the band-pass filter bank. A voice interval detecting unit and a feature quantity converting unit may be disposed in any order in relation to the flow of a voice signal supplied from a voice input unit. In such a case, if a noisy consonant small in energy, such as sound /f/ is present at the beginning or end of a voice, it is very difficult to pick up. FIG. 9a illustrates a reference pattern for /family/ and FIG. 9b illustrates an input pattern for the same word voice. As shown, it is often the case that the /f/ sound at the beginning of a word tends to be lost because of its energy being low. For this reason, a proper matching cannot be carried out, which would result in a lower degree of similarity to thereby lead to an erroneous recognition.

SUMMARY OF THE INVENTION

It is therefore a primary object of the present invention to obviate the disadvantages of the prior art as described above and as will be described below and to provide an improved pattern comparing method and system capable of comparing one pattern with another pattern accurately.

Another object of the present invention is to provide a pattern comparing method and system capable of carrying out a proper pattern comparison using a pattern which has its part lost or to which a noise has been introduced.

A further object of the present invention is to provide an improved pattern comparing method and system which is particularly suitable for use in pattern recognition.

A still further object of the present invention is to provide an improved pattern comparing method and system which is particularly suitable for use in voice or character recognition.

A still further object of the present invention is to provide an improved method for preventing a reference pattern for use in pattern recognition from being deteriorated.

A still further object of the present invention is to provide an improved method for forming a reference pattern of high quality which is particularly suitable for use in pattern recognition.

Other objects, advantages and novel features of the present invention will become apparent from the following detailed description of the invention when considered in conjunction with the accompanying drawings.

BRIEF DESCRIPTION OF THE DRAWINGS

FIGS. 4a through 4c are illustrations which are useful for explaining the operation of the system shown in FIG. 3;

FIGS. 7a, 7b, 8, 9a and 9b are illustrations which are useful for explaining the problems to be solved by the present invention when applied to voice recognition;

FIGS. 11a through 11c are illustrations which are useful for explaining the operation of the system shown in FIG. 10;

FIGS. 12a and 12b are illustrations useful for explaining the advantages of a further embodiment of the present invention;

FIG. 14 is a schematic illustration showing mostly in block form a voice recognition system constructed in accordance with a still further embodiment of the present invention;

FIGS. 15a ( 15b and 16 are illustrations which are useful for explaining the operation of the system shown in FIG. 14;

FIG. 26 is an illustration showing how to combine FIGS. 26a and 26b;

FIGS. 26a and 26b, when combined as shown in FIG. 26, define a schematic illustration showing mostly in block form a voice recognition system constructed to implement the method shown in FIG. 25;

FIGS. 27a and 27b are illustrations of voice patterns which are useful for explaining the advantages of one aspect of the present invention;

FIGS. 28a and 28b are illustrations which are useful for explaining the problems to be solved by one aspect of the present invention;

FIG. 31 is a schematic illustration showing mostly in block form another voice pattern processing system;

FIG. 33 is an illustration showing how to combine FIGS. 33a and 33b;

FIGS. 33a and 33b, when combined as shown in FIG. 33, define a schematic illustration showing mostly in block form a voice recognition system constructed in accordance with a still further embodiment of the present invention;

FIG. 34 is an illustration showing how to combine FIGS. 34a and 34b;

FIGS. 34a and 34b, when combined as shown in FIG. 34, define a flow chart which is useful for explaining the operation of the system shown in FIG. 33;

FIG. 36 is an illustration showing how to combine FIGS. 36a and, 36b;

FIGS. 36a and 36b, when combined as shown in FIG. 36, define a schematic illustration showing mostly in block form a voice recognition system constructed to implement the method shown in FIG. 35;

FIG. 40 is an illustration showing how to combine FIGS. 40a and 40b;

FIGS. 40a and 40b, when combined as shown in FIG. 40, define a schematic illustration showing mostly in block form a voice recognition system constructed to implement the method shown in FIG. 39;

FIGS. 41a, 41b, 42a and 42b are illustrations which are useful for explaining the advantages of a further aspect of the present invention;

FIG. 45 is an illustration showing how to combine FIGS. 45a and 45b;

FIGS. 45a and 45b, when combined as shown in FIG. 45, define a schematic illustration showing mostly in block form a voice recognition system constructed to implement the method shown in FIG. 44;

FIG. 51 is an illustration showing how to combine FIGS. 51a and 51b;

FIGS. 51a and 51b, when combined as shown in FIG. 51, define a schematic illustration showing mostly in block form a voice recognition system constructed to implement the method shown in FIG. 50;

FIGS. 54a, 54b, 55a, 55b, 56a through 56c, 57a, 57b, 58a and 58b, are illustrations which are useful for explaining the advantages of a still further aspect of the present invention implemented in the structures shown in FIGS. 52 and 53;

FIGS. 64a, 64b, 65a, 65b, 66a and 66b are illustrations which are useful for explaining the advantages of a still further aspect of the present invention;

DESCRIPTION OF THE PREFERRED EMBODIMENTS

In accordance with one aspect of the present invention, there is provided a pattern comparing method for comparing a first voice pattern with a second voice pattern which has been registered in advance. In the first step, it is examined whether or not either of the first and second voice patterns has an unstable component in forming a voice. If such an unstable component is present in at least one of the first and second voice patterns, each of the first and second voice patterns is separated into the unstable component and a stable component. And, then, a comparison between the first and second voice patterns is carried out only between the respective stable components. Or, alternatively, if such an unstable component is present in both of the first and second voice patterns, each of the first and second voice patterns is separated into the unstable component and a stable component. And, then, a comparison between the first and second voice patterns is carried out between the respective unstable components and between the respective stable components.

Figure 1:
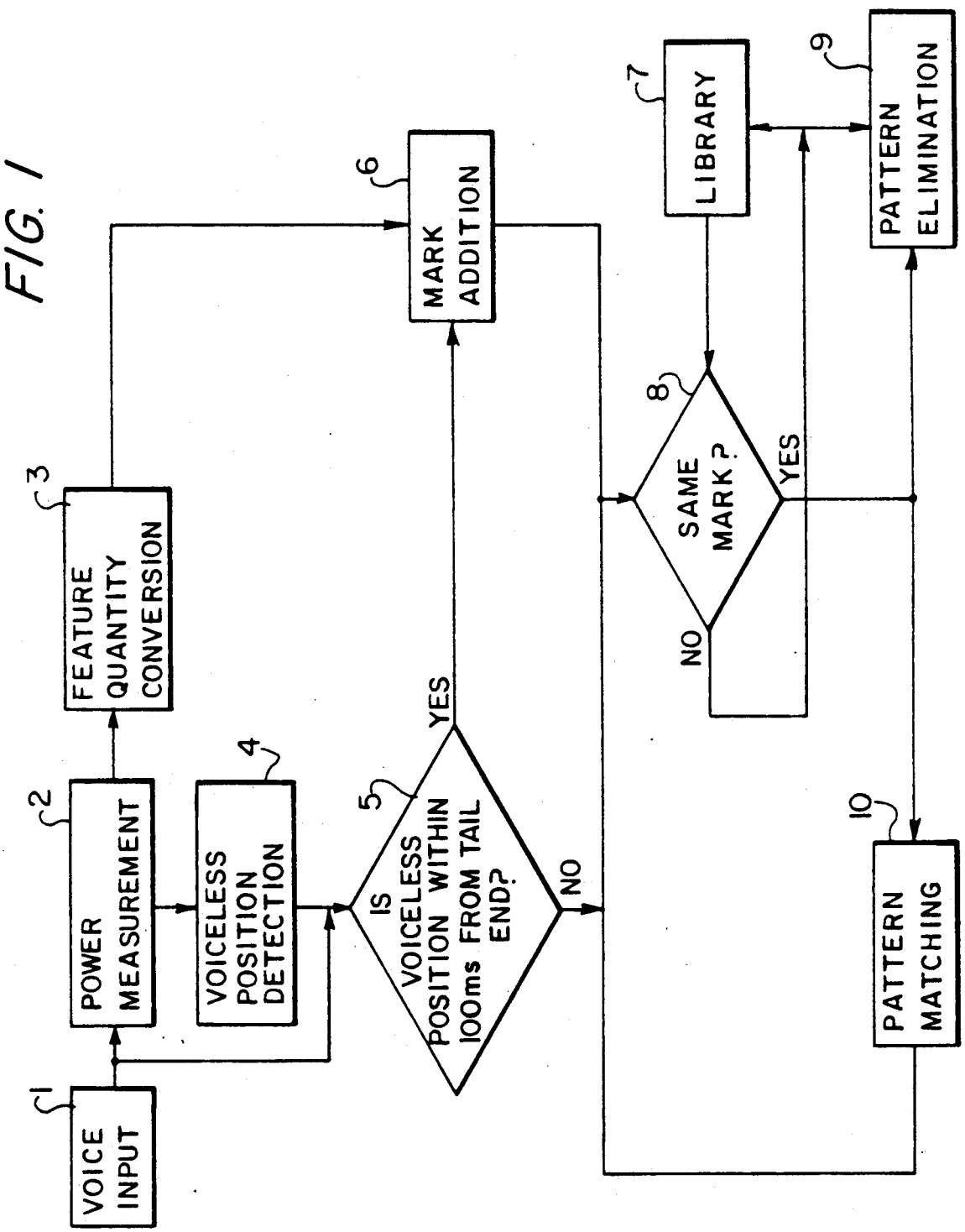
FIG. 1 is a schematic illustration showing mostly in block form a voice recognition system constructed in accordance with one embodiment of the present invention.

Referring now to FIG. 1, there is shown mostly in block form a pattern comparing system constructed in accordance with one embodiment of the present invention when applied to voice processing. As shown, the illustrated voice pattern comparing system includes a voice input unit 1, a power measuring unit 2, a feature quantity converting unit 3, a voiceless position detecting unit 4, a voiceless position (tail end) detecting unit 5, a mark adding unit 6, a library 7, a mark judging unit 8, a pattern eliminating unit 9 and a pattern matching unit 10. In the present embodiment, in comparing two patterns, it is examined whether or not an energy minimum is present within a predetermined range from the beginning or end of a pattern. And, if such an energy minimum is present only in one of the two patterns to be compared, that portion of the pattern having such an energy minimum from the beginning or end to the energy minimum is eliminated, and, then the two patterns are compared.

In the first place, a voice is input into the voice input unit 1, and while the input voice is being converted into a feature quantity, the power of the input voice is measured. The voice input unit 1 may preferably be comprised of a microphone, and the measurement of voice power can be carried out by using band-pass filters covering audio range and detecting outputs of such band-pass filters. Any feature quantity well known in the field of pattern (typically, voice) recognition can be used, and, for example, a power spectrum which can be easily obtained from a band-pass filter bank may be used advantageously. Based on the magnitude of the measured voice power, it is detected where a voiceless interval is located in the voice. And, for example, depending on whether or not this voiceless position is located within 100 msec. from the voice tail end, a predetermined mark is added to a feature quantity-converted pattern (feature pattern or input pattern). On the other hand, a reference pattern is taken out of a library and it is checked whether or not the reference pattern also has the same mark as that of the feature pattern. If the marks are the same, then it proceeds to a pattern matching step in an ordinary manner. It is to be noted that, although a method for forming a library pattern is not explained in detail here, a predetermined mark is assigned to a library pattern in a similar manner during its formation depending on whether or not a voiceless section is present at the tail end.

Figure 2:
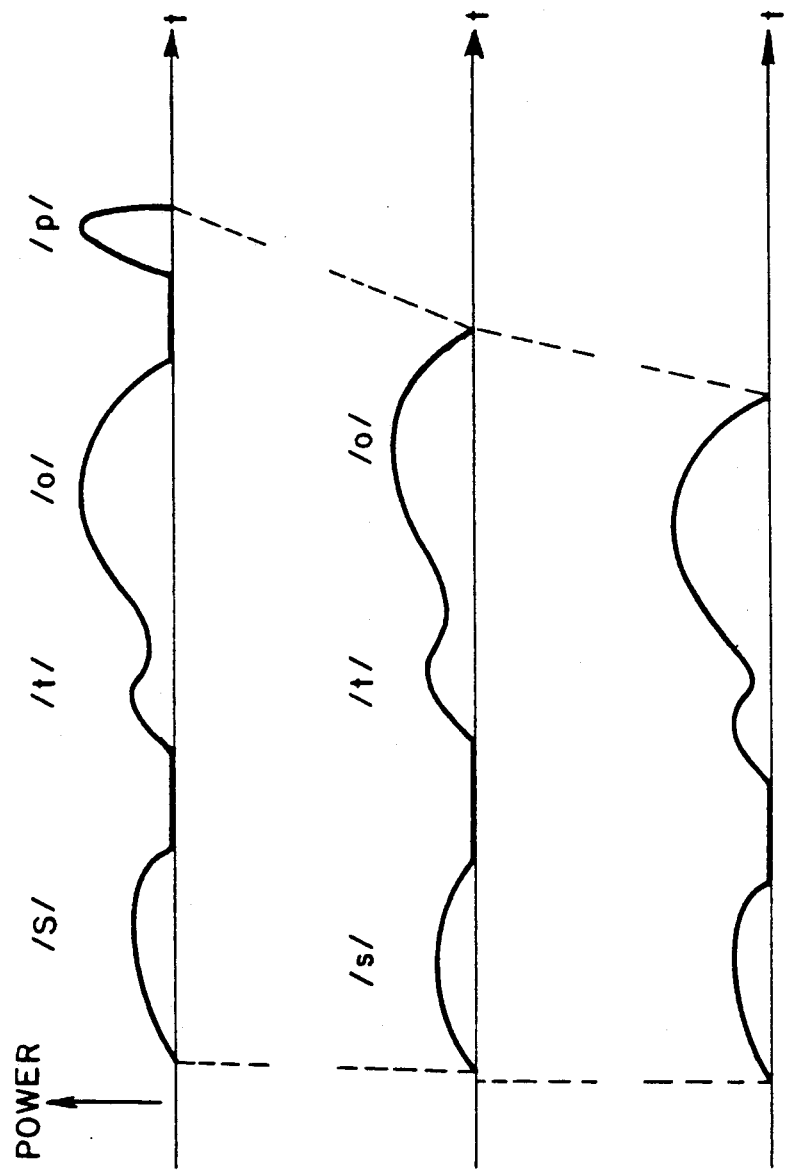
FIGS. 2a through 2c are illustrations which are useful for explaining operation of the system shown in FIG. 1.

On the other hand, if the marks differ between the library pattern and the input pattern, that portion of the pattern having a voiceless section from the voiceless section to the tail end of the pattern is eliminated from the pattern having a voiceless section, and, then, pattern matching is carried out between the reference and input patterns from the beginning to the voiceless section. Described more in detail with reference to FIGS. 2a through 2c, let us consider the case in which the reference pattern has a structure shown in FIG. 2a and the input pattern has a structure shown in FIG. 2b which lacks its tail end portion. In this case, the reference pattern has a mark indicating that it has a voiceless interval at its tail end; whereas, the input pattern has another mark indicating that it has no voiceless interval at its tail end. Thus, in accordance with one aspect of the present invention, the reference pattern of FIG. 2a is processed to eliminate the tail end portion /p/ to redefine the reference pattern having the structure shown in FIG. 2c. And, then, a comparison is made between the input pattern of FIG. 2b and the redefined reference pattern of FIG. 2c. It has been described above with the case in which a tail end portion is lost from one of the two patterns to be compared; however, this aspect of the present invention is equally applicable to the case in which a head end portion is lost from one of the two patterns.

Figure 3:
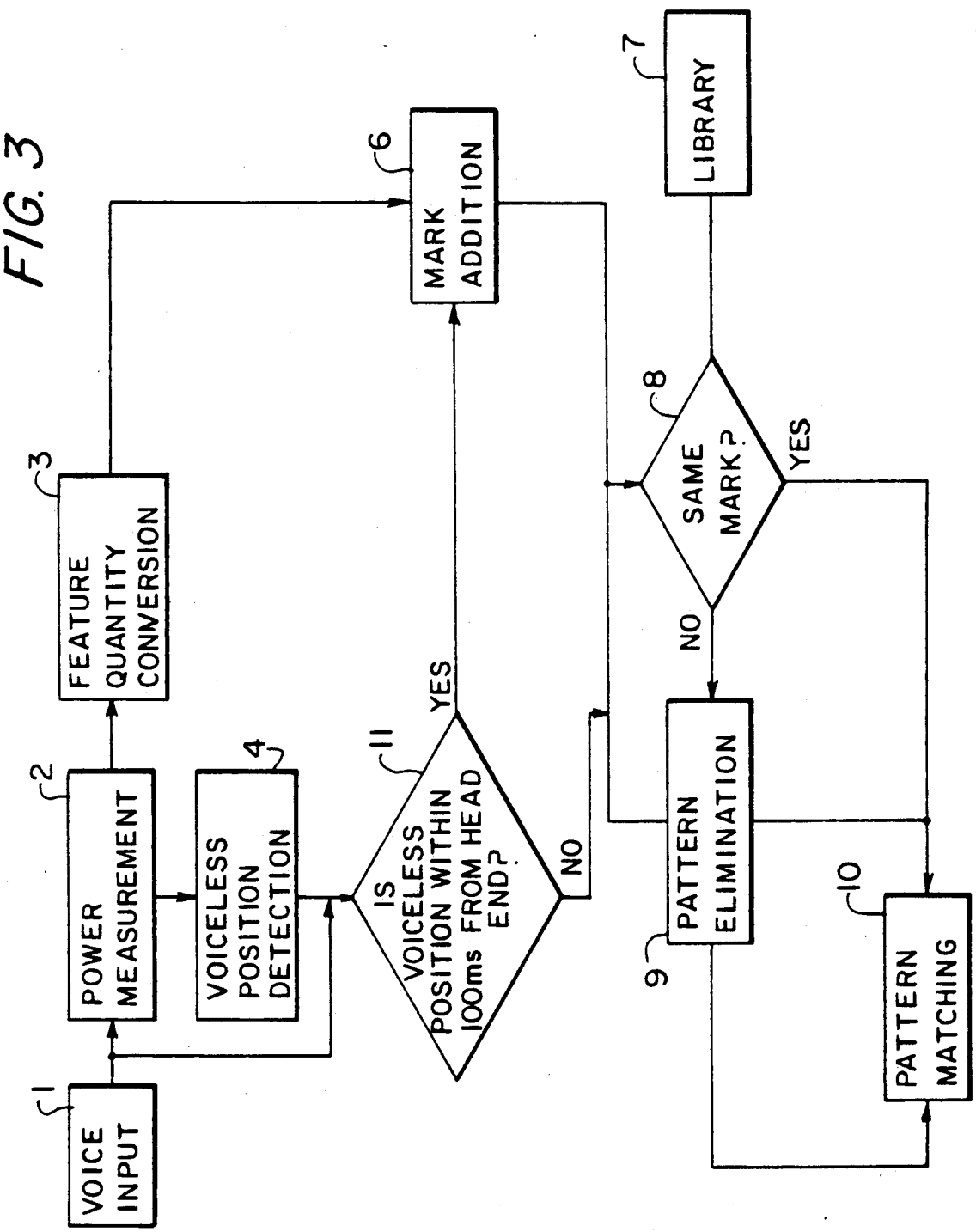
FIG. 3 is a schematic illustration showing a voice recognition system constructed as modified from the structure of FIG. 1.

FIG. 3 schematically shows mostly in block form a pattern comparing system constructed in accordance with another embodiment of the present invention in the case where a pattern comparison is to be made with a head end portion lost from one of two voice patterns to be compared. It is to be noted that the system shown in FIG. 3 is structurally very similar in many respects to the system shown in FIG. 1 so that like elements are indicated by like numerals The system of FIG. 3 includes a voiceless position (head end) judging unit 11, and, in this embodiment, a head end portion of a voice pattern is eliminated if a voiceless section is present in either one of the reference and input patterns within 100 msec. from the beginning of the pattern, and, then, the two patterns are compared or matched. In this case, it is supposed that the reference pattern is normal and complete; on the other hand, the input pattern includes at its head portion a noise component due to a noise produced by opening and closing of the mouth or a sporadically produced noise.

Described more in detail in this respect with reference to FIGS. 4a through 4c, when the word /ido/, meaning "movement" in Japanese, is pronounced, FIG. 4a illustrates a voice pattern with the addition of a noise /n/ at its head end, in which case a voiceless interval is present between the noise /n/ and the word /ido/. Thus, it can be confirmed that this voiceless intevcal is present within 100 msec. from the head end of the pattern by the voiceless position detecting unit 4 and the voiceless position (head end) judging unit 11. And, if confirmed, a predetermined mark indicating the presence of a voiceless interval at the head end is added. On the other hand, FIG. 4b illustrates a library pattern which has no voiceless interval at its head end. Accordingly, that portion of the input pattern of FIG. 4a from the voiceless interval back to the head end is eliminated from the input pattern by the pattern eliminating unit 9, and, then, the two patterns are compared at the pattern matching unit 10. Although any pattern matching scheme can be used, it is preferable to use a method which requires less amount of calculations, such as by linearly expanding or contracting the pattern length. In this case, it goes without saying that the beginning of determining the time length of the pattern shown in FIG. 4a is changed to the point immediately after the voiceless interval. In addition, the voiceless interval detecting unit 4 may be so structured to monitor the background noise under the condition that no voice is being input, and, upon inputting of a voice, a voiceless interval signal is produced when the input voice is comparable in level to the background noise. And, at the voiceless position detecting unit 11, a voiceless position is detected by comparison with a signal which indicates the rising end or falling end of a voice interval In the above-described embodiments, attention has been focused on the fact that the sound produced by opening and closing the mouth or lips tends to be present at the head end of a voice and it is short in time length and in the form of a pulse, so that a voiceless interval tends to be present prior to the pronunciation of a voice and that a voiceless interval also tends to be present at the end of a voice when a consonant is to be pronounced by itself at the end of a word. It is to be noted that the above-described two embodiments are preferably incorporated into a single system which allows to compensate for addition of a noise component at the beginning of a voice and missing of a consonant at the end of a voice. It should also be noted that, although it has been described above as to the case of voice patterns, the present invention should not be limited only to voice patterns and can be applied to any other patterns. As described above, in accordance with this aspect of the present invention, even if a noise due to opening and closing of the mouth or lips, which is unavoidable in pronouncing a voice, or a sporadically produced background noise is present, such a noise is suitably eliminated before pattern matching, and, even if a tail end portion of a voice pattern is missing, a pattern matching is carried out by taking this fact into account. Therefore, this aspect of the present invention allows to enhance the accuracy of pattern matching.

Figure 5:
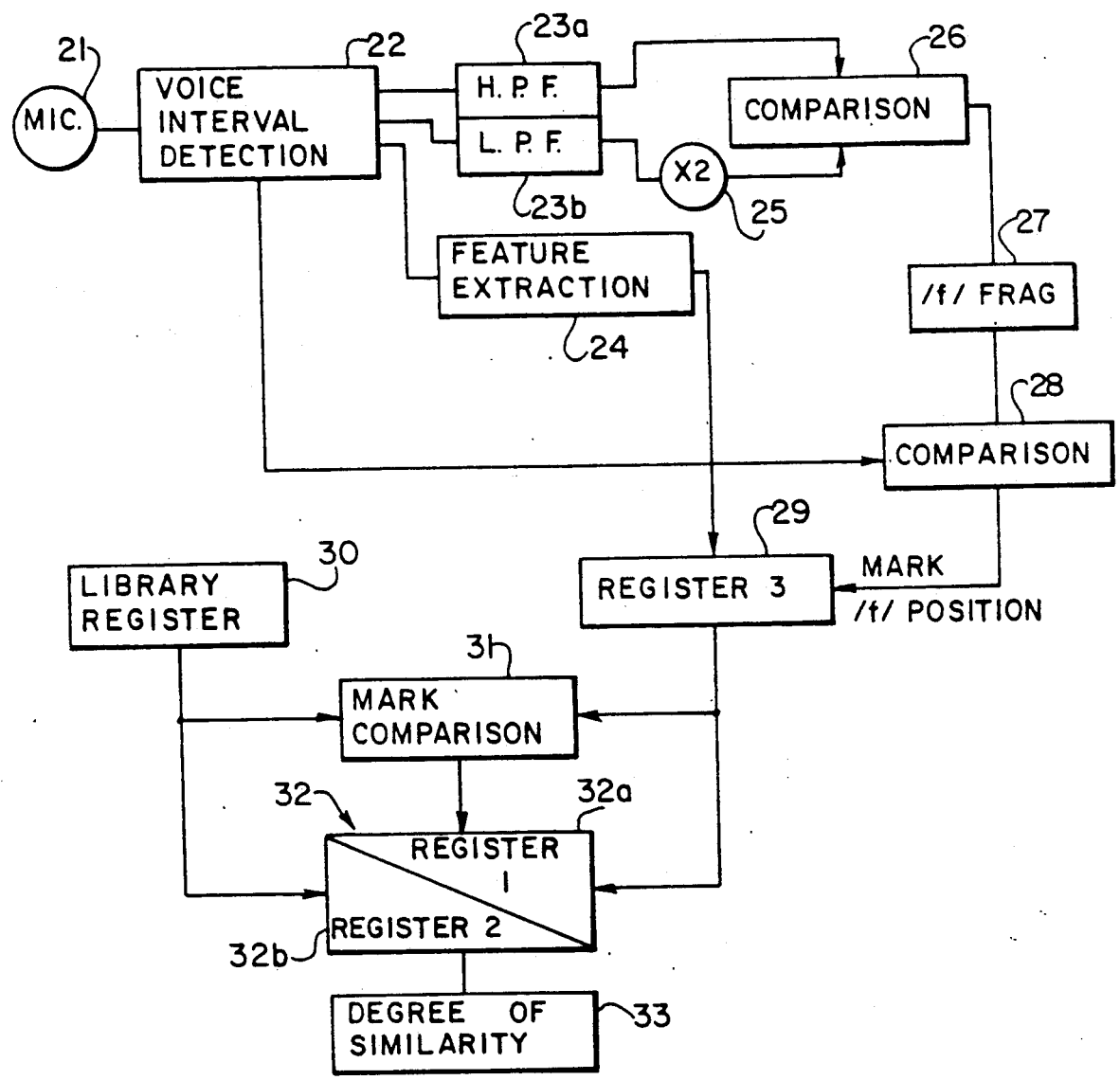
FIGS. 5 and 6 show in block form alternative voice recognition systems constructed in accordance with other embodiments of the present invention.

Referring now to FIG. 5, there is schematically shown mostly in block form a voice recognition system constructed in accordance with a further embodiment of the present invention. As shown, the illustrated voice recognition system includes a microphone 21, a voice interval detecting unit 22, a high pass filter 23a, a low pass filter 23b, a feature extracting unit 24, a multiplier 25, a comparator 26, a flag (/f/) unit 27, a comparator 28, a third register 29, a library register 30, a mark comparator 31, a register unit 32 having a first register 32a and a second register 32b, and a similarity determining unit 33. This embodiment has been constructed by paying attention to the fact that a weak noisy consonant, such as /f/, has a characteristic of being concentrated in a high frequency region when subjected to frequency analysis. Described more specifically, in accordance with the present embodiment, a voice is input to produce a voice signal which is then subjected to frequency analysis to determine the ratio between high and low frequency components. And, if there are more high frequency components, the duration of this state is detected. And, if only one of the two voice patterns to be compared has a portion in which there are more high frequency components, this portion is eliminated and then the two voice patterns are compared for matching.

Described more in detail with reference to FIG. 5, a voice is input into the microphone 21 to produce a voice signal, and its voice interval is detected by the voice interval detecting unit 22. The voice signal is then converted to a feature quantity by the feature extracting unit 24 to thereby define an input pattern which is then stored in the third register 29. On the other hand, the same voice signal is subjected to frequency analysis by the high and low pass filters 23a and 23b to produce high and low frequency components whose magnitudes are compared by the comparator 26. In one example, the high frequency components cover a high frequency range from 1 to 6 KHz and the low frequency components cover a low frequency range from 200 Hz to 1 KHz. In the present embodiment, it is so structured that a /f/ flag is raised if the high frequency components larger than the low frequency components by the factor of 2 or more, as indicated by the multiplier 25. In addition, from the voice interval detecting unit 22, a signal indicating the beginning and end of the voice interval is supplied to the comparator 28. And, if the /f/ flag is raised for the beginning or end of the voice interval, a predetermined mark is supplied to the third register 29, whereby the duration of the /f/ flag is recorded.

Then, a reference pattern is taken out of the library register 30 and it is checked whether or not this reference pattern has a mark same as that of the input pattern now stored in the third register 29 at the mark comparator 31. If the marks are the same, then the input and reference patterns are transferred to the first and second registers 32a and 32b, respectively, followed by the step of matching the two patterns to determine the degree of similarity therebetween. On the other hand, if the two marks differ, e.g., the reference pattern having a mark indicating the absence of /f/ at the beginning and the input pattern having another mark indicating the presence of /f/ at the beginning, a point of the input pattern after /f/ at the beginning of the pattern is redefined as the beginning of a voice pattern, and this redefined input pattern is transferred to the first register 32a with the reference pattern being transferred to the second register 23b without change. And, then, these two patterns are compared to determine the degree of similarity. The similar arguments hold true for the case in which /f/ is not present in the input pattern, but present in the reference pattern. Therefore, in accordance with this aspect of the present invention, even if a voice interval has been erroneously carried out to thereby lose /f/ sound at the beginning or end of a reference or input pattern, this error is suitably corrected and thus matching between two patterns can be carried out accurately.

Figure 6:
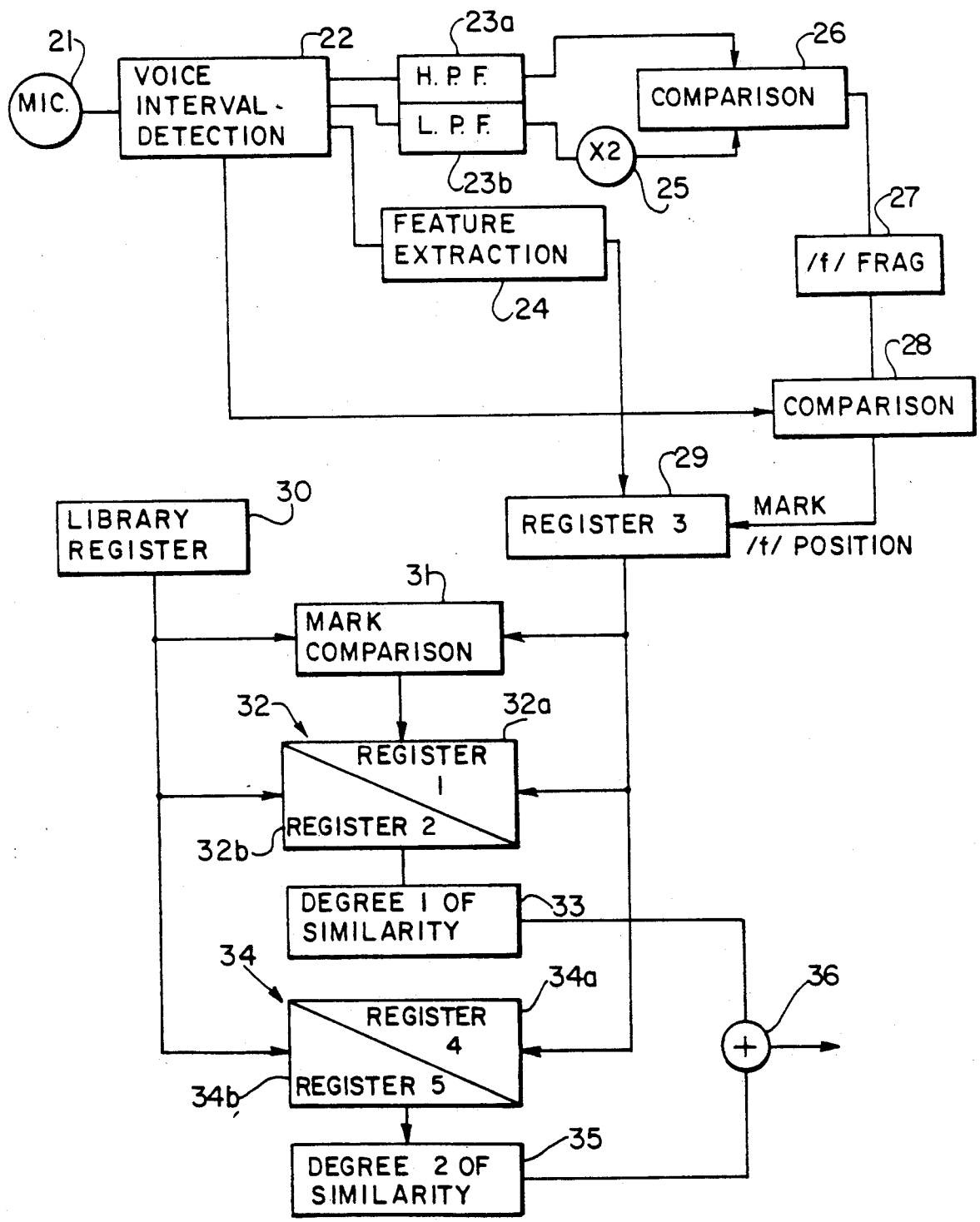

FIG. 6 schematically shows mostly in block form a voice recognition system which is structurally similar in many respects to the system shown in FIG. 5, and, thus, like elements are indicated by like numerals. This embodiment is the case in which both of reference and input patterns have /f/ sound at the same position. As shown, the present system includes a register unit 34 which is comprised of a fourth register 34a and a fifth register 34b. Also provided in the illustrated system are a first similarity determining unit 33, a second similarity determining unit 35, and an adder 36.

As an example, if /f/ sound is present at the beginning, the presence of /f/ sound at the beginning of each of the two patterns is found by mark comparison, and the lengths of respective /f/ sounds can be determined. Thus, that portion of the input pattern from the beginning over the length designated for the /f/ sound is stored into the first register 32a and the corresponding portion of the reference pattern is stored into the second register 32b. In addition, the remaining portion of the input pattern is stored into the fourth register 34a and the corresponding remaining portion of the reference pattern is stored into the fifth register 34b. And, then, the degree of similarity is calculated between the second and third registers 32a and 32b and also between the fourth and fifth registers 34a and 34b. A sum of these calculated partial degrees of similarity is obtained at the adder 36 as an overall degree of similarity. It is to be noted that, in the illustrated embodiment, there are provided four separate registers 32a, 32b, 34a and 34b; however, the provision of registers 32a and 32b is normally sufficient because the two degrees of similarity can be calculated in sequence, i.e., upon determination of the first degree of similarity, the contents to be stored into the registers 34a and 34b being stored in the registers 32a and 32b to calculate the second degree of similarity and then added to the previously calculated first degree of similarity to obtain the overall degree of similarity. Besides, in the above-described embodiment, two partial degrees of similarity are calculated separately and then added to calculate the overall degree of similarity. However, this arithmetic process needs not be limited only to addition, and the overall degree of similarity can be determined by obtaining an element to calculate the degree of similarity between the registers 32a and 32b, obtaining an element to calculate the degree of similarity between the registers 34a and 34b, and then summing these elements. As described above, in accordance with either of the embodiments shown in FIGS. 5 and 6, matching between two patterns can be carried out properly even if part of at least either one of the two patterns is missing.

Now, a further aspect of the present invention relating to the formation of a reference or library pattern suitable for use in pattern recognition will be described. The most common pattern recognition scheme is the one using pattern matching. In this scheme, a plurality of reference patterns are stored in a library and an input, unknown pattern to be identified is compared with each of the plurality of reference patterns to determine which of the plurality of reference patterns has the highest degree of similarity, thereby determining the identity of the input pattern. In this case, the quality or characteristic of the registered reference patterns has a significant effect in the performance of pattern matching. Thus, it is vital to form a reference pattern high in quality so as to obtain a high rate of recognition in pattern recognition.

Taking pattern matching in voice recognition as an example, the voice recognition may be generally categorized into the limited speaker system and the unlimited speaker system. In the case of the unlimited speaker system, reference voice patterns are already formed by a maker and incorporated in a voice recognition system before being placed in the market. In this case, since it is supposed that anybody's voice can be recognized, the voice recognition system can be used after checking whether or not the data for formation of reference patterns is normal. On the other hand, in the case of the limited speaker system, a user must first register voices before use and the voice recognition system can be used after carrying out training. For this reason, a voice pattern to be registered cannot be checked for its normality, so that there is a possibility that the quality of reference patterns is poor. The predominant cause for deteriorating the quality of reference patterns when registered is an improper detection of a voice interval. For example, when the sound produced by opening and closing the mouth so as to pronounce a voice or a sporadic background noise has been created immediately prior to or subsequent to the pronunciation of a voice, the voice pattern cannot be differentiated from such a noise, so that such a noise is incorporated into the voice pattern. In addition, there is also a case in which a portion of a voice is lost. Because of these reasons, the quality of a reference pattern may be deteriorated. There is a method of averaging a plurality of voice patterns by pronouncing the same word for a plurality of times in forming a reference pattern. According to this averaging method, statistical information regarding fluctuations in production of a voice can be incorporated in the resulting averaged voice pattern. However, since it requires a plurality of pronunciations for forming one reference pattern, if incomplete detection of a voice interval has occurred even once, it would cause a deterioration in the quality of the resulting reference pattern.

Figures 20A, 20B:
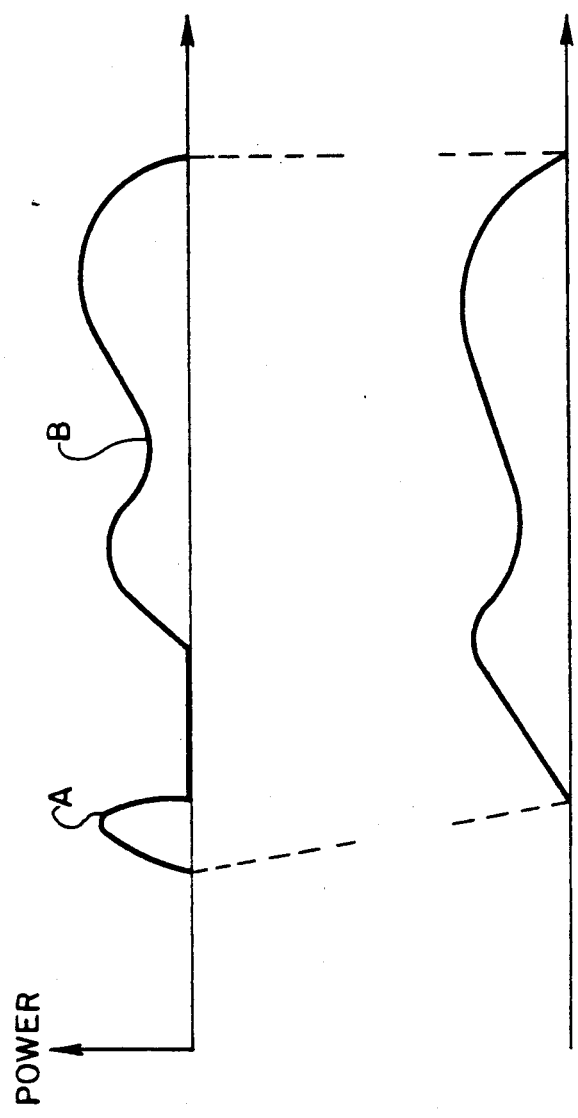
FIGS. 20a, 20b, 21 and 22 are illustrations which are useful for explaining the problems to be solved by another aspect of the present invention.

Described more in detail in this respect with reference to FIGS. 20a and 20b, FIG. 20a shows an abnormal voice pattern with the addition of a noise component in front and FIG. 20b shows a normal voice pattern for the same word. A consonant section is indicated by B. When taking an average between the normal pattern of FIG. 20b and the abnormal pattern of FIG. 20a having a noise component A, the averaging is carried out by making a correspondence between the respective head ends and the respective tail ends, as indicated by the dotted lines. As a result, the noise component A of the abnormal pattern of FIG. 20a is added to the leading portion of the consonant portion B of the normal pattern of FIG. 20b, which would yield an averaged pattern inferior in quality.

In particular, in the case of the limited speaker system, the recognizing capability varies depending on whether or not the registration of reference patterns has been carried out properly. Thus, for those words which have a weak sound at the beginning or at the end, since this weak sound tends to be lost, it is conceivable to register a pattern which is redefined by positively removing such an easily lost portion from a normal pattern. With this structure, even if a weak sound portion of a word is lost and is not detected, such a voice pattern which has lost a part of original voice information has a high degree of similarity to the registered pattern, so that recognition can be carried out properly. However, in accordance with this scheme, if a weak sound /h/ is lost from English word /his/, there is produced a sound /is/ which constitutes another word. This will create confusion, thereby leading to an inferior recognition rate.

Figure 21:
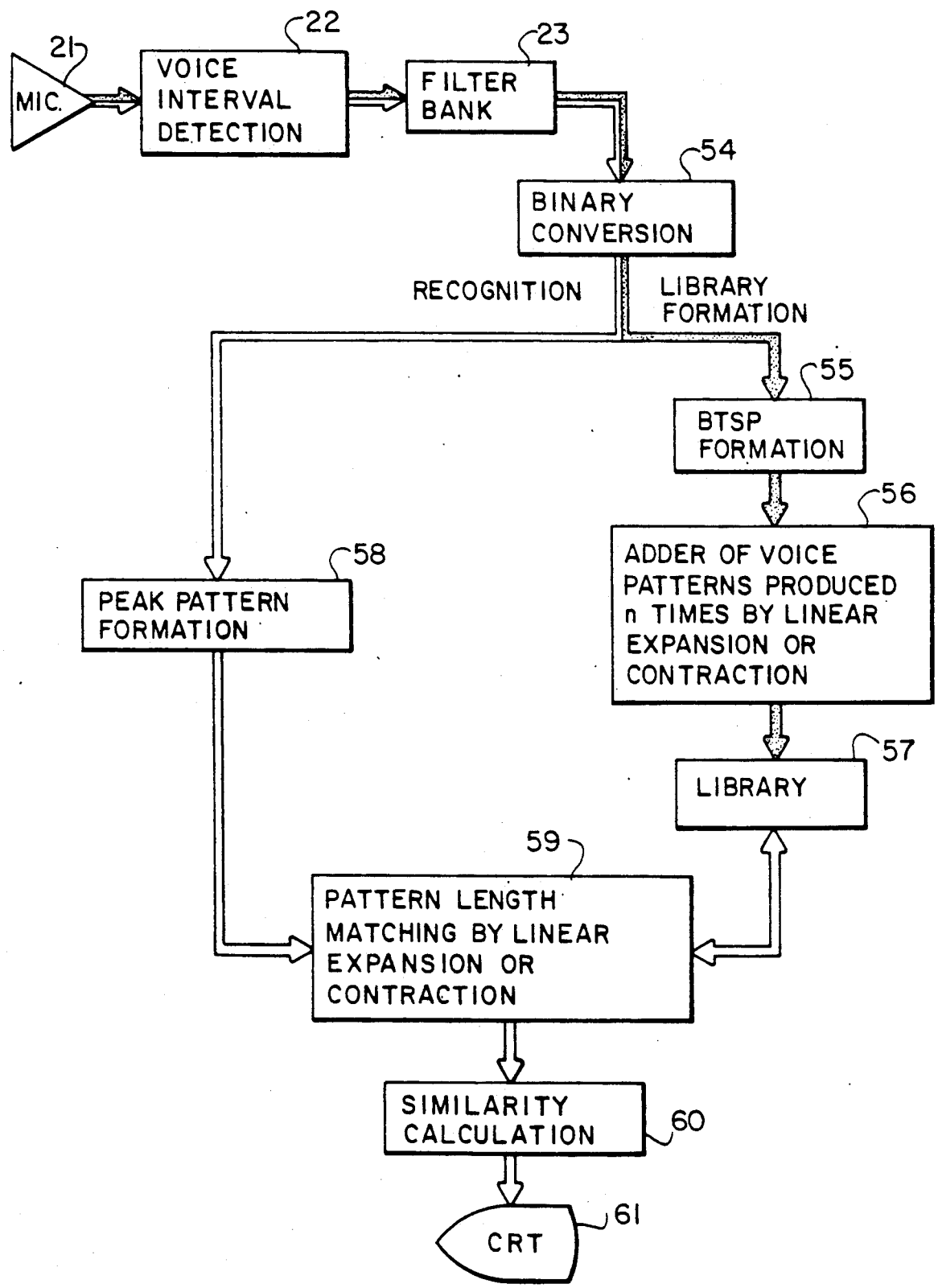
Figure 22:
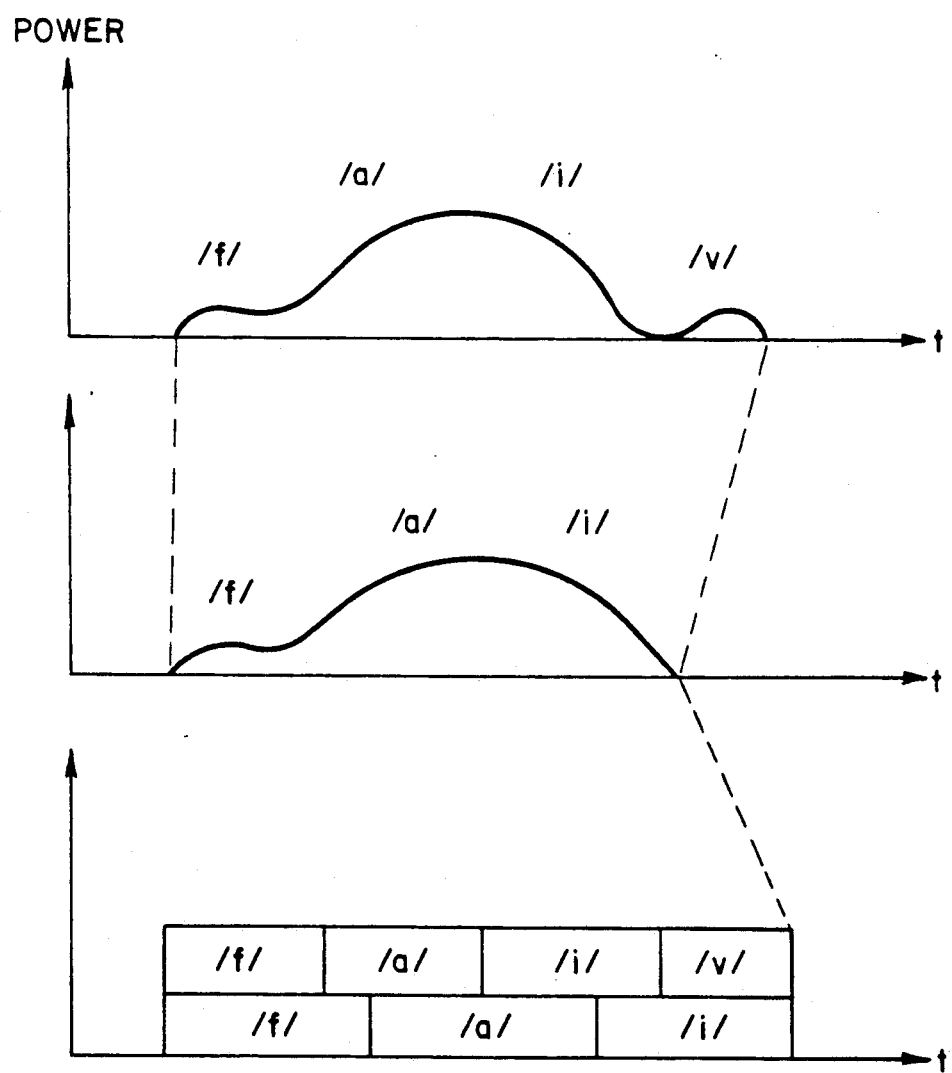

In the case of the limited speaker system, the user must first registers his own voices for selected words. In registering voices as reference voice patterns, there is one method in which a voice is pronounced only once for one word to be registered and another method in which a plurality of voices are produced by pronouncing the same word for a multiple of times and then the plurality of voices are averaged out. FIG. 21 illustrates mostly in block form a voice recognition system in which a plurality of voice patterns are produced for the same word and then an average pattern of the plurality of voice patterns is determined. In the structure shown in FIG. 21, use is made of the so-called Binary Time Spectrum Pattern (BTSP) method which is an example of the pattern matching method. The illustrated system includes a sound collecting unit 21, such as a microphone 21, a filter bank 22, a correction unit 23 utilizing the least square method, a binary conversion unit 54, a BTSP forming unit 55, an adder 56 for adding n number of voice patterns by linear expansion and contraction, a library 57, a peak pattern forming unit 58, a pattern length matching unit 59 by linear expansion and contraction, a similarity calculating unit 60 and a CRT display 61. With this structure, a voice input into the microphone 21 is converted into a voice signal which is then subjected to frequency analysis using a bank of band-pass filters, thereby defining a time-frequency or time-spectral distribution pattern (TSP). Then, such a time-spectral pattern is binary-valued with the peaks identified by "1s" with the rest by "0s" to thereby define a binary TSP (BTSP) pattern. And, in the registration mode, a plurality of such BTSPs produced by pronouncing the same word over a plurality of times are superimposed one on top of another to define a reference pattern, which is then registered as a reference pattern.

On the other hand, in the recognition mode, an unknown voice to be recognized is input, a corresponding BTSP pattern is formed in a manner similar to that described for the registration mode, and the thus formed input BTSP pattern is compared with each of the previously registered reference patterns to determine the degree of similarity with each of the reference patterns. In this case, the degree of similarity can be determined, for example, by counting the number of overlapping 1s when the input pattern is superimposed with a reference pattern. Normally, in the case of the unlimited speaker system which is designed to be capable of recognizing the voice produced by anybody, a plurality of different reference patterns are formed for one word to be registered, which increases the amount of calculations. On the other hand, the illustrated system has an advantage of allowing to ease the realization of a voice recognition system of the unlimited speaker type without increasing the amount of calculations if a reference pattern is formed appropriately. When a reference pattern is formed in this manner, it is assumed that all of the patterns from which an average pattern is defined are complete. However, in reality, it is not always the case, and, for example, a sound /v/ at the end of word "five" and a sound /f/ at the beginning of word "full" are extremely low in energy, it is relatively difficult to detect these weak sounds properly. This causes it difficult to obtain a normal pattern for such words, which could lead to a deterioration of the quality of a reference pattern.

Therefore, in accordance with this aspect of the present invention, there is provided an improved method for forming a reference pattern by averaging a plurality of voice patterns, in which an unstable component in creating a voice is provided in each of the voice patterns as a necessary element in averaging the plurality of voice patterns. Or, alternatively, in the case where the plurality of voice patterns include those patterns having an unstable component in creating a voice and those pattern having no such unstable component, the unstable component of a pattern having the unstable component is added to a pattern having no unstable component, and, then, an average of both of the patterns is determined. Furthermore, for the patterns having an unstable component in creating a sound present in the plurality of voice patterns, those patterns with a part of the unstable component left and the remaining eliminated are averaged. Further alternatively, for a plurality of patterns having an unstable component in creating a voice present in the plurality of voice patterns, each of the patterns is separated into the unstable component and a stable component, and, after averaging the patterns on a component by component basis, both of the components are combined to define a reference pattern.

Figure 10:
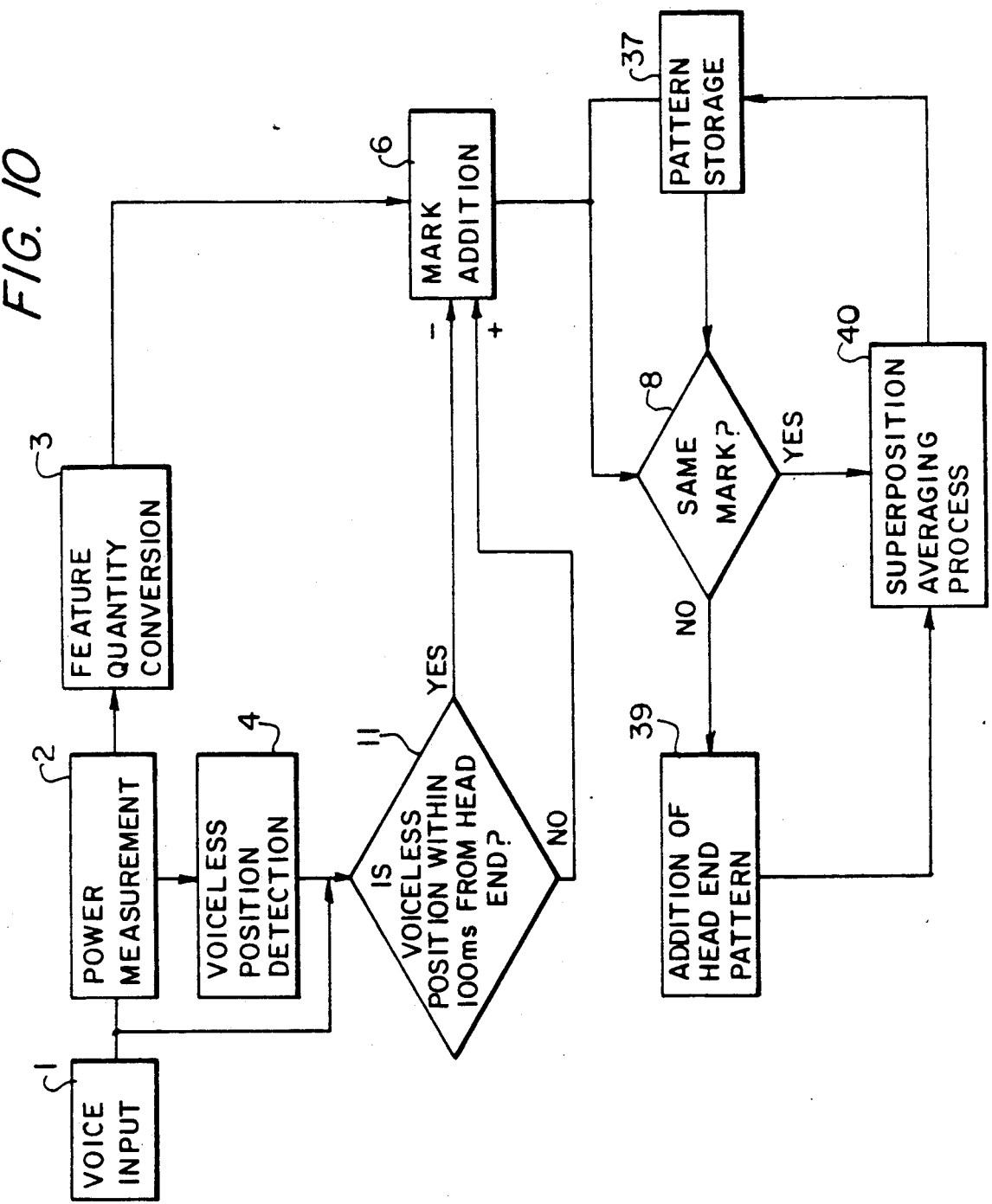
FIG. 10 is a schematic illustration showing mostly in block form a voice recognition system constructed in accordance with a further embodiment of the present invention.

Now, referring to FIG. 10, there is shown mostly in block form a system for forming a reference pattern suitable for use in a voice recognition apparatus, and in accordance with the illustrated system, a plurality of patterns are formed for one kind of item, such as a voice, to be registered, and the plurality of patterns are averaged or independently registered to define a reference pattern. In this embodiment, it is examined whether or not an energy minimum is present within a predetermined length from either the beginning or the end of each of the plurality of patterns. If there are those patterns having no such energy minimum, that portion of a pattern having an energy minimum from either the beginning or the end of the pattern to its energy minimum is added to a predetermined position of the pattern having no energy minimum to thereby define a reference pattern.

Described in detail with reference to FIG. 10, the illustrated system includes a voice input unit 1, a power measuring unit 2, a feature quantity converting unit 3, a voiceless position detecting unit 4, a voiceless position (head end) judging unit 11, a mark adding unit 6, a pattern storing unit 37, a mark judging unit 8, a head end pattern adding unit 39, and a superimposing and averaging unit 40. In the first place, a voice is input into a microphone 1 to be converted into a voice signal which is then supplied to the power measuring unit 2 where the voice power is measured. And, then, the voice signal is converted into a feature quantity. As a feature quantity, use may be made of any well-known feature quantity, such as power spectrum, LPC coefficients and cepstrum. From the measured power, it is checked whether or not there is a voiceless interval and if there is, its position is detected. Then, it is checked whether or not such a voiceless interval is located within a predetermined range from the beginning of the voice interval, and, depending on the result of this check, a predetermined mark is added to a pattern which is formed by feature conversion. Here, as an example, it is assumed that it is checked whether or not a voiceless interval is present within 100 msec from the beginning. And, if there is, a mark of $-1$ is added; whereas, if there is not, a mark of $+1$ is added. Then, the pattern added with such a mark is stored. Similarly, another voice is pronounced for the same word and a similar pattern is formed and superimposed on the previously stored pattern to carry out averaging. In this instance, prior to superimposition, it is checked whether or not the following pattern has the same mark as that of the previous pattern which is stored, and, if the marks are the same, then an averaging process of the following and previous patterns is carried out in an ordinary manner and the resulting averaged pattern is stored. On the other hand, if the two marks differ, then it indicates the fact that one of the two patterns has a voiceless interval and the other has none. In this case, that portion of the pattern having a voiceless interval at its front (FIG. 11a) from the beginning to the voiceless interval of the pattern is added at the front of the other pattern having no voiceless interval (FIG. 11b), thereby forming another pattern shown in FIG. 11c. Then, the thus formed pattern of FIG. 11c is superimposed with the previously stored pattern of FIG. 11a to carry out averaging. In this manner, after carrying out such superimpositions over a predetermined number of times, there is defined a reference pattern. As may have been already understood, in accordance with this embodiment averaging can be carried out with the noise and signal sections separately, so that the signal portion is prevented from being deteriorated in quality by averaging. In the above-described embodiment, a noise component is present at the beginning of a voice. It should be noted, however, that this technique is equally applicable to a case in which a tail end of a voice signal is lost. For example, in the case of a word having a double consonant or snappy sound at its end, such as /stop/, it is often the case that such a double consonant and its following are not detected by the voice interval detecting unit and lost. If a plurality of voice patterns for such a word include those patterns having lost the tail end and those patterns which have not lost the tail end, the resulting averaged pattern will be inferior in quality when averaged as they are. That is, as shown in FIGS. 12a and 12b, when averaging is carried out between the pattern of FIG. 12a having the tail end sound /p/ and the other pattern of FIG. 12b which has lost its tail end sound /p/, the tail end sound /p/ of the pattern shown in FIG. 12a comes to be averaged with the tail end sound /o/ of the pattern shown in FIG. 12b.

Figure 13:
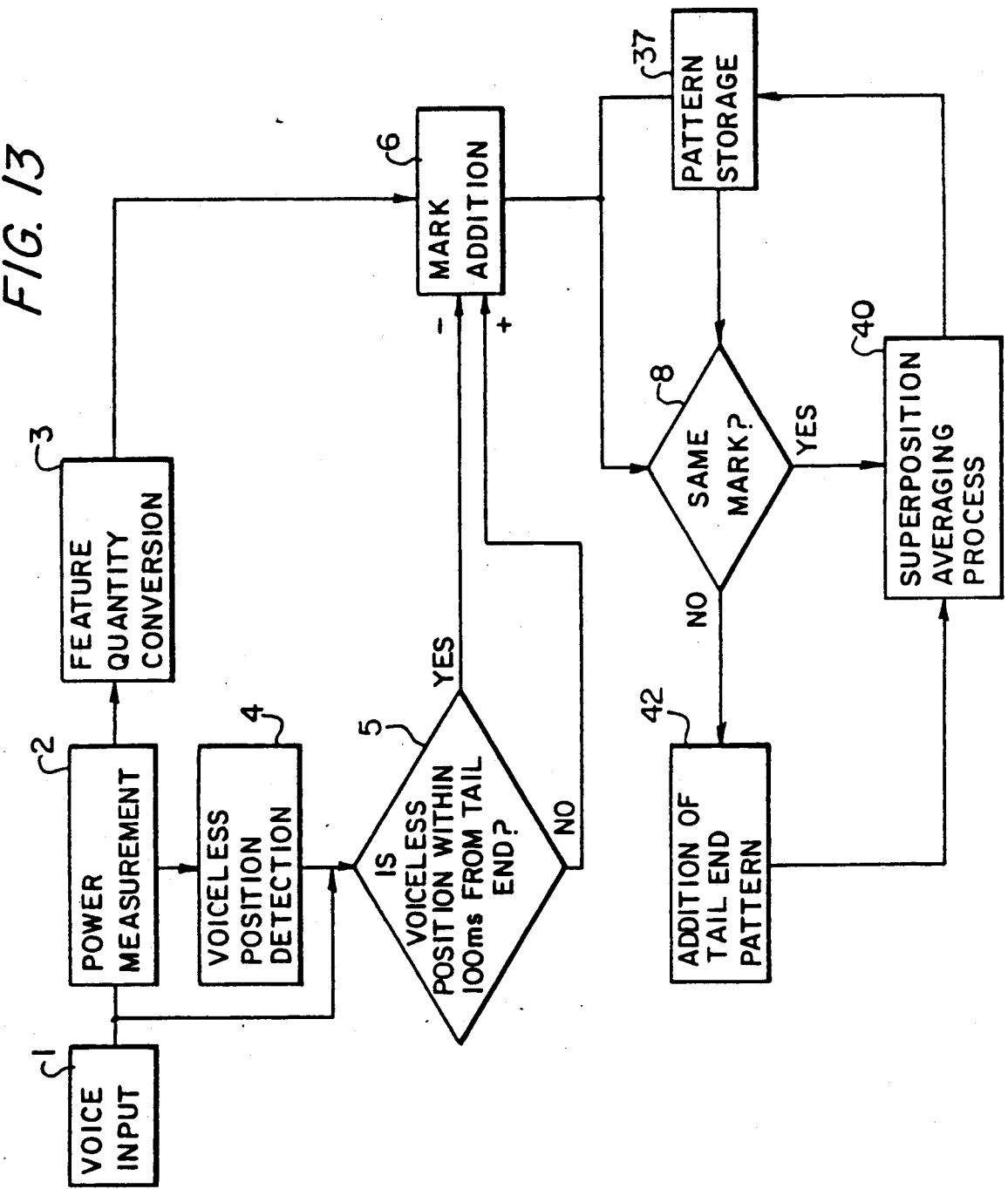
FIG. 13 is a schematic illustration showing mostly in block form a voice recognition system constructed in accordance with the embodiment which implements the scheme, shown in FIGS. 12a and 12b.

FIG. 13 illustrates mostly in block form a reference pattern forming system constructed to implement the method for preventing the occurrence of deterioration due to loss of tail end sound. The system shown in FIG. 13 is structurally similar in many respects to the system shown in FIG. 10, so that like elements are indicated by like numerals. The illustrated system includes a voiceless position (tail end) judging unit 5 and a tail end pattern adding unit 42. In the present embodiment, it is checked whether or not a voiceless interval is present within 100 msec from the tail end of the voice interval, and, in a manner similar to the previously described embodiment, a predetermined mark is added depending on the result of such a check. On the other hand, in averaging similar patterns, if the two patterns to be averaged have the same mark, since both of the patterns have a structure shown in FIG. 12a, these two patterns can be averaged with their beginnings and ends in correspondence. On the contrary, if the two patterns have different marks, then one of the two patterns has a structure shown in FIG. 12a with the other having a structure shown in FIG. 12b. In this case, since the pattern shown in FIG. 12b has lost its tail end sound /p/, that portion of the pattern shown in FIG. 12a from the voiceless interval to the tail end is added to the end of the pattern shown in FIG. 12b, and, then, averaging between the patterns is carried out. In this manner, a resulting pattern can be prevented from being deteriorated by an averaging process.

It is to be noted that in the present embodiment, the voice input unit 1 may be realized by a microphone and the power measurement at the power measuring unit 2 may be carried out by measuring outputs from audio band-pass filters. Typically, a voice is sampled at a sampling time period in the order of 10 msec, so that the assignment or addition of a mark can be carried out by detecting the fact that a voiceless interval has occurred within the first 10 sampling time periods or the end of a voice has reached within 10 sampling time periods as from the occurrence of a voiceless interval. It has been described as to the case in which the present invention has been applied to voice recognition; however, it is to be noted that this aspect of the present invention should not be limited to voice recognition. It should also be noted that the noise processing at the beginning of a pattern and the noise processing at the end of a pattern described above can be implemented independently or in combination. In addition, the definition of head end and tail end of a pattern can be made other than 100 msec.

FIG. 14 illustrates a reference pattern forming system constructed in accordance with a still further embodiment of the present invention. In accordance with this embodiment, a voice is registered as converted into a feature parameter distribution. That is, a voice is input into the microphone 21 to produce a corresponding voice signal which is then subjected to frequency analysis whereby high frequency components are compared in magnitude with low frequency components. And, if the high frequency components are larger in magnitude than the low frequency components at the beginning or end of a voice interval, the duration of this state is measured. And, then, an original voice pattern is redefined by eliminating that portion of stronger high frequency components and the thus redefined voice pattern is registered as a reference pattern.

Referring now to FIG. 14, the illustrated system includes a microphone 21, a voice interval detecting unit 22, a filter bank 23, a high pass filter 23a, a low pass filter 23b, a multiplier 25, a comparator 26, a register 46, a time count 47, a multiplier 48, and a start end mover 49. Let us consider the case of registering a word such as "his." In the first place, a voice of "his" is input into the microphone 21, so that a voice interval is detected by the voice interval detecting unit 22 and the information relating to the word in question is supplied to the filter bank 23. In the illustrated example, the filter bank 23 is located downstream of the voice interval detecting unit 22 with respect to the direction of flow of information; however, these elements can be exchanged in position, if desired. The voice interval can be detected by the method previously described with reference to FIG. 8 or any other method. In the illustrated embodiment, use is made of the filter bank 23 as a method of carrying out frequency analysis; however, use may also be made of any other method, such as FFT method.

In the present embodiment, the filter bank 23 has the high pass filter 23a and the low pass filter 23b so that a high frequency output is compared with a low frequency output. As an example, in a range of 200 to 6,000 Hz normally required for voice analysis, the range of 2,000 to 6,000 Hz may be defined as the high frequency range with the rest as the low frequency range. In particular, in the present embodiment, since that portion of a voice pattern which has a stronger high frequency output is to be detected, if the high frequency power is larger than the low frequency power by the factor of 2 or more at the beginning or end of the voice interval, then the duration of such a state is measured. In this case, it is easy to measure the duration of the high frequency output being stronger than the low frequency output from the beginning of a voice; however, to measure the duration at the end of a voice is not so easy. For this reason, as shown in FIGS. 15a and 15b, while monitoring both of a signal of FIG. 15a indicating a greater high frequency output and a signal of FIG. 15b indicating a voice interval, a counter is caused to start at time $T_1$ upon rising of the high frequency output signal of FIG. 15a and the counter is caused to stop to be cleared at time $T_2$ upon rising of the high frequency output signal. This operation is repeated and the value obtained after completion of the voice signal is determined as a tail end high frequency duration $T_3$. Here, a new pattern is formed with ⅓ of this duration and this pattern is registered. This is illustrated in FIG. 16. In one approach, the sound /h/ is positively discarded to redefine a pattern to be registered. In this case, however, no distinctions can be made with another word /is/. Under the circumstances, by registering a pattern with information bridging between /h/ and /i/, distinctions can be made between /his/ and /is/ at the stage of a template. The /h/ portion is small in energy and thus easily lost at the voice interval detecting unit 22, but the vowel portion of /i/ is large in energy and thus is not lost. For this reason, it is quite rare to lose the bridging portion from /h/ to /i/. That is, in accordance with this embodiment, the pattern length of a template is made to be substantially equal to the case in which the portion of /h/ is discarded, but the information of /h/ is slightly left to thereby increase the rate of recognition. Therefore, in accordance with this embodiment, even if part of a voice pattern has been lost, a template for allowing a proper voice recognition can be registered.

Figure 17:
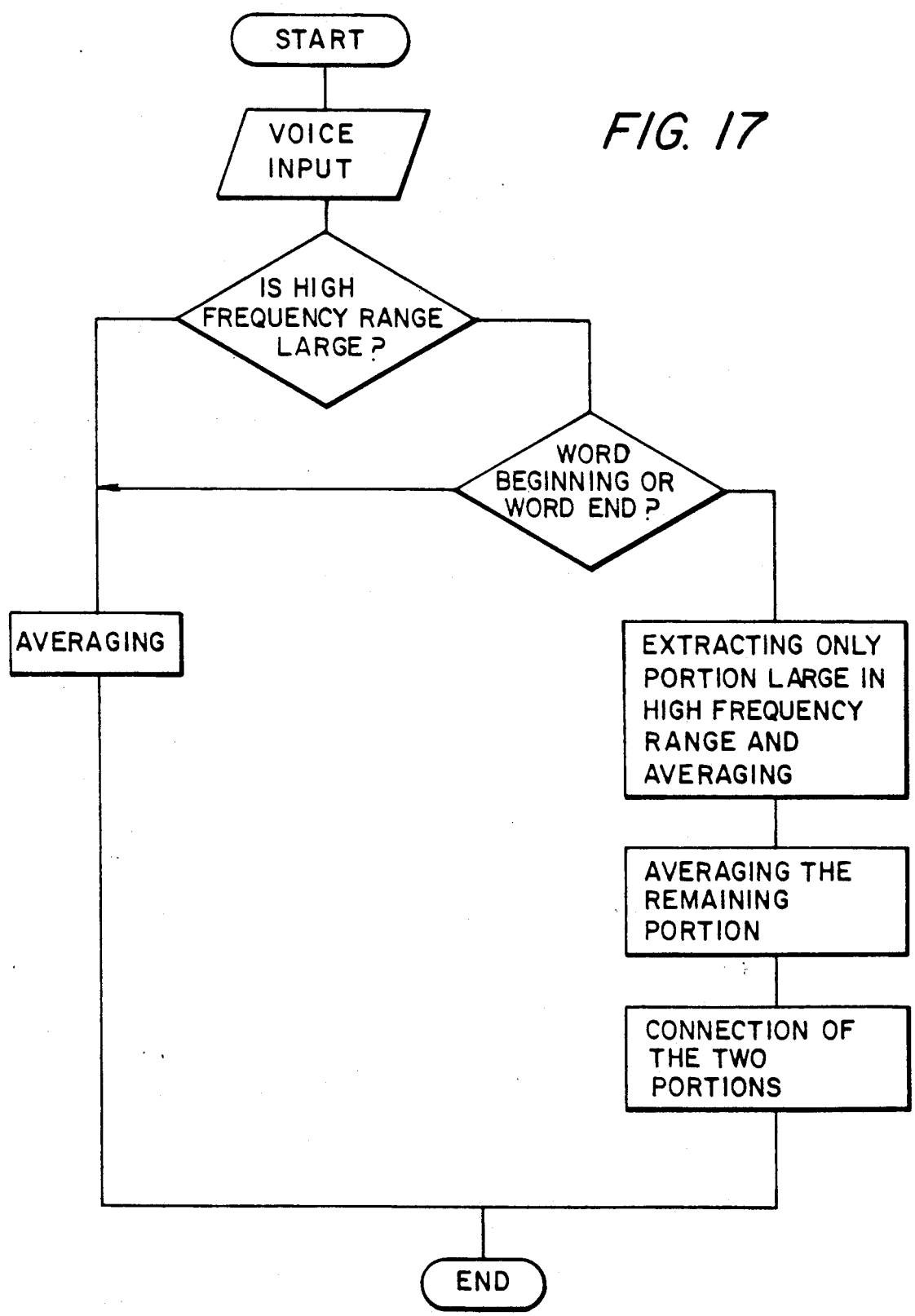
FIG. 17 is a flow chart showing a reference pattern forming method constructed in accordance with a still further embodiment of the present invention.
Figure 18:
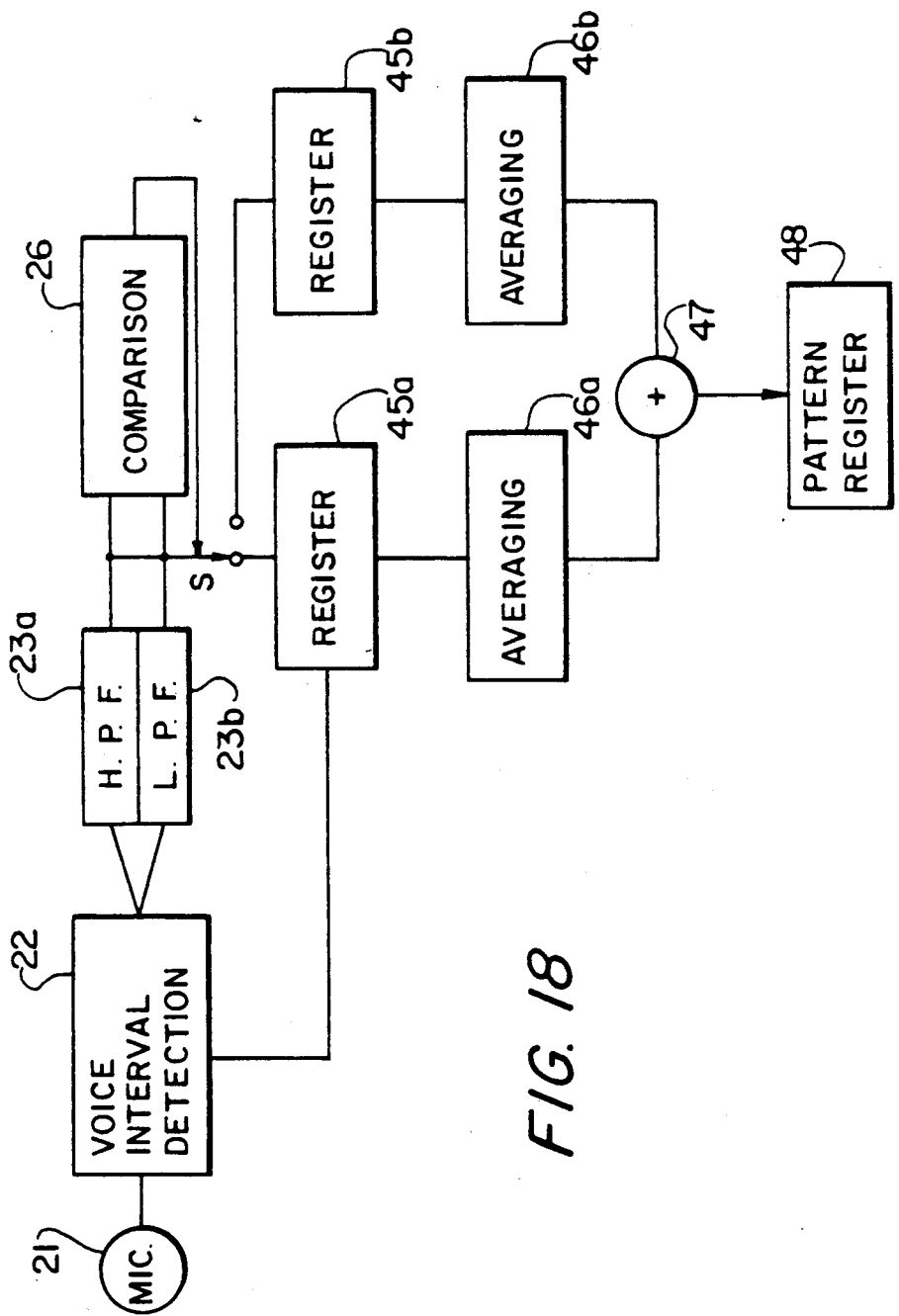
FIG. 18 is a schematic illustration showing mostly in block form a reference pattern forming system for implementing the method shown in FIG. 17.

FIG. 17 shows a flow chart showing a sequence of steps for forming a reference pattern to be registered constructed in accordance with a still further embodiment of the present invention. FIG. 18 illustrates mostly in block form a reference pattern forming system for implementing the method shown in FIG. 17. In the present embodiment, a plurality of feature quantities (feature patterns) obtained by pronouncing the same word to be registered for a plurality of times are processed to determine a reference pattern to be registered. In this case, if there are those patterns having a high frequency component at the beginning or end of the pattern and those patterns having not such high frequency pattern, the patterns are processed while separating the high frequency components, and then the high frequency components are added to the processed result.

The system shown in FIG. 18 includes a microphone 21, a voice interval detecting unit 22, a high pass filter 23a, a low pass filter 23b, a comparator 26, registers 45a and 45b, averaging units 46a and 46b, an adder 47 and a pattern register 48. Described the structure of the system shown in FIG. 18 with reference to the flow chart shown in FIG. 17, in the first place, a voice is input and it is examined whether or not the input voice has a high frequency component at the word beginning or end. If there is, the high frequency component is separated out, and a plurality of voice patterns produced by pronouncing the same word for a number of times are averaged separately for the high frequency components and the remaining portions. Finally, both portions are combined to define a desired pattern. In this manner, in accordance with this embodiment, even if that portion of a voice pattern including a high frequency component is lost once or more during a plurality of pronunciations of the same word, since the two portions are averaged separately and then the averaged portions are connected or combined to define a complete voice pattern, such a loss of partial information can be compensated appropriately. In FIG. 18, a voice input into the microphone 21 is converted into a voice signal which is then applied to the high and low pass filters 23a and 23b. By comparing outputs from these high and low pass filters 23a and 23b, it is determined whether or not the voice pattern has a high frequency component. At the same time, a voice interval is detected from the voice signal, and it is checked whether or not a high frequency component is present at the beginning or end of the voice interval. If there is such a high frequency component, a switch S is turned to the register 45b; whereas, if no such high frequency component is present, the switch S is turned to the register 45a. That is, the high frequency component at the beginning or end of the voice interval is stored into the register 45b with the rest being stored into the register 45a. For example, in the case where the same word is pronounced three times, upon storage of three voice patterns in the registers, the contents of the respective registers are averaged and then the averaged results are connected. In this case, if the contents of the register 45b are the information at the beginning of the voice interval, the contents of the register 45b are placed in front of the averaged result of the register 45a. On the other hand, if the tail end data is stored in the register 45b, it is placed after the contents of the register 45a. Here, the detection of a voice interval can be implemented by a method described with reference to FIG. 8 or any other desired method. The averaging process can be carried out by any desired method depending on the purpose of use of the pattern thereafter. Here, the following method can be applied. In taking an average of three patterns, the pattern length is adjusted to the shortest pattern and the patterns are added by taking data uniformly. A pattern formed in this manner can define a reference pattern of high quality complete with a portion which tends to be lost.

Figure 19:
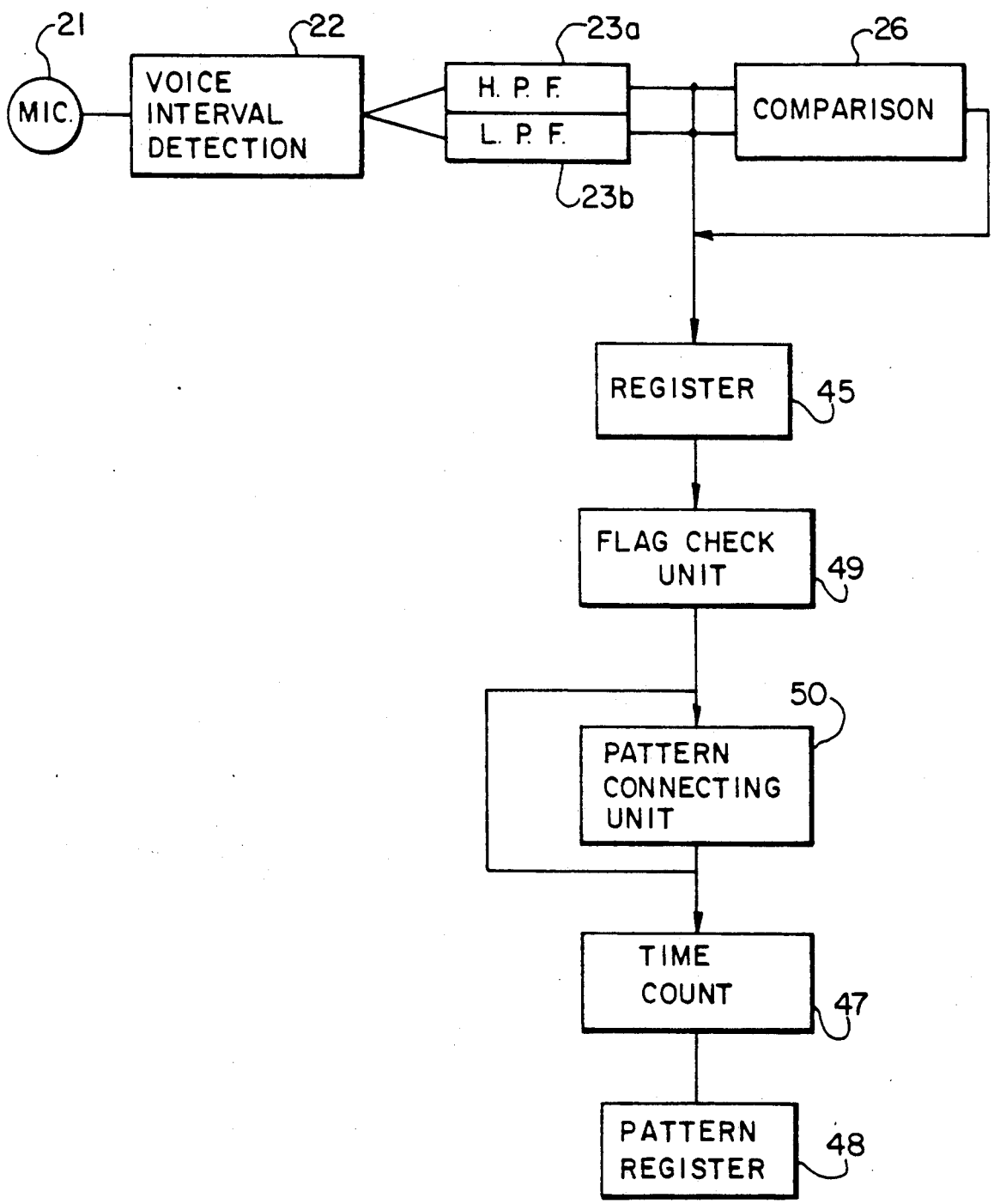
FIG. 19 is a schematic illustration showing mostly in block form an alternative reference pattern forming system embodying the present invention.

FIG. 19 illustrates mostly in block form a reference pattern forming system constructed in accordance with a still further embodiment of the present invention. In the present embodiment, if there are those patterns having a high frequency component at the beginning or end of the feature pattern and those patterns having no such high frequency component, the high frequency component portion of the pattern having a high frequency component is added to the pattern having no such high frequency component. In FIG. 19, the system includes a microphone 21, a voice interval detecting unit 22, a high pass filter 23a, a low pass filter 23b, a comparator 26, a register 45, a flag check unit 49, a pattern connecting unit 50, an adder 47 and a pattern register 48. Since the process up to the examination of presence or absence of a high frequency component in the voice signal is the same as the embodiment shown in FIGS. 17 and 18, the description will be had for the subsequent process for the present embodiment. In the first place, a flag is raised depending on whether or not a high frequency component is present at the beginning or end of the voice interval and the pattern is stored into the register 45 together with the flag. Upon completion of producing all of the voices for the same word, it is checked whether or not there are voice patterns having a different flag. In this case, if all of the voice patterns have a flag or no flag, averaging of the voice patterns is carried out as they are. Otherwise, the high frequency component portion of the pattern having a flag is added to the beginning or end of the pattern having no flag, and, then, after carrying out an averaging process, the averaged pattern is registered into the pattern register 48. The pattern thus obtained is compensated for its lost portion and thus high in quality. Thus, in accordance with the present embodiment, even if a pattern has been lost partly, a normal reference pattern high in quality can be formed and registered.

Figure 29:
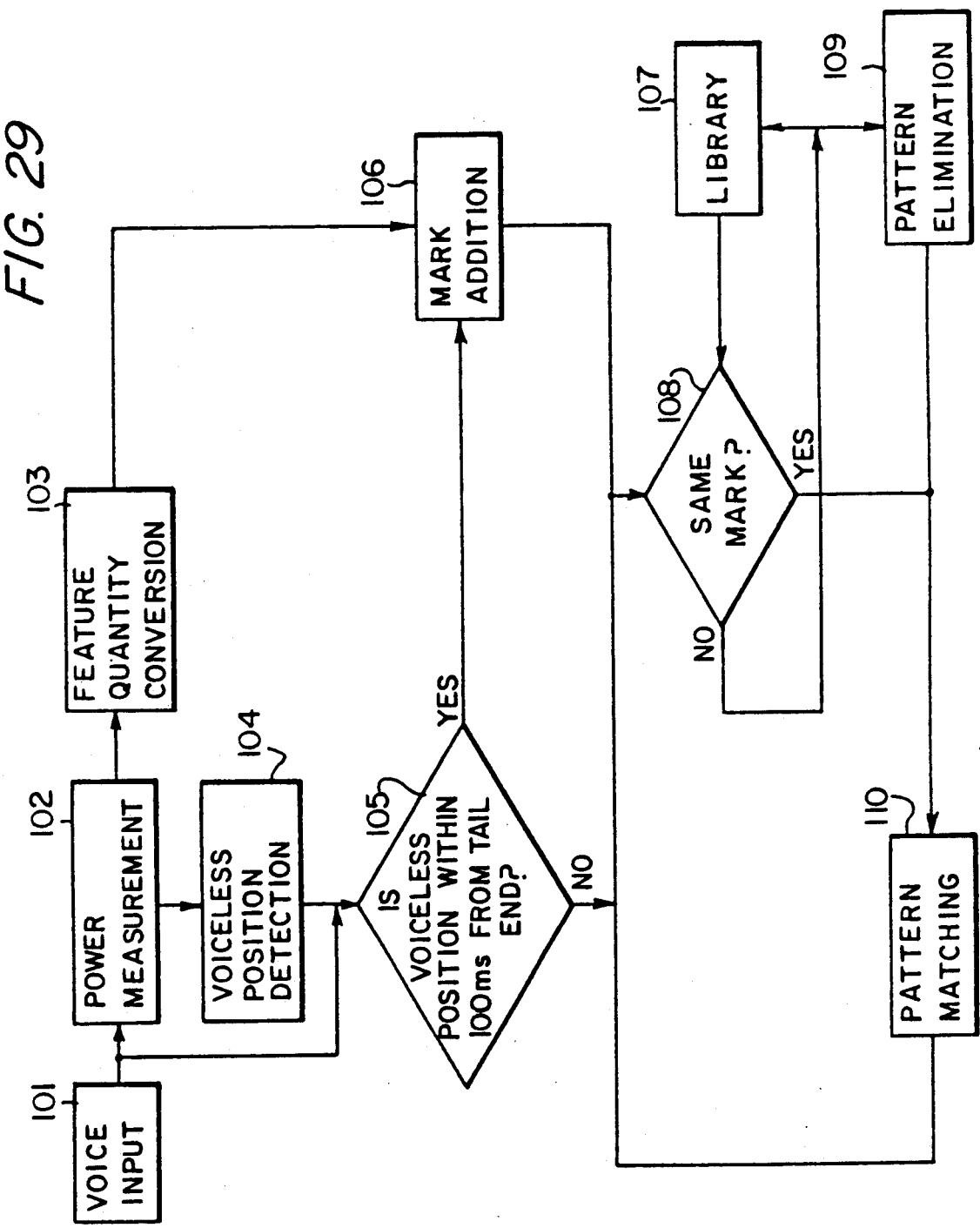
FIG. 29 is a schematic illustration showing mostly in block form a voice pattern, processing system.
Figure 30A:
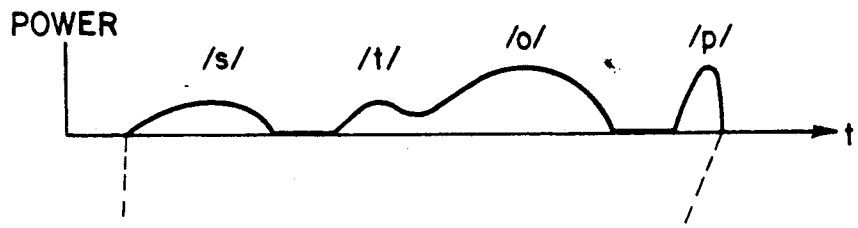
FIGS. 30a through 30c are illustrations which are useful for explaining the operation of the system shown in FIG. 29.
Figure 30B:
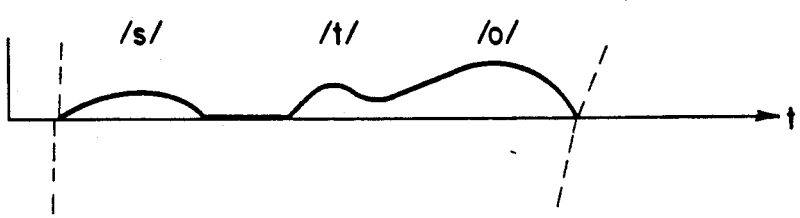
Figure 30C:
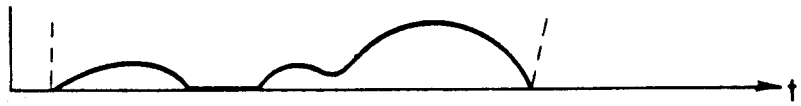
Figure 32A:
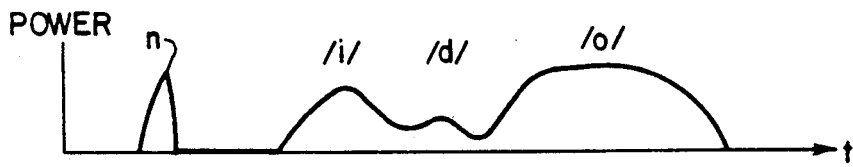
FIGS. 32a through 32c are illustrations which are useful for explaining the operation of the system shown in FIG. 31.
Figure 32B:
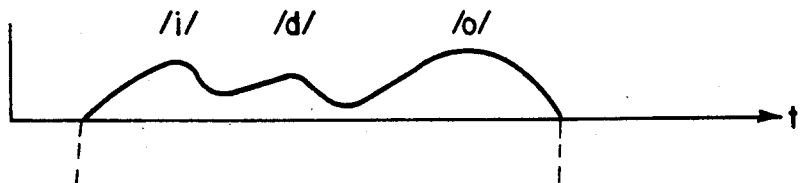
Figure 32C:
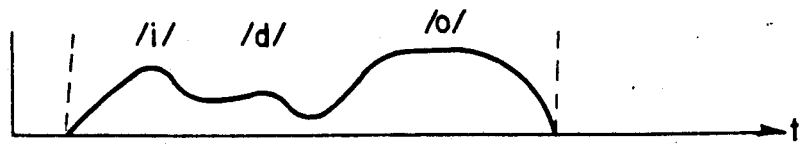

A further aspect of the present invention will now be described below. As described previously, in forming a voice pattern, there is a case in which an undesired noise component is introduced and also a case in which part of voice information is lost. For example, in the case of a word having a consonant which is pronounced independently, such as /stop/, the last sound /p/ tends to be lost and cannot be picked up. FIGS. 28a and 28b illustrate one example of carrying out matching for a word, such as /stop/. FIG. 28a illustrates a reference pattern and FIG. 28b illustrates an input pattern. The reference pattern shown in FIG. 28a defines a voice pattern for the entire word accurately; on the other hand, the input pattern shown in FIG. 28b has lost the last sound /p/. Thus, when these two patterns are compared for matching, the last sound /p/ of the reference pattern shown in FIG. 28a is made correspondence with the last sound /o/ of the input pattern shown in FIG. 28b. For this reason, the degree of similarity between these patterns is degraded, which could cause an erroneous recognition. In order to cope with such a problem, there may be provided such methods and systems shown in FIGS. 28 through 32 which exactly coincide in structure with FIGS. 1 through 4 which have been described in detail above. Since the system shown in FIG. 29 coincides exactly with the system shown in FIG. 1 and the system shown in FIG. 31 coincides exactly with the system shown in FIG. 3 with the exception of adding number "100" to the reference numerals, the description will not be repeated here. Using the methods implemented in the systems shown in FIGS. 29 and 31, the accuracy of pattern matching can be enhanced However, in such a pattern comparing method, the adverse effects may be produced for a sound which sometimes has an increased level of energy and sometimes has a decreased level of energy, such as /b/ sound. FIGS. 27a and 27b show an example of word /onbu/, meaning piggyback in Japanese, in which the pattern shown in FIG. 27a has sound /b/ whose energy has not decreased significantly; on the other hand, the pattern shown in FIG. 27b has sound /b/ whose energy has decreased significantly. In such a case, in accordance with the method applied to the systems shown in FIGS. 29 and 31, the portion /bu/ of this pattern will be discarded for matching.

Under the circumstances, in accordance with this aspect of the present invention, when comparing two patterns, it is checked whether or not there is a minimum in energy in the vicinity of the beginning or the end of each of the patterns, and, if such an energy minimum is present only in one of the two patterns, that portion of such a pattern having an energy minimum between the minimum and the end is eliminated. And, if the result obtained by multiplying a real number equal to 1 or less to the pattern length of the pattern having no such energy minimum is longer than the pattern length of the other pattern, it is treated in the same manner as that having no energy minimum, or, alternatively, if the result obtained by multiplying a real number equal to 1 or larger to the pattern length of the pattern having an energy minimum is shorter than the pattern length of the other pattern, it is treated in the same manner as that having no energy minimum.

Figure 23:
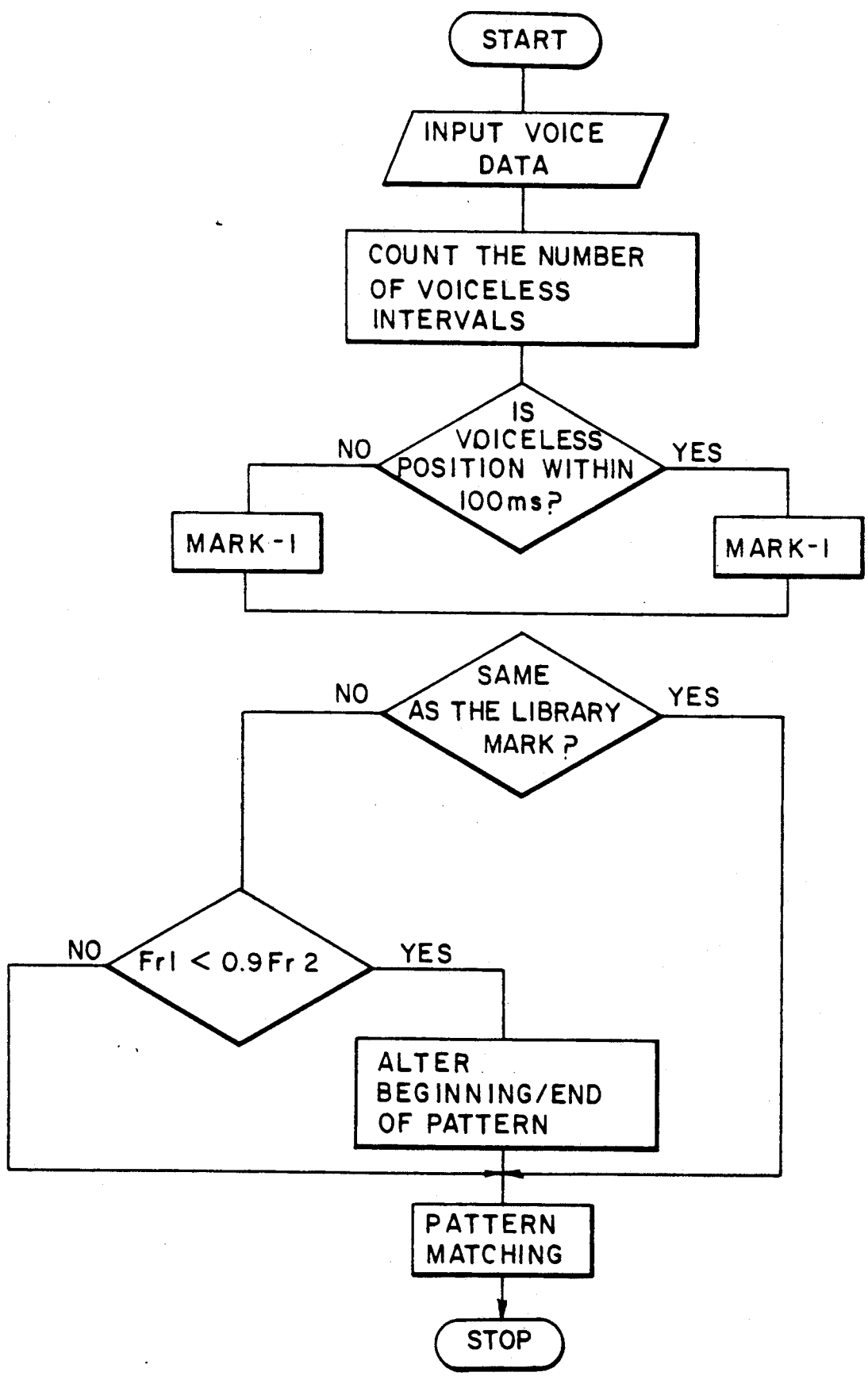
FIG. 23 is a flow chart showing a sequence of steps of a pattern comparing method constructed in accordance with a still further embodiment of the present invention.
Figures 24, 24A:
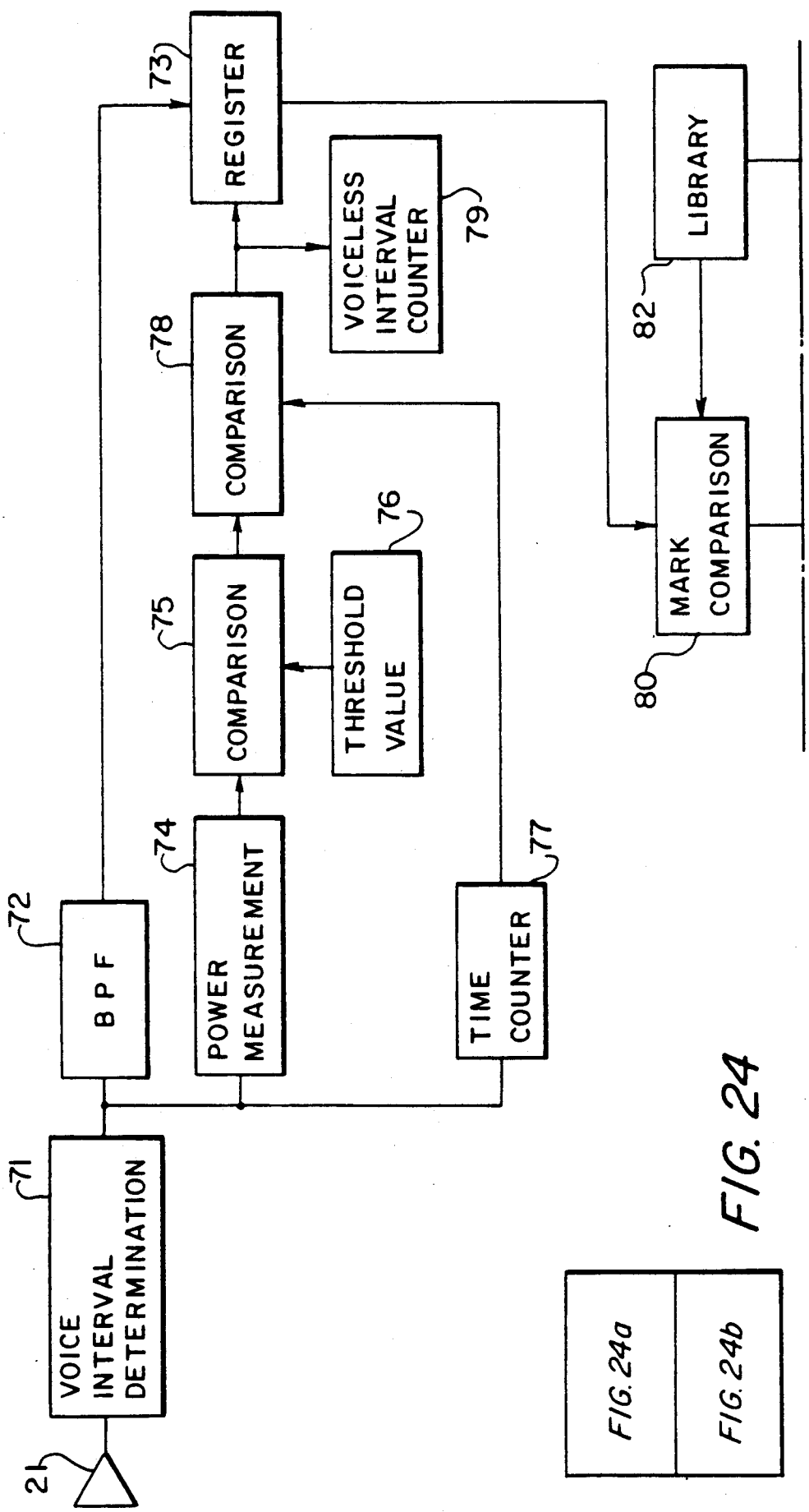
FIG. 24 is an illustration showing how to combine FIGS. 24a and 24b.
FIGS. 24a and 24b, when combined as shown in FIG. 24, define a schematic illustration showing mostly in block form a voice recognition system constructed to implement the method shown in FIG. 23.
Figure 24B:
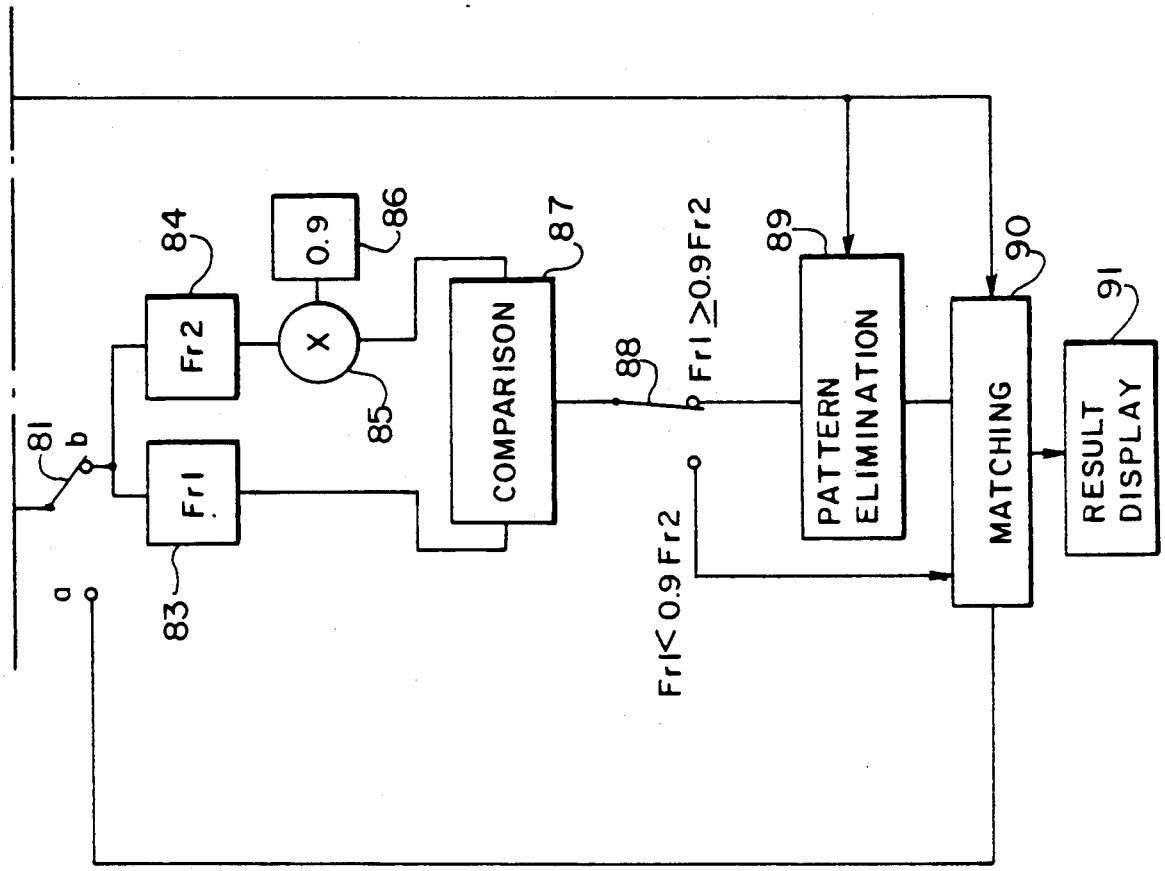

Referring now to FIG. 23, there is shown a flow chart showing a sequence of steps of a pattern comparing method constructed in accordance with a still further embodiment of the present invention, and FIG. 24 illustrates a pattern comparing system suitable for realizing the method shown in FIG. 23. As shown, the illustrated pattern comparing system includes a microphone 21, a voice interval determining unit 71, a bandpass filter bank 72, a register 73, a voice power measuring unit 74, a comparator 75, a threshold value generating unit 76, a time counter 77, a comparator 78, a voiceless interval counter 79, a mark comparator 80, a turn-over switch 81, a library 82, frame length units 83 and 84, a multiplier 85, a multiplying constant setting unit 86, a comparator 87, a turn-over switch 88, a pattern eliminating unit 89, a matching unit 90 and a display unit 91. If a noise component has been introduced into an input voice, the pattern length becomes longer as compared with the pattern length of a normal pattern; however, in accordance with the present embodiment, attention is directed to the fact that the pattern length does not become so larger in the case shown in FIG. 27.

Described in detail with reference to FIGS. 23 and 24, the power of a voice input into the microphone 21 is measured by the voice power measuring unit 74, whereby the position of a voiceless interval in the voice is detected. And, a mark to be assigned to the voice differs depending on whether or not such a voiceless interval is located within 100 msec. from the beginning of the voice interval. By taking out a library or reference pattern which has been registered with the addition of such a mark, it is checked whether or not the mark of the reference pattern is the same as that of the input pattern. And if the two marks are the same, the turn-over switch 81 is turned to contact a to thereby carry out an ordinary pattern matching process. On the other hand, if the two marks differ, the turn-over switch 81 is turned to contact b to thereby supply the two patterns to respective frame length comparators 83 and 84 wherein the frame length having a voiceless interval mark is set as Fr1 and the frame length having no such mark is set as Fr2. And, then, pattern elimination is carried out only when the condition of Fr1 being smaller than $0.9 \times Fr2$ has been satisfied, and, then, pattern matching is carried out. With this, when a necessary sound has been eliminated from such a pattern as shown in FIG. 27, the pattern length becomes shorter to thereby satisfy the condition of Fr1 being smaller than $0.9 \times Fr2$, thereby bypassing the pattern elimination unit 89. On the other hand, if a noise component has been added, the pattern length has been extended by the addition of such a noise component, so that the condition of Fr1 being smaller than $0.9 \times Fr2$ is not satisfied, and, thus, it proceeds to the pattern eliminating unit 89 to carry out a required pattern elimination before matching.

Figure 25:
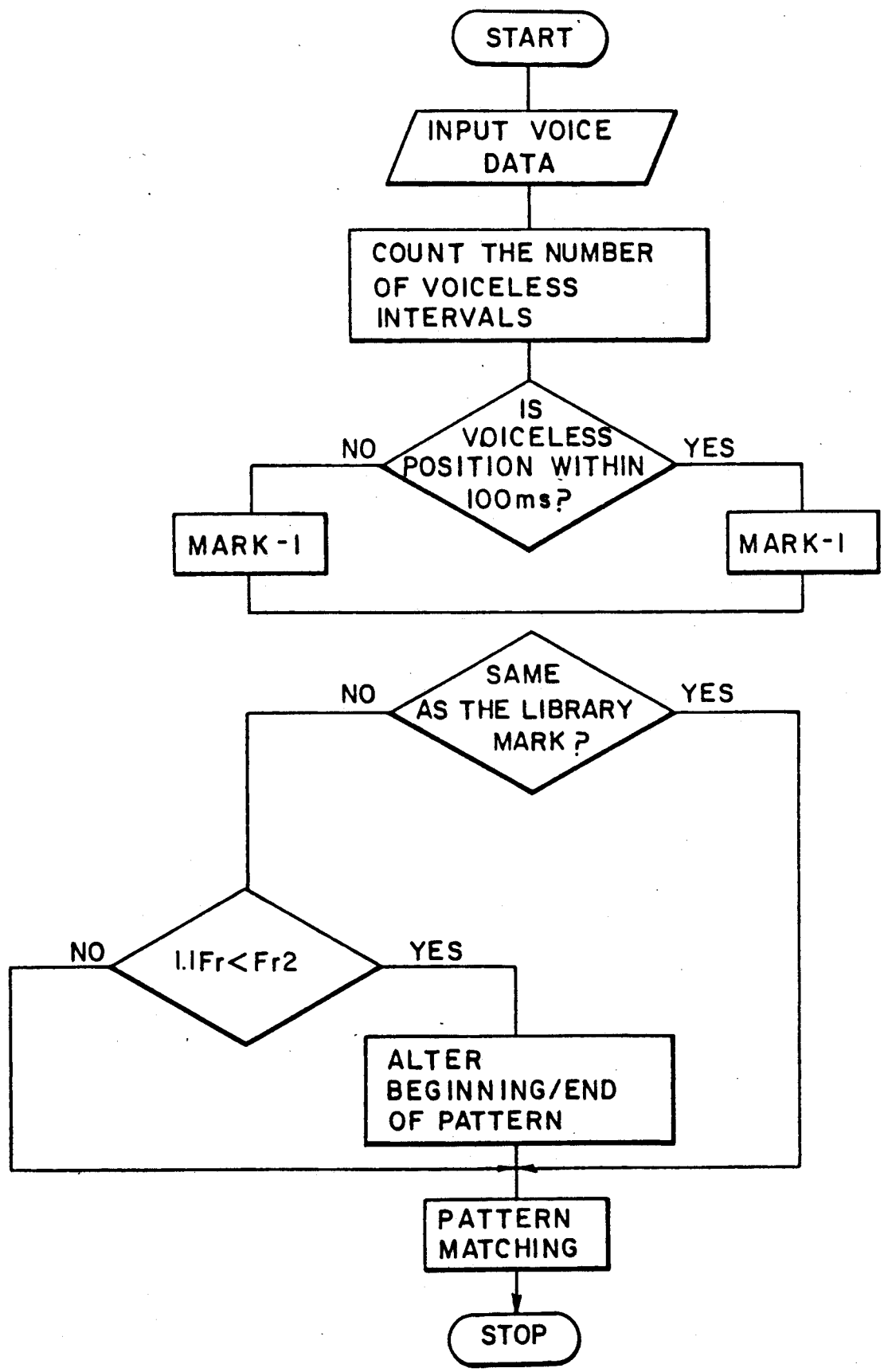
FIG. 25, is a flow chart showing a sequence of steps of a pattern comparing method which is a modification of the method shown in FIG. 23.
Figure 26B:
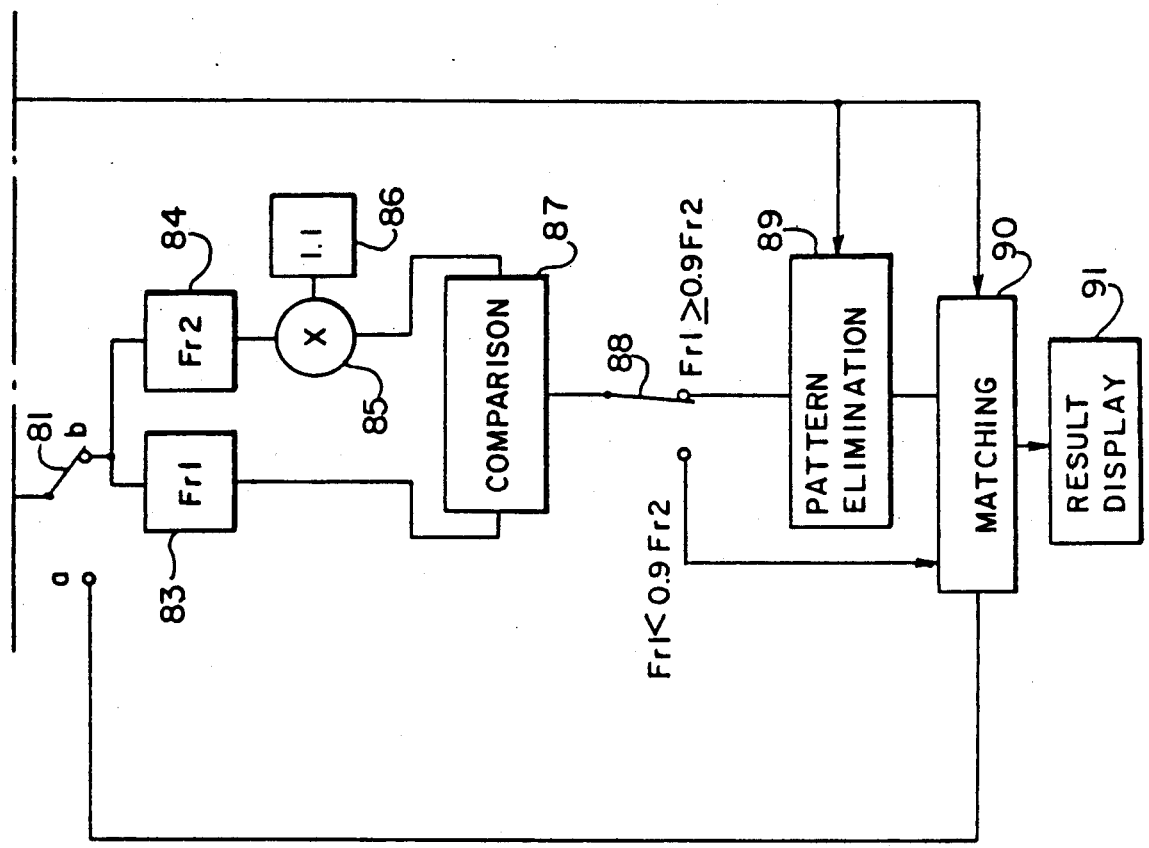

FIGS. 25 and 26 show another embodiment of this aspect of the present invention which is basically the same as the previously described embodiment shown in FIGS. 23 and 24. FIG. 25 illustrates a flow chart of a pattern comparing method of this embodiment, and FIG. 26 shows mostly in block form a pattern comparing system suitable for implementing the method shown in FIG. 25. Since the present embodiment is structurally very similar to the previously described embodiment shown in FIGS. 23 and 24, like numerals indicate like elements. In the present embodiment shown in FIGS. 25 and 26, a predetermined real number equal to 1 or larger (in the illustrated embodiment, 1.1 is set in the multiplying constant setting unit 86) is multiplied to the pattern length of the pattern having an energy minimum, and if the result of such multiplication is shorter than the pattern length of the other pattern, it is treated in the same manner as the pattern having no energy minimum. In the illustrated embodiment, if the result of multiplying 1.1 to a pattern having a voiceless interval, i.e., pattern possibly added with a noise component, is shorter than a pattern having no voiceless interval, then this voiceless interval is determined not to be a noise component, so that no pattern elimination process is carried out. In this manner, in accordance with this aspect of the present invention, a pattern to which distinctions between noise and voice information is difficult is automatically discriminated to thereby eliminate the noise information, so that it allows to carry out pattern matching at high accuracy.

Now, a still further aspect of the present invention will be described below. In accordance with this aspect of the present invention, there is provided a pattern comparing method and system in which pattern matching is carried out with an input pattern having a noise component by eliminating such a noise component and a recognition calculation can be initiated at a point in time prior to the completion of inputting of an input voice to be recognized. That is, in order to attain such an objective, in comparing two patterns, it is first checked whether or not an energy minimum is present with a predetermined range from the front end (beginning) or rear end of each of the patterns. And, if such an energy minimum is present only in one of the patterns, that portion of the pattern having an energy minimum between the energy minimum and the front or rear end of the pattern is eliminated, and, then, the two patterns are compared. And, at a point in tim after inputting the pattern for a predetermined time period subsequent to detection of the front end of a voice, it is determined whether or not the energy minimum at the front end of the pattern is to be eliminated, and, thereafter, it is determined whether or not the energy minimum at the rear end of the pattern is to be eliminated.

Figure 33B:
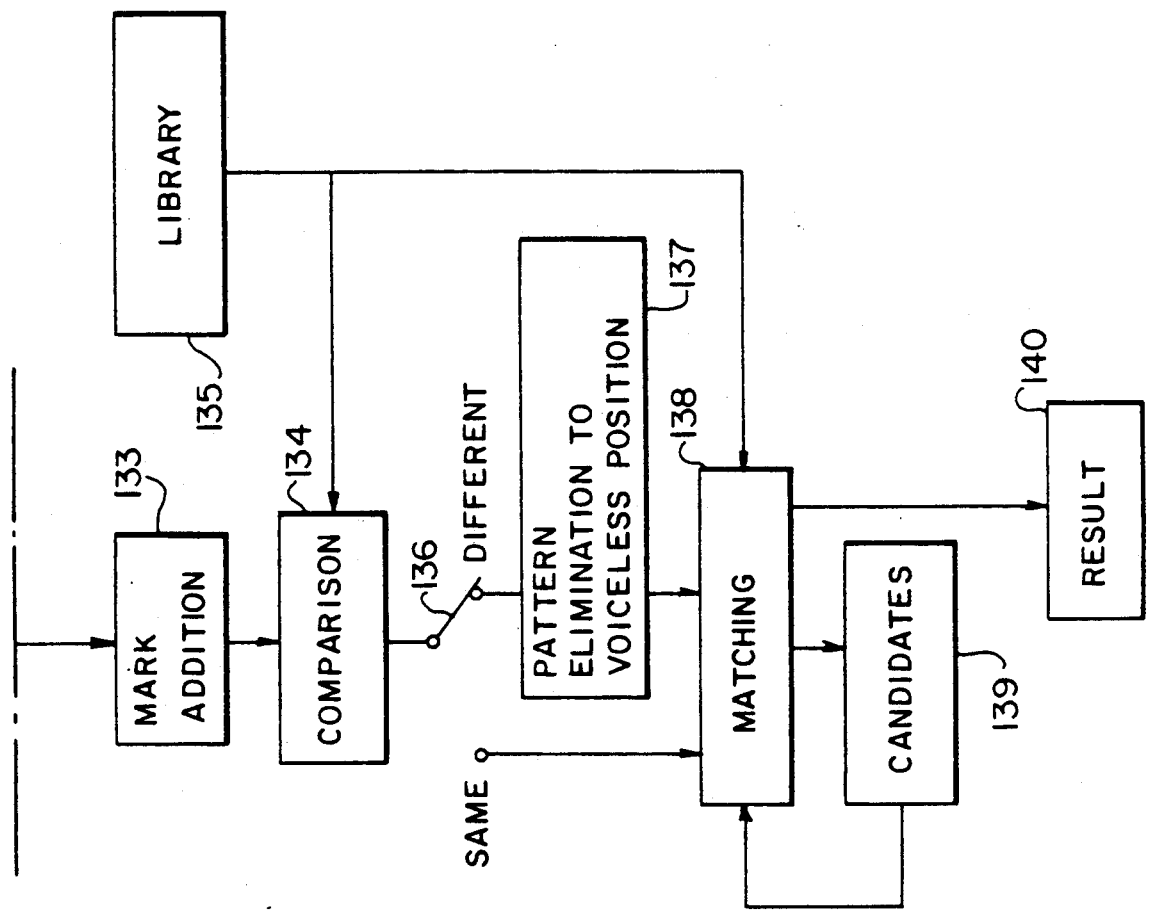
Figure 34B:
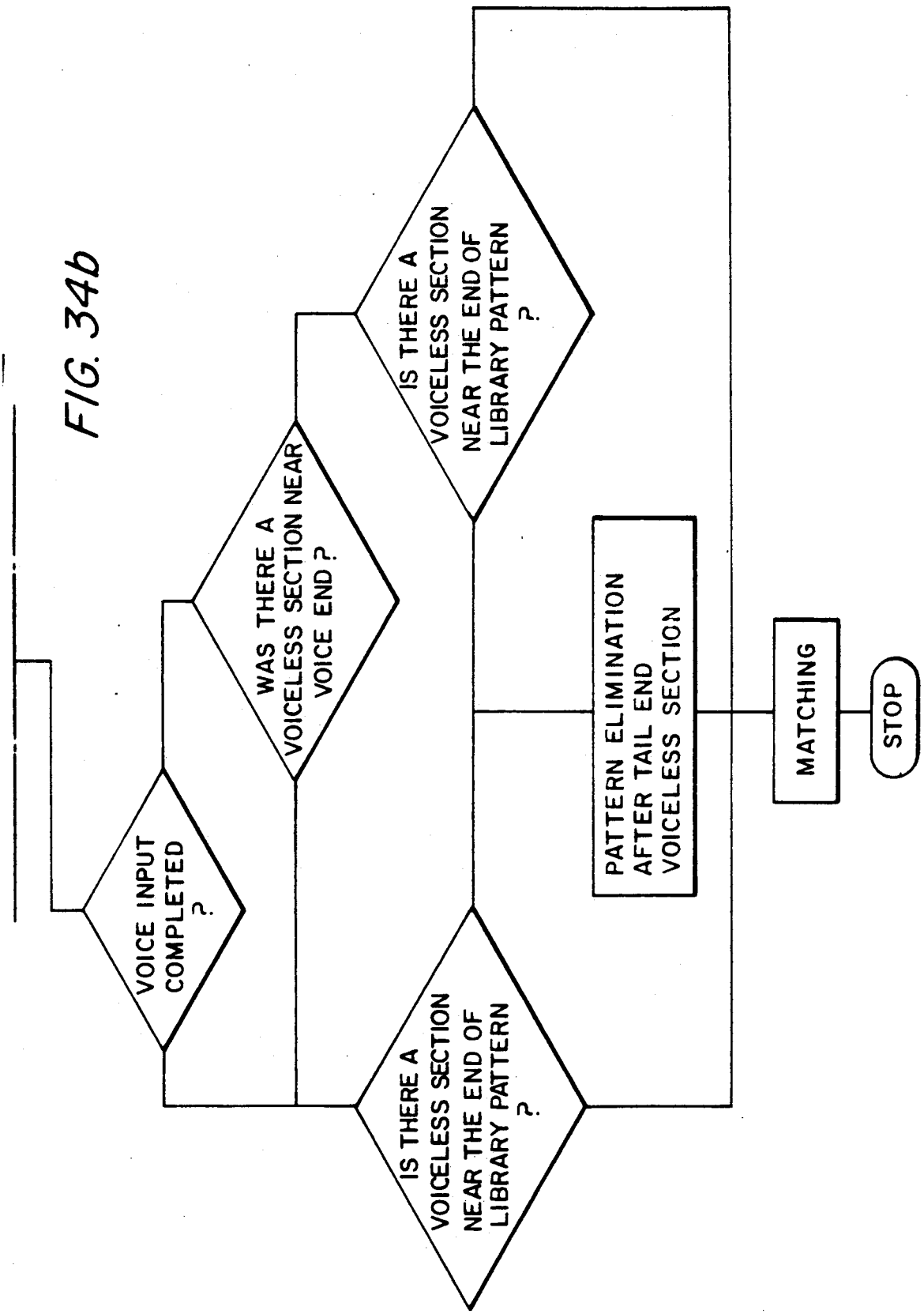

Referring now to FIG. 33, there is shown mostly in block form a voice recognition system constructed in accordance with a still further embodiment of this aspect of the present invention. FIG. 34 shows a flow chart which is useful for understanding the operation of the voice recognition system shown in FIG. 33. As shown, the illustrated voice recognition system includes a microphone 21, a band-pass filter bank 72, a voice interval detecting unit 71, a register 73, a voice energy detecting unit 124, a comparator 125, a threshold value generating unit 126, a voiceless counter 127, a time counter 128, comparators 129 and 130, a time returning unit 131 (e.g., returning to a point in time 100 msec. before), a predetermined time generating unit 132, a mark adding unit 133, a comparator 134, a library 135, a turn-over switch 136, a pattern eliminating unit 137 for eliminating up to a voiceless section, a matching unit 138, a candidate selecting unit 139, and a display unit 140. In the present embodiment, the vicinity of the front or rear end of a pattern is determined to be within 100 msec. In the first place, a voice is input into the microphone 21 to produce a voice signal which is then converted into a feature quantity. In the present embodiment, the frequency spectrum of the voice signal produced by having the voice signal processed through the band-pass filter bank 72 is used as the feature quantity. Then, the voice interval is detected, and the input, unknown pattern thus input is stored in the register 73, and, at the same time, the time which has elapsed from the time of detection of the front end (beginning) of the voice interval is counted by the time counter 128.

In addition, the energy of the voice interval is determined, and, if this energy is smaller than the threshold value, it is regarded as part of a voiceless interval, so that its position and number are stored in the voiceless counter 127. Then, when the time counter 127 has reached 100 msec., a mark of −1 is added if there has been a voiceless interval so far and a mark of 1 is added if there has been no voiceless interval so far. Simultaneously with the addition of a mark, a reference pattern is taken out of the library 135 so as to carry out a preliminary matching process with the reference patterns stored in the library 135. It is to be noted that each of the reference patterns stored in the library 135 also has a mark −1 or 1 depending on whether or not a voiceless interval is present at the front or rear end of a voice. Then, it is first compared whether or not the reference pattern taken out of the library 135 has the same mark as that of the input pattern. And, if the two marks are the same, since a voiceless interval is present in each of the two patterns, the preliminary matching process is carried out as they are. Such a preliminary matching can be carried out, for example, by comparing predetermined portions of the two patterns. On the other hand, if the two marks differ, that portion of the pattern having a voiceless interval between the front end and the voiceless interval is eliminated, and, then, the preliminary matching process is implemented to select candidate reference patterns.

On the other hand, if the predetermined time period of 100 msec. or more have elapsed from the front end of a voice, the value which has been returned to a point in time over 100 msec. from the current point in time is determined, and it is checked whether or not a voiceless interval has existed over the last 100 msec. at the same time with a termination signal of the voice, and a mark of −1 or 1 is added depending on whether a voiceless interval has been present or not in a manner similar to the case for the front end of the pattern. And, the remaining operation which has been carried out for the front end of the pattern is also carried out for the tail end of the pattern, and a portion of the pattern is eliminated if necessary, and the final matching process is carried out for the candidate reference patterns which have been previously selected.

Figures 43A, 43B:
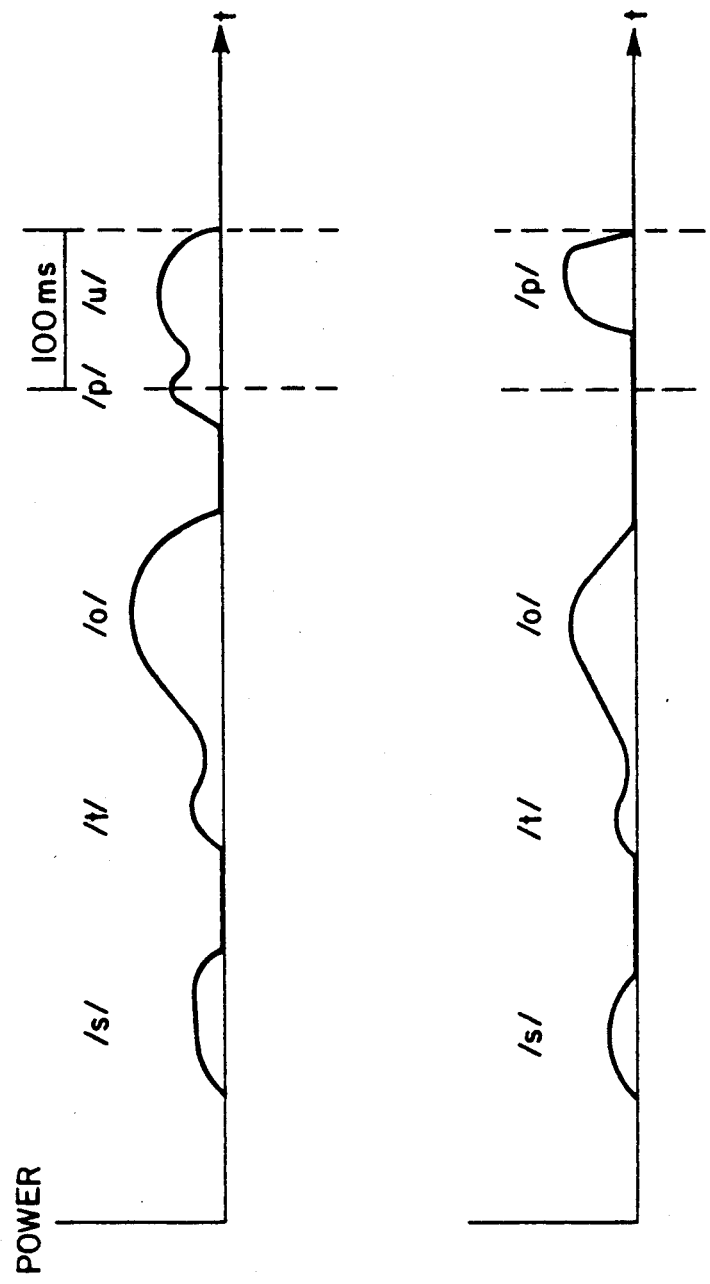
FIGS. 43a and 43b are illustrations which are useful for explaining the problems to be solved by a further aspect of the present invention.

A still further aspect of the present invention will now be described in detail below. In the previously described embodiment of the present invention, there is provided a pattern comparing method and system in which a threshold value, such as 100 msec., is used to check whether or not an energy minimum is present in the vicinity of the front end (beginning) of a voice pattern. In such a case, if an energy minimum is present at 110 msec, a mark indicating the absence of energy minimum is assigned. On the other hand, if an energy minimum is present at 90 msec. in the other pattern, this minimum is eliminated before matching. As a result, there is a possibility of carrying out improper matching. Described more in detail with this respect with reference to FIGS. 43a and 43b, for the pattern shown in FIG. 43a, it will be determined that no power minimum is present in the vicinity of the tail end of the pattern. On the other hand, for the pattern shown in FIG. 43b, it will be determined that a power minimum is present in the vicinity of the tail end of the pattern. As a result, the last sound /p/ of the pattern shown in FIG. 43b is eliminated before the pattern shown in FIG. 43b is compared with the pattern shown in FIG. 43a for matching. This will lead to improper matching.

This aspect of the present invention is particularly directed to solve such a problem associated with the previously described embodiment to thereby allow to carry out matching between two patterns properly. In other words, in accordance with this aspect of the present invention, in comparing two patterns, it is first checked whether or not an energy minimum is present in the vicinity of the front or tail end of each of the patterns. If such an energy minimum is present in only one of the patterns, that portion of the pattern having an energy minimum between the minimum and the front or tail end is eliminated from the pattern, and, then, comparion between the two patters is carried out. On the other hand, if a plurality of minimums are present, the length between the first minimum and the second minimum of a first pattern is compared with the length between the front end and the first minimum and the length between the first minimum and the second minimum of a second pattern, and only if the pattern length difference with the latter is shorter, that portion of the second pattern between the front end and the first minimum is eliminated, and, then matching between the first and second patterns is carried out.

Figure 35:
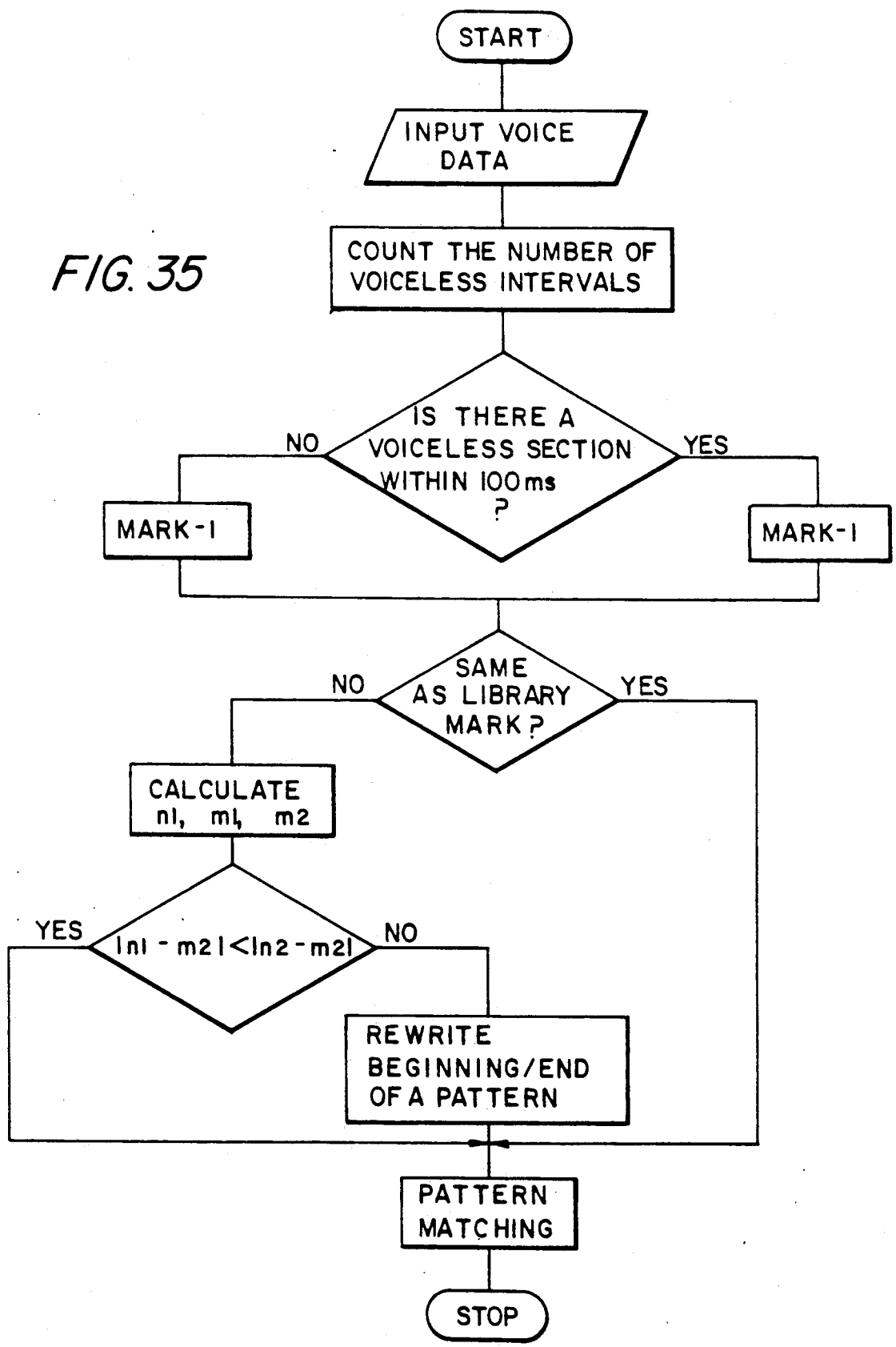
FIG. 35 is a flow chart showing a sequence of steps of a pattern comparing method constructed in accordance with a still further embodiment of the present invention.
Figure 36B:
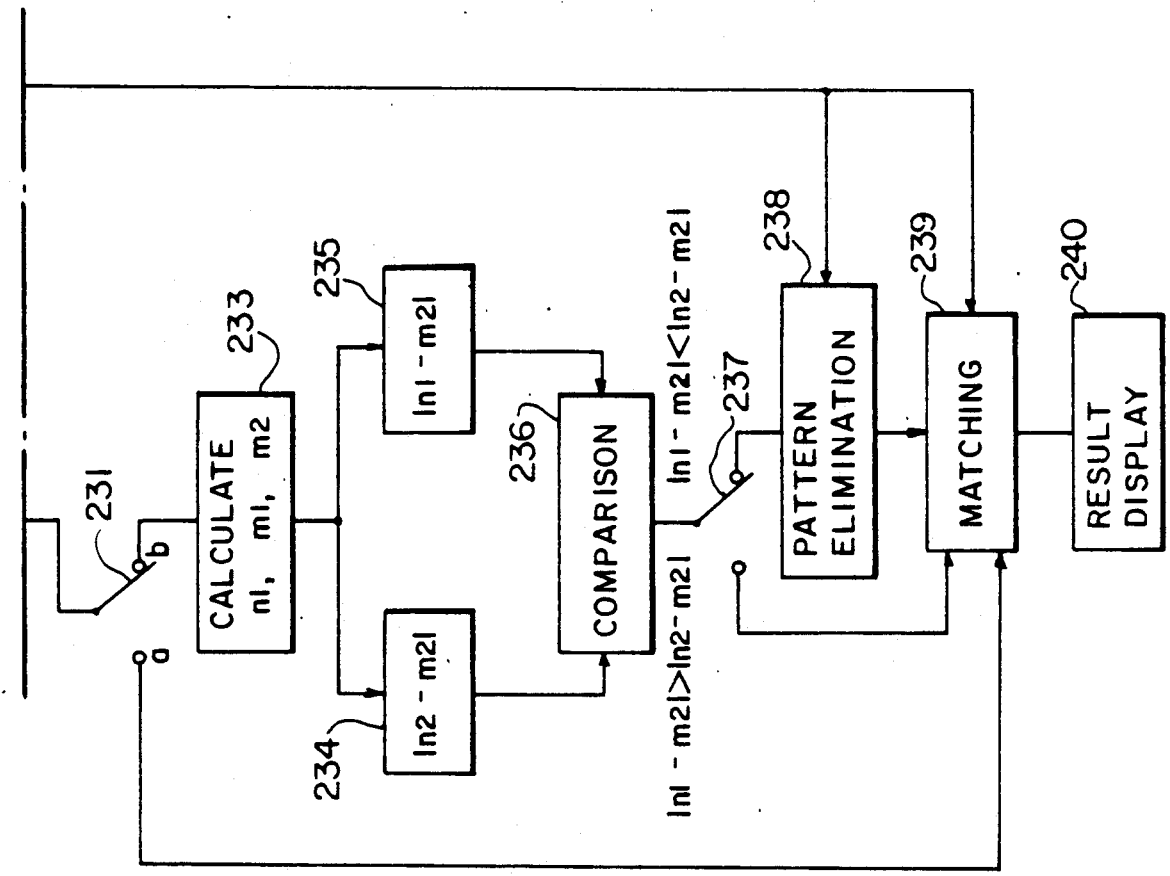

Referring now to FIG. 35, there is shown a flow chart showing a pattern comparing method constructed in accordance with a still further embodiment of this aspect of the present invention. FIG. 36 shows mostly in block form a voice recognition system constructed to implement the method shown in FIG. 35. As illustrated, the present voice recognition system includes an acoustic-electro transducer 21, such as a microphone, a voice interval detecting unit 71, a band-pass filter bank 72, a register 73, a voice power measuring unit 242, a comparator 225, a threshold value generating unit 226, a time counter 227, a comparator 228, a voiceless interval counter 229, a mark comparator 230, a turn-over switch 231, a library 232, arithmetic units 233, 234 and 235, a comparator 236, a turn-over switch 237, a pattern eliminating unit 238, a matching unit 239, and a display unit 240.

FIGS. 41a and 41b illustrate two examples of a voice pattern when a word "mitaka" is pronounced in Japanese. In this case, length between the second and third minimums of the pattern of FIG. 41a is compared with length n1 between the front end and the first minimum of the pattern of FIG. 41b and also with length n2 between the first and second minimums of the pattern of FIG. 41b. And, if the absolute value of the difference (n1−m2), is larger than the absolute value of the difference (n2−m2), then it is determined that the minimum which ought to be present within 100 msec from the front end, which may be regarded as the vicinity of the front end, has been extended beyond the range of 100 msec., and, thus, the two patterns are determined to be normal and compared as they are. On the other hand, if the absolute value of the difference (n1−m2) is larger than the absolute value of the difference (n2−m2), then it is determined that a sound which ought to be present in front of n1 has been lost, and, thus, the front end portion of the pattern of FIG. 41a is eliminated and then the two patterns are compared for matching.

Described with reference to FIGS. 35 and 36, when a voice pronounced is input into the microphone 21, there is produced a corresponding voice signal, and the power of the voice is measured by the voice power measuring unit 224 to thereby detect a voiceless interval. And, a different mark is assigned to the voice depending on whether such a voiceless interval is present within 100 msec. from the front end (beginning) of the voice. A reference pattern which has been registered in the library 232 and to which a similar mark has been assigned is taken out of the library 232 and it is checked whether the reference pattern has the same mark as that of the input pattern. If the two patterns have the same mark, the turn-over switch 231 is turned to contact a to thereby carry out an ordinary pattern matching process. On the other hand, if the two marks differ, the turn-over switch 231 is turned to contact b to thereby carry out the calculations as described above.

Figures 42A, 42B:
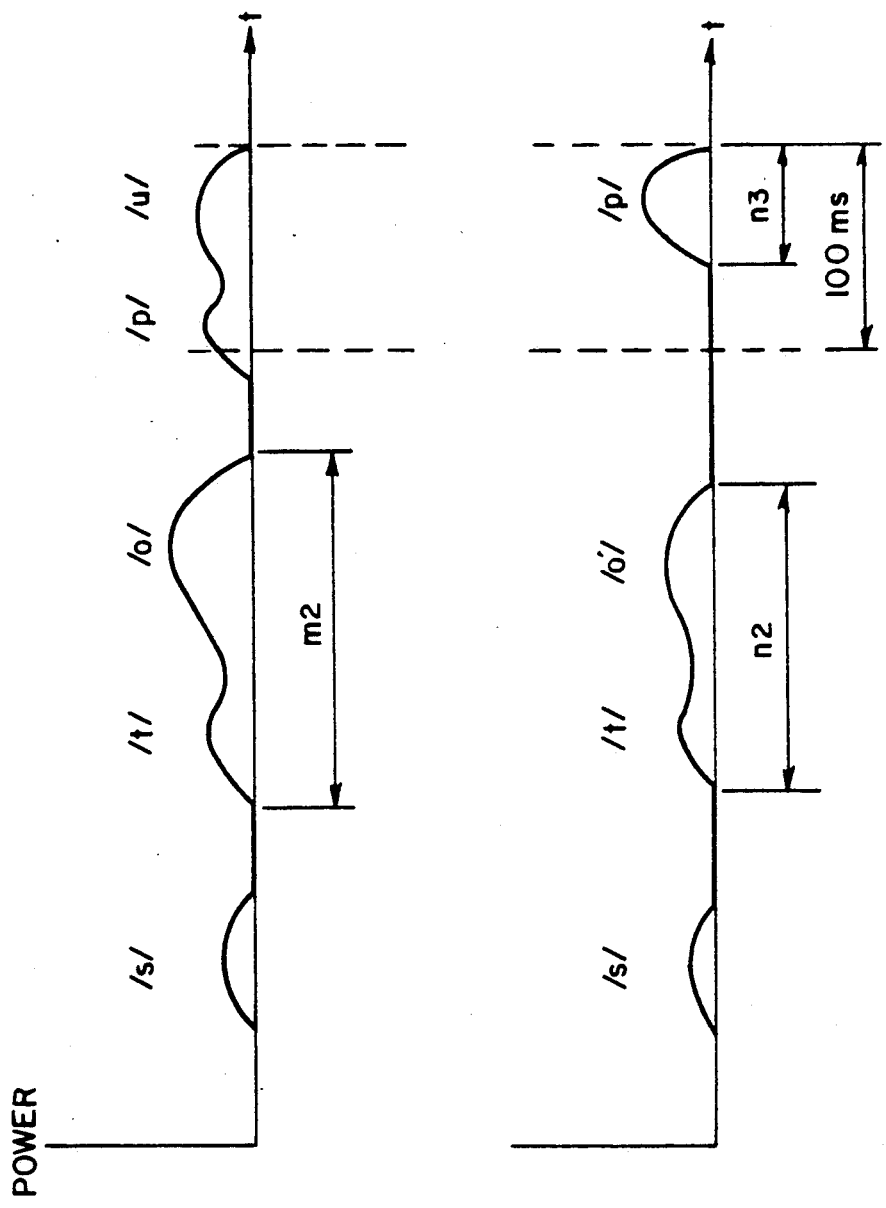

For example, as shown in FIG. 41, if the reference pattern (e.g., pattern shown in FIG. 41a) differs from the input pattern (e.g., pattern shown in FIG. 41b), values of n1, n2 and m2 are calculated at the arithmetic units 233, 234 and 235, and then a determination is made whether or not to proceed to the pattern eliminating unit 238 depending on the magnitude relationship between the absolute value of (n1−m2) and the absolute value of (n2−m2). In the above, it has been described as to the case of the voice front end; on the other hand, in the case where a noise component has been added at the tail end of a voice or a sound has been lost at the tail end of a voice, such an addition of noise component or loss of a sound at the tail end of a voice can be carried out in the following manner. If m number of minimums are present in the first pattern and n number of minimums are present in the second pattern, the length between the (m−1)th and mth minimums of the first pattern is compared with the length between the nth minimum and the tail end of the second pattern. And, only if the pattern length difference with the latter is smaller, that portion of the second pattern between the nth minimum and the tail end is eliminated before matching these two patterns. In the example shown in FIG. 42, each pattern has two voiceless intervals; however, a mark to be assigned differs between the pattern of FIG. 42b, in which a voiceless interval is located within 100 msec. from teh terminal end of the voice, and the pattern of FIG. 42a, in which a voiceless interval is not present within 100 msec. from the tail end of the voice. For this reason, under normal conditions, the last sound /p/ of the pattern shown in FIG. 42b is eliminated. However, in accordance with the present invention, length m2 of the pattern of FIG. 42a is compared with lengths n2 and n3 of the pattern of FIG. 42b, and only if the absolute value of the difference (n2−m2) is larger than the absolute value of the difference (n3−m2), it proceeds to the pattern eliminating unit 238 where the last sound /p/ of the pattern shown in FIG. 42b is eliminated.

Figure 37:
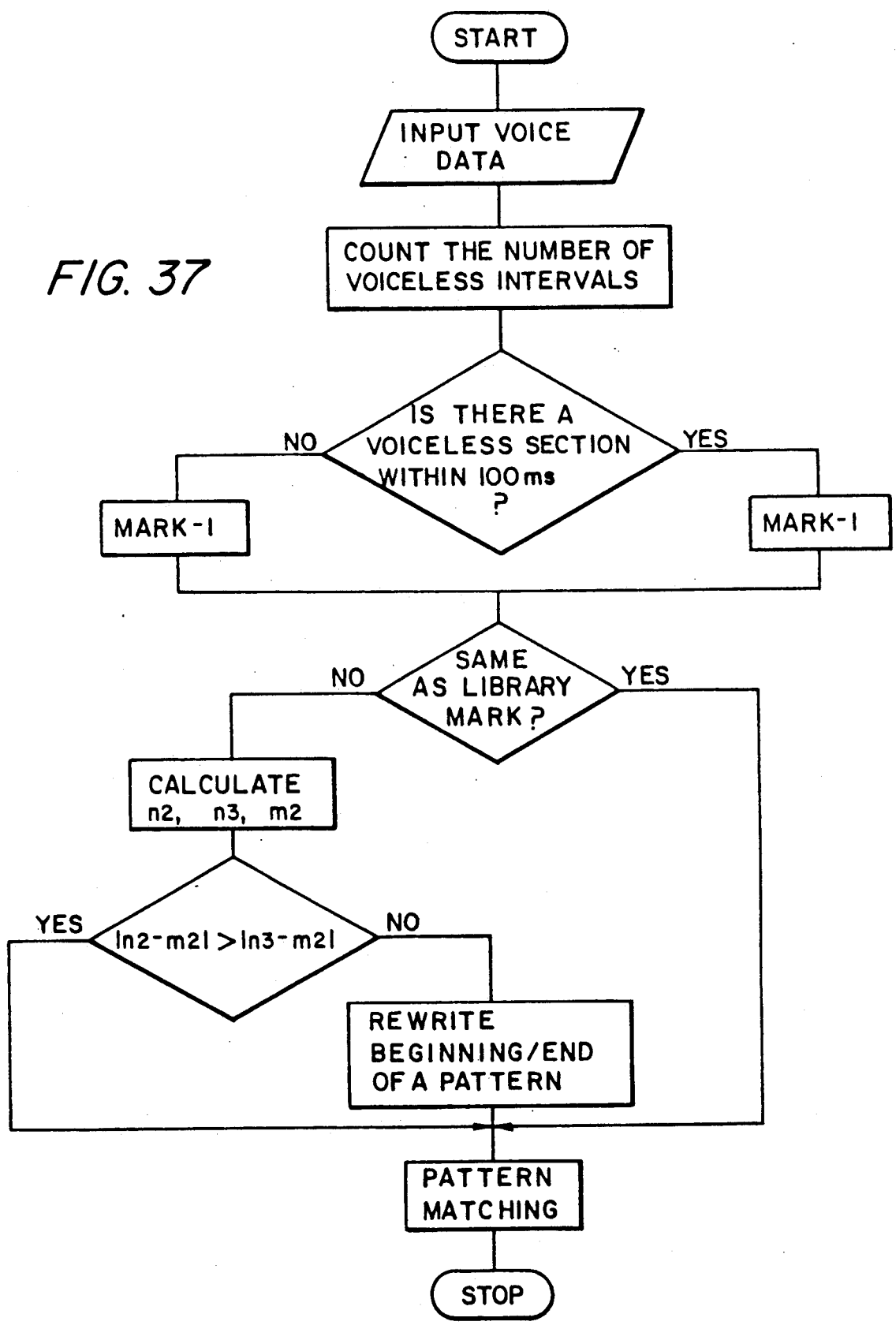
FIG. 37 is a flow chart showing a sequence of steps of a pattern comparing method constructed in accordance with a still further embodiment of the present invention.
Figures 38, 38A:
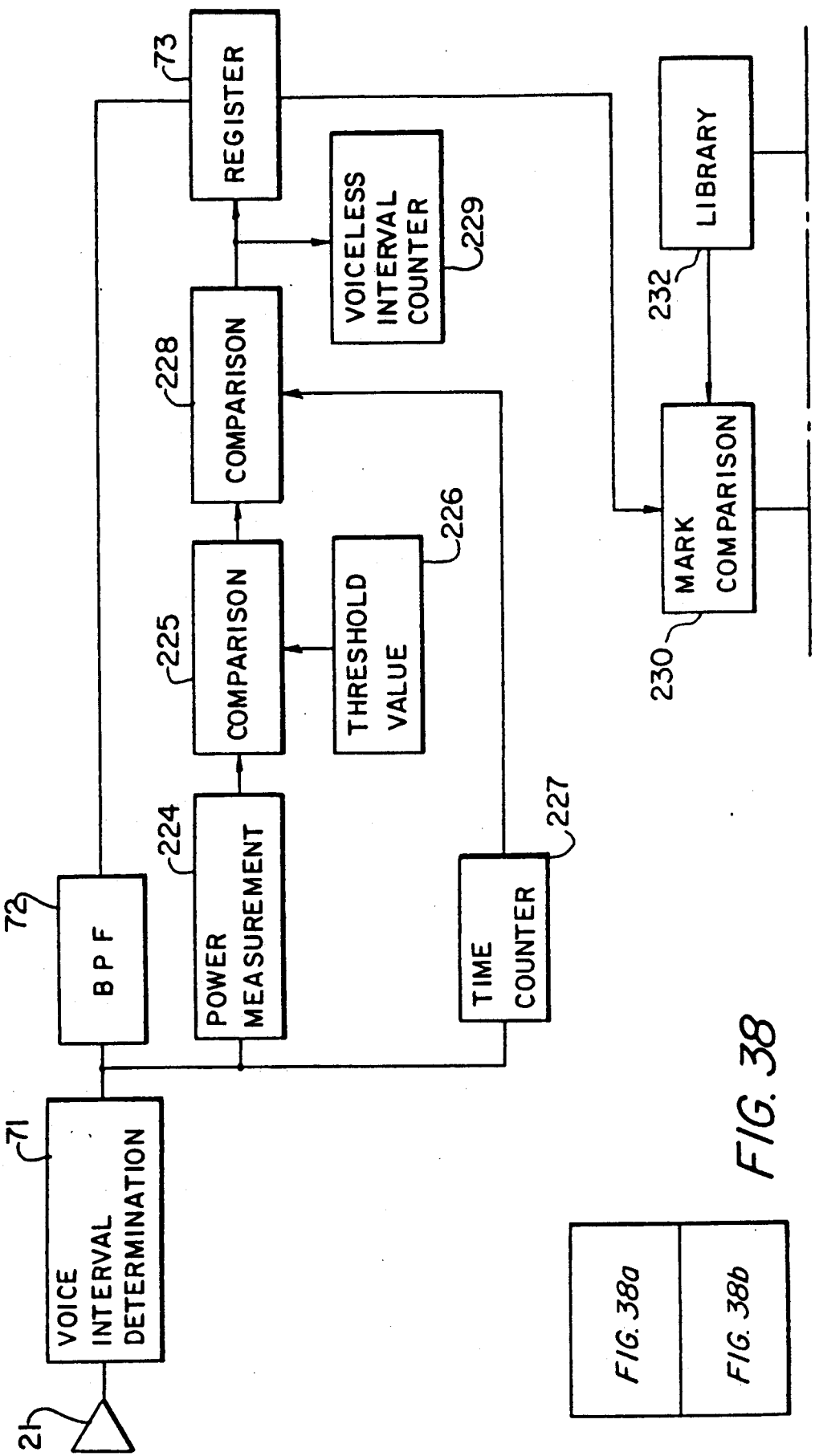
FIG. 38 is an illustration showing how to combine FIGS. 38a and 38b.
FIGS. 38a and 38b, when combined as shown in FIG. 38, define a schematic illustration showing mostly in block form a voice recognition system constructed to implement the method shown in FIG. 37.
Figure 38B:
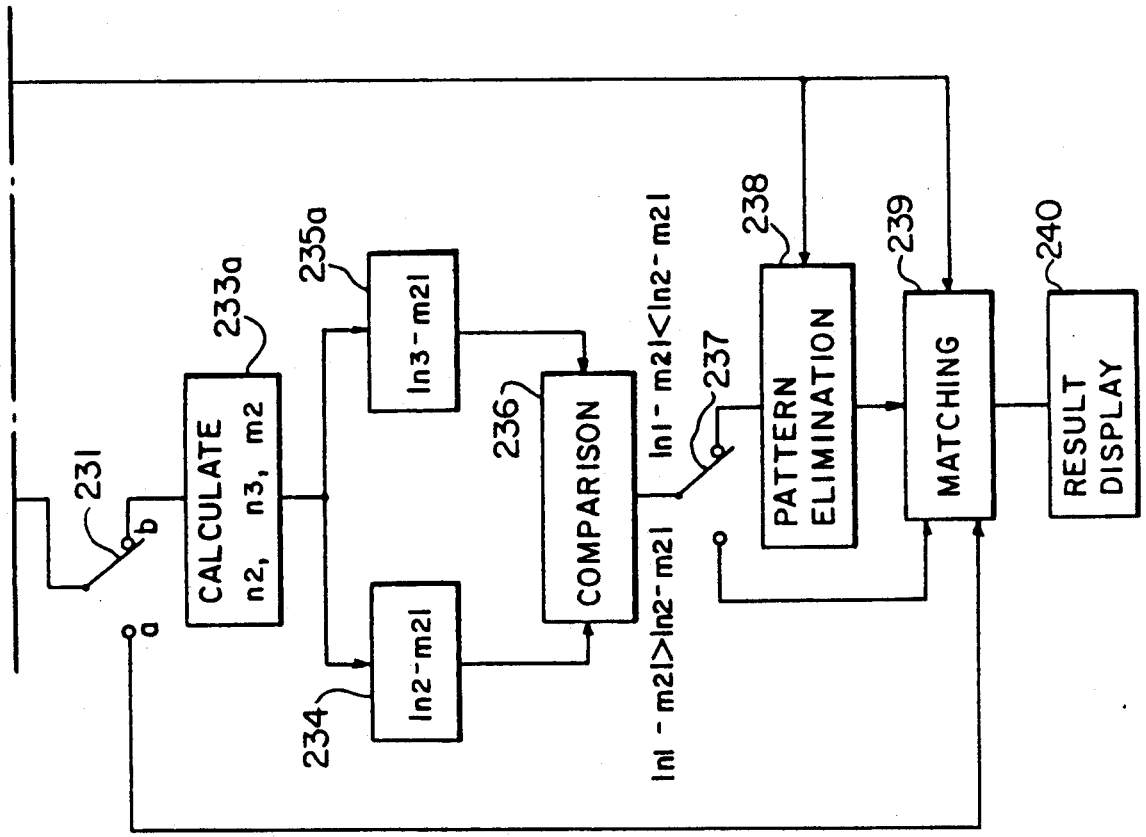

FIG. 37 shows a flow chart showing the sequence of steps of an embodiment for carrying out matching between a pattern having a voiceless interval located within 100 msec. from the terminal end of a voice as described above and a pattern having no such voiceless interval. FIG. 38 schematically illustrates a voice recognition system suitable for implementing the method shown in FIG. 37. It is to be noted that the embodiment shown in FIGS. 37 and 38 is similar in many respects to the embodiment shown in FIGS. 35 and 36 so that only those elements of the present embodiment which differ from the corresponding elements of the previous embodiment are indicated by numerals followed by letter "a." That is, in the present embodiment, values of n2, n3 and m2 are determined by the arithmetic unit 233a and the absolute value of the difference (n3−m2) is determined by the arithmetic unit 235a. However, in the case of a voice, since the entire length expands and contracts, there is a case in which an erroneous determination is made if only the absolute length of a pattern is relied on. Under the circumstances, in the embodiments shown in FIGS. 35 through 38, instead of m2, n1, n2 and n3, values normalized by the voice length, i.e., m2/M, n1/N, n2/N and n3/M can be used. Here, M and N indicate the total lengths of the respective voices.

Figure 39:
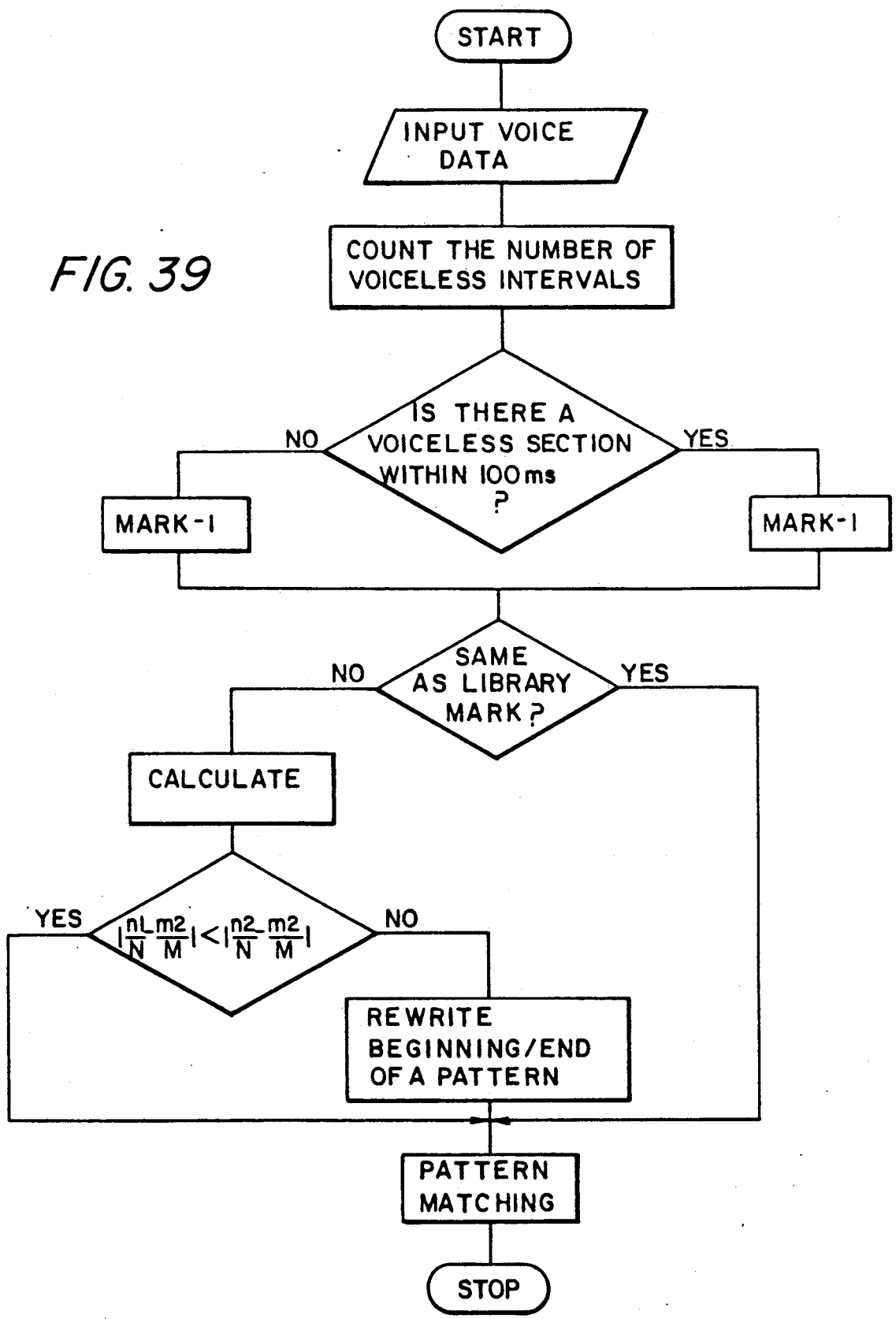
FIG. 39 is a flow chart showing a sequence of steps of a pattern comparing method constructed in accordance with a still further embodiment of the present invention.
Figure 40B:
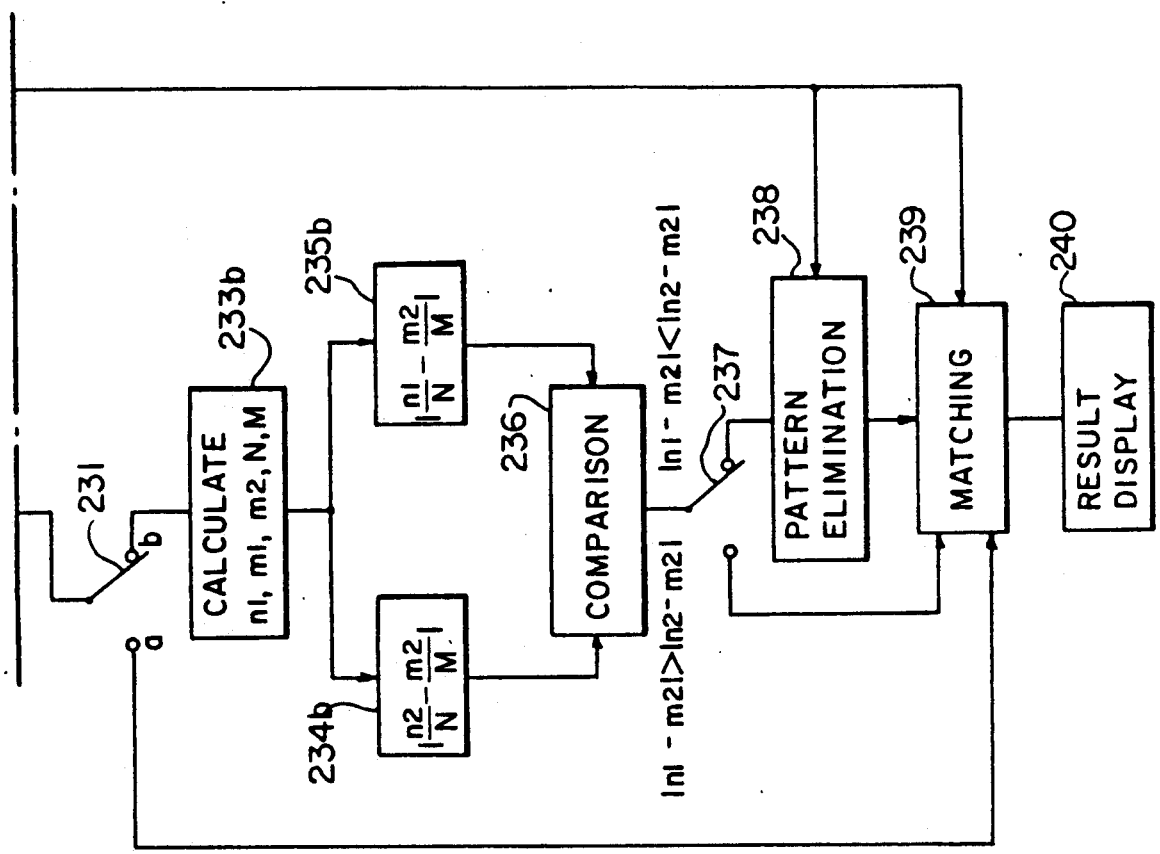

FIG. 39 shows a flow chart of an embodiment in which use is made of such normalized values, and FIG. 40 schematically illustrates mostly in block form a voice recognition system suitable for implementing the method shown in FIG. 39. In the embodiment shown in FIGS. 39 and 40, those elements of the present embodiment which differ from those of the previous embodiments shown in FIGS. 35 through 38 are indicated by numerals followed by letter "b." That is, in the present embodiment, at the arithmetic unit 233b, n1, m2, n2 and m3 are determined, and the absolute value of the normalized difference (n2/N−m2/M) is determined at the arithmetic unit 234b. In addition, the absolute value of the normalized difference (n1/N−m2/M) is determined at the arithmetic unit 235b.

A still further aspect of the present invention will now be described below. In accordance with this aspect of the present invention, there is provided a pattern matching method and system which allows to carry out pattern matching even if a power minimum is shifted in position slightly. That is, in accordance with this aspect of the present invention, in comparing two patterns, it is first checked whether or not there is an energy minimum in the vicinity of the front or tail end of each of the patterns. If such an energy minimum is present in only one of the two patterns, that portion of the pattern having such an energy minimum between the energy minimum and the front or tail end is removed or eliminated, and, then, the two patterns are compared. In this case, if the two patterns have different number of energy minimums, that portion of the pattern having the larger number of minimums between the front end of the pattern and the first minimum or between the last minimum and the tails end is eliminated. Or, alternatively, it is checked whether or not an input signal has a plurality of energy minimums, and, if a plurality of energy minimums are present, the ratio between the pattern length and the minimum position is determined, whereby, if the resulting ratio is close to the ratio of the reference pattern and the energy minimum exists only in the vicinity of the end of one of the patterns, matching between the patterns is carried out assuming that both of the patterns have minimums or no minimums. Further alternatively, it is first checked whether or not an input signal has a plurality of energy minimums, and, if a plurality of energy minimums do exist, the ratio between the pattern length and the minimum position is determined, whereby, if the resulting ratio is close to the ratio of the reference pattern, the pattern length between the energy minimum and the pattern end of each of the patterns is equal to or less than a predetermined value and the energy minimum exists only in the vicinity of the end of one of the patterns, matching between the patterns is carried out assuming that both of the patterns have minimums or no minimums. Still further alternatively, it is first checked whether or not an input signal has a plurality of energy minimums, and, if the number of energy minimums differ between the input pattern and the reference pattern, the length between the minimum closest to the pattern end and a voiceless interval of the pattern having a larger number of energy minimums is subtracted from the pattern length of the pattern having a larger number of minimums to obtain a value which is then compared with the pattern length of the other pattern, whereby, if the value thus obtained is closer to the pattern length of the other pattern, that portion of the pattern having a larger number of minimums between the minimum and the pattern end is eliminated, and, then, the two patterns are compared.

Figure 44:
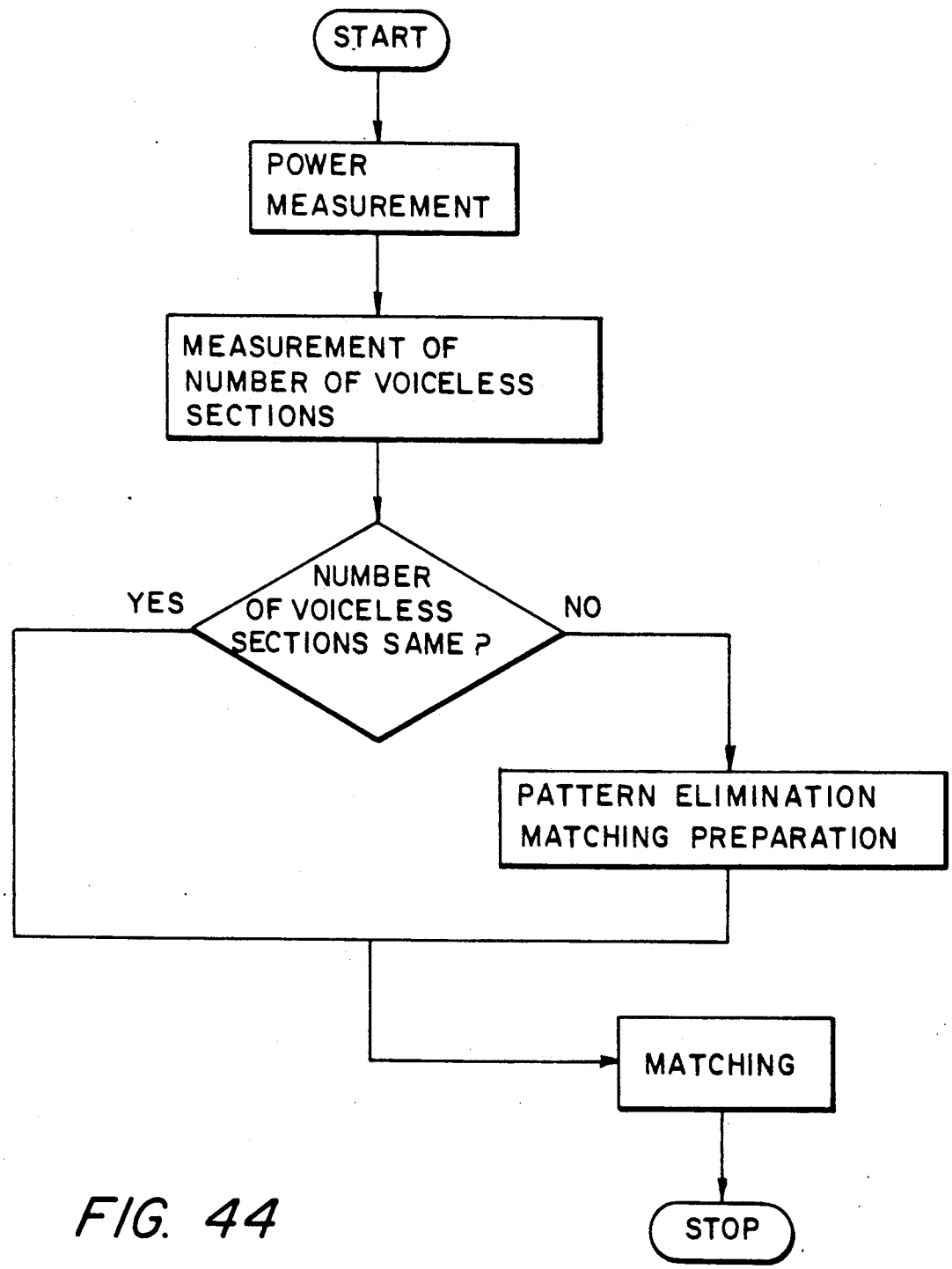
FIG. 44 is a flow chart showing a sequence of steps of a pattern comparing method constructed in accordance with a still further embodiment of the present invention.
Figure 45B:
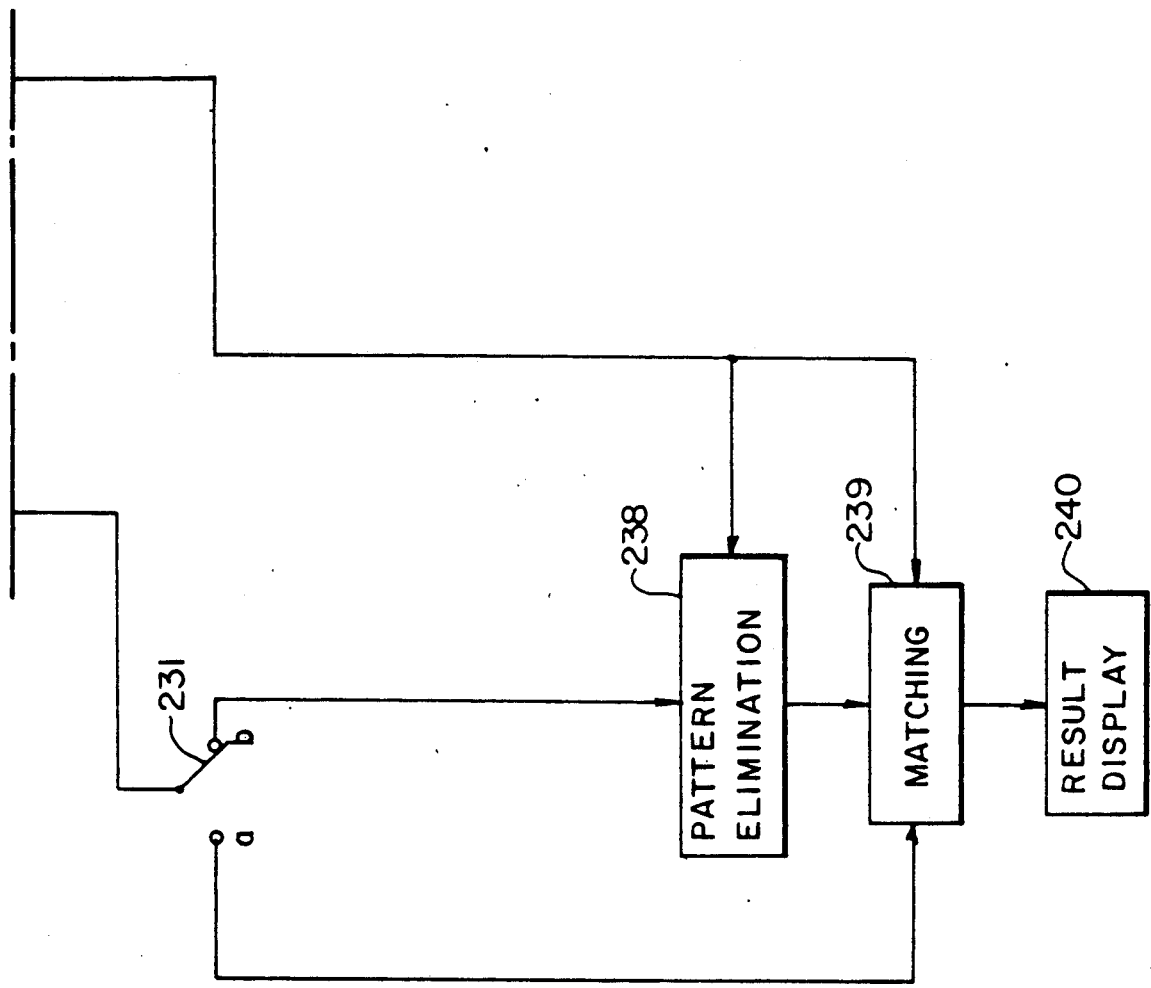

Referring now to FIG. 44, there is shown a flow chart illustrating a sequence of steps of a pattern matching or comparing method constructed in accordance with a still further embodiment of this aspect of the present invention. FIG. 45 illustrates a voice recognition system suitable for implementing the method shown in FIG. 44. As shown, the illustrated voice recognition system includes a microphone 21, a voice interval detecting unit 71, a band-pass filter unit 72, a register 73, a voice power measuring unit 224, a comparator 225, a threshold generating unit 226, a time counter 227, a comparator 228, a voiceless interval counter 229, a mark comparator 230, a turn-over switch 231, a library 232, a pattern eliminating unit 238, a matching unit 239 and a display unit 240. In the present embodiment, in comparing two patterns, if an energy minimum is present in the vicinity of the front or tail end of a pattern, that portion of the pattern having an energy minimum between the energy minimum and the front or tail end of the pattern is eliminated, and, then, the two patterns are compared for matching. In this case, if the number of minimums is different between the two patterns, that portion of the pattern having a larger number of minimums between the first or last minimum and the pattern end is eliminated, and, then, the two patterns are compared. Here, it is assumed that an energy minimum in a voice corresponds to a voiceless section in the voice.

In the first place, when a voice is input into the microphone 21, a voice signal is produced, and the power of the voice is measured by the power measuring unit 224. At the same time, it is checked whether or not there is a voiceless interval and the number of such voiceless intervals is recorded. Then, a reference pattern is taken out of the library 232, and the number of voice intervals in the reference pattern is compared with the number of voice intervals of the input pattern. And, if these numbers agree, then it proceeds to an ordinary matching step to compare the two patterns as they are. It proceeds to a step of eliminating a portion of a pattern only when these numbers do not agree. That is, described more in detail in this respect, the power of a voice input into the microphone 21 is measured by the voice power measuring unit 224 to thereby detect the location of a voiceless interval, and, a different mark is applied depending on whether such a voiceless interval is located within 100 msec. from the head end of the pattern. A reference pattern, to which such a mark has been assigned, is taken out of the library 232, and it is checked to see whether or not the input pattern has a mark which is identical to the mark of the reference pattern. If the two marks are the same, then the turn-over switch 231 is turned to contact a so that the two patterns are compared as they are in an ordinary manner. On the other hand, if the two marks differ, then the turn-over switch 231 is turned to contact b, so that that portion of the pattern having a larger number of energy minimums between the first or last minimum and the pattern end is eliminated by the pattern eliminating unit 238, and, thereafter, the two patterns are compared by the matching unit 239. As a result, an erroneous pattern due to shifting of a voiceless interval can be suitably corrected, and pattern matching can be carried out at high accuracy.

Figure 46:
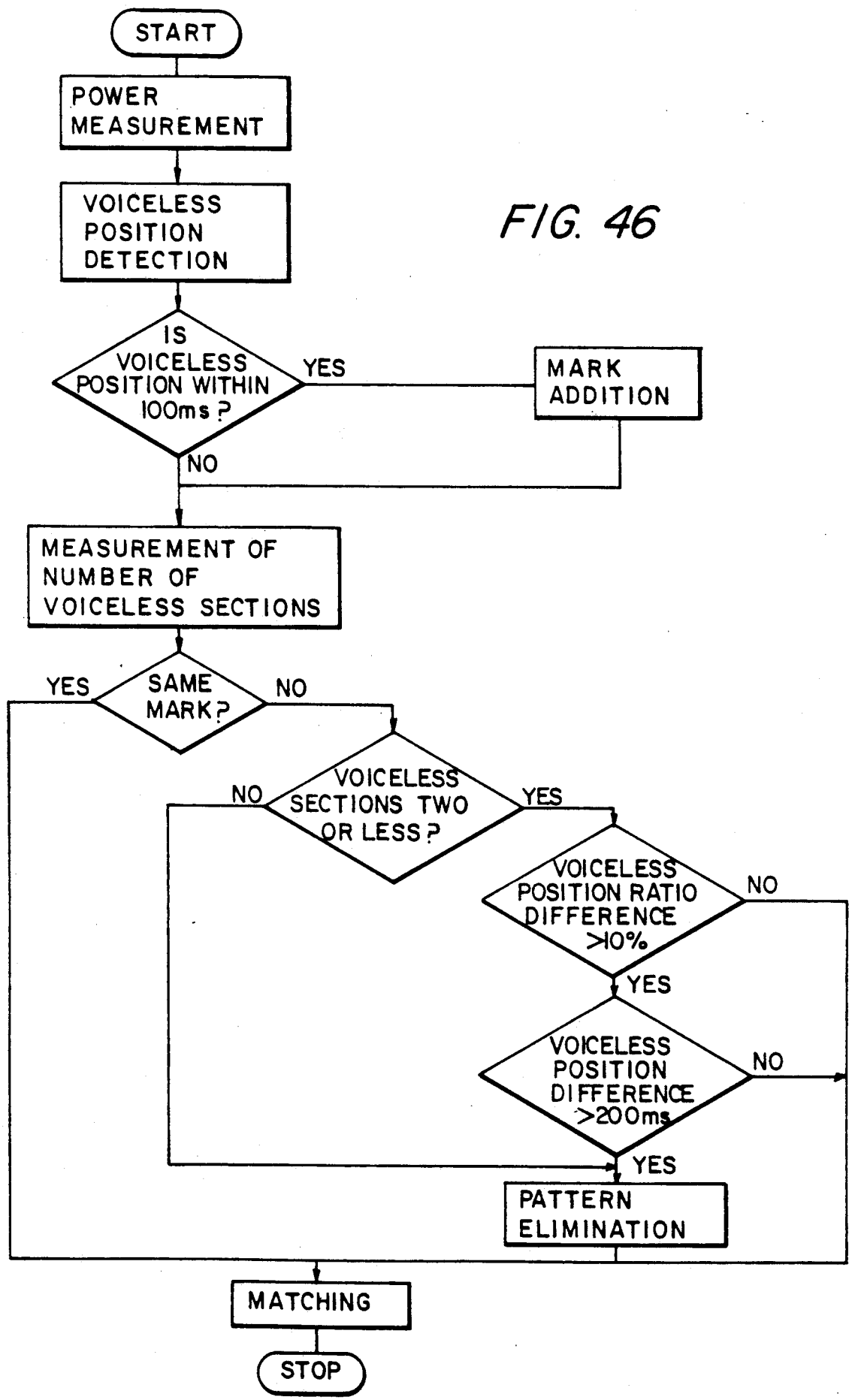
FIG. 46 is a flow chart showing a sequence of steps of a pattern comparing method constructed in accordance with a still further embodiment of the present invention.
Figure 47A:
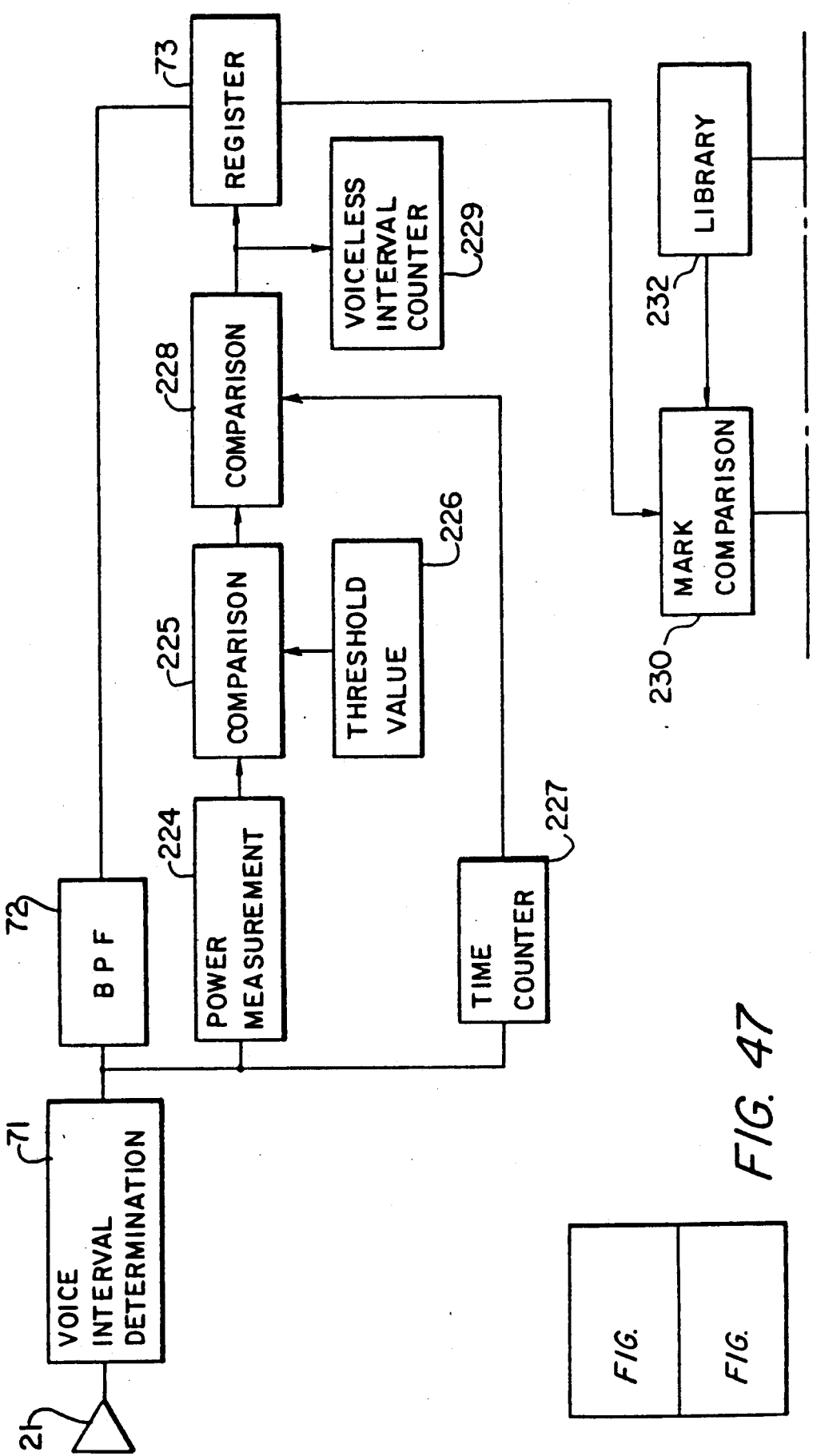
FIGS. 47a and 47b, when combined as shown in FIG. 47, define a schematic illustration showing mostly in block form a voice recognition system constructed to implement the method shown in FIG. 46.
Figure 47:
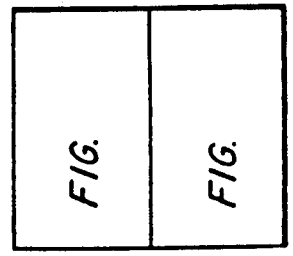
FIG. 47 is an illustration showing how to combine FIGS. 47a and 47b.
Figure 47B:
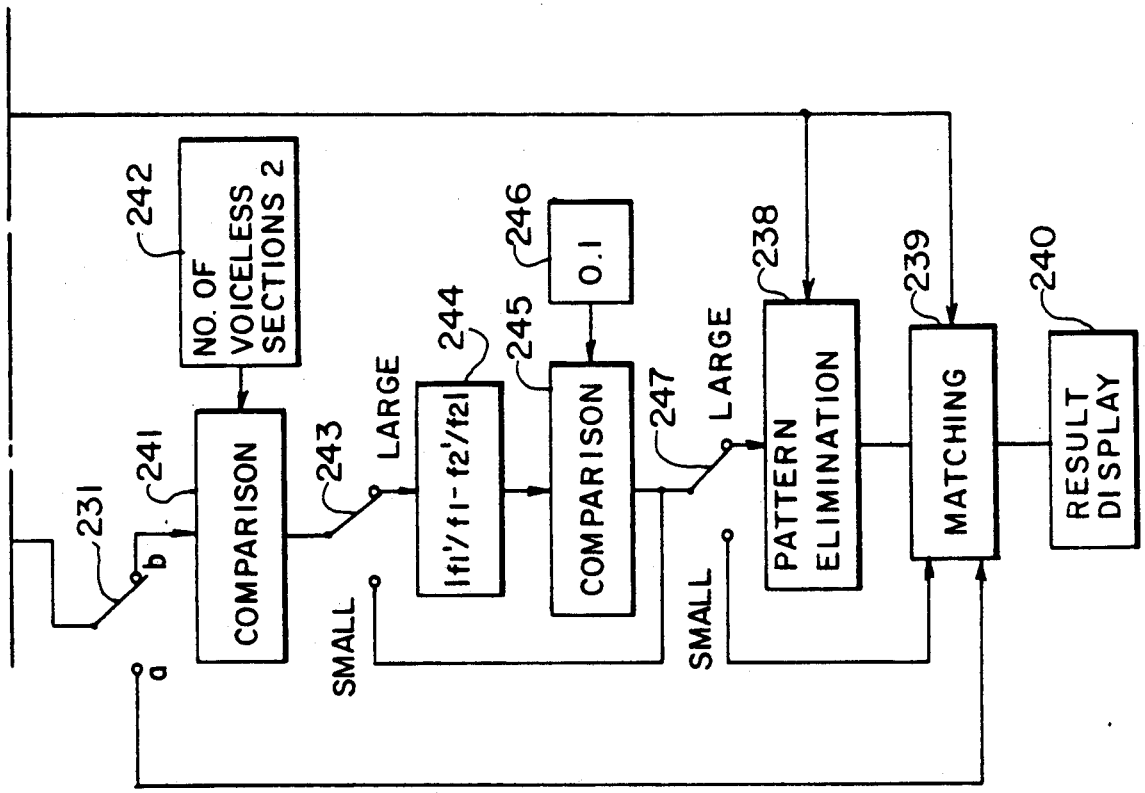

FIG. 46 illustrates a flow chart showing a pattern comparing method constructed in accordance with a still further embodiment of this aspect of the present invention. And, FIG. 47 schematically shows mostly in block form a voice recognition system suitable for implementing the method shown in FIG. 46. As shown, this embodiment is structurally similar in many respects to the previously described embodiment shown in FIGS. 44 and 45, so that like numerals are used to indicate like elements. The present embodiment includes a comparator 241, a number of voiceless intervals generating unit 242, a turn-over switch 243, an arithmetic unit 244, a comparator 245, a multiplying constant setting unit 246 and a turn-over switch 247. In the present embodiment, in comparing two patterns, it is first checked whether or not an energy minimum is present in the vicinity of the front or tail end of a pattern. And, if such an energy minimum is present only in one of the patterns, that portion of the pattern having such an energy minimum between the energy minimum and the front or tail end is eliminated, and, then, the two patterns are compared for matching. In this cases, in accordance with the present embodiment, it is checked whether or not an input signal has a plurality of energy minimums. And, if there are a plurality of energy minimums, the ratio between the pattern length and the energy minimum position is determined. And, if the resulting ratio is closer as compared with the ratio of the reference pattern and an energy minimum exists only in the vicinity of one of the patterns, pattern matching is carried out assuming that both of the patterns have energy minimums or no energy minimums. Here, it is assumed that an energy minimum corresponds to a voiceless section of a voice.

Described more in detail, when a voice is input into the microphone 21, its power is measured by the power measuring unit 224 and it is checked whether or not there is a voiceless interval in the voice. If there is, then its position is determined. If such a voiceless interval is located within 100 msec. from the front end of the voice pattern, a mark indicating the possibility of a noise component having been introduced at the front end of the voice pattern is assigned. At the same time, the number of voiceless intervals is also detected. If there are two or more voiceless intervals in either of the patterns, then it is checked whether or not the difference between the positional ratios of the voiceless intervals is within 10%. And, if within 10%, then the switch 247 is changed from the position shown in the drawing to thereby bypass the pattern eliminating unit 238 and thus carry out an ordinary matching operation. On the other hand, if the difference is 10% or more, the switch 247 is set in the position shown in the drawing, the pattern having a larger number of voiceless intervals is supplied to the pattern eliminating unit 238.

That is, in accordance with the present embodiment, for two patterns having voiceless intervals located at 110 msec. and 90 msec., pattern matching between the two patterns is carried out with assumption that no noise has been introduced and no information has been lost. Here, the voiceless position ratio is defined by f'/f wherein f is a pattern length (msec) and f' is a voiceless position (msec). If the pattern length is large and the number of voiceless intervals is large, there may be an increase in error just by the ratio. Under the circumstances, it is checked whether or not an input signal has a plurality of energy minimums. If a plurality of energy minimums do exist, the ratio between the pattern length and the energy minimum position is determined, and the resulting ratio is compared with the corresponding ratio of the reference pattern. And, if the two ratios are close and the length between the energy minimum and the pattern end of each of the patterns is equal to or smaller than a predetermined value, and, moreover, if an energy minimum is present only in the vicinity of the end of one of the patterns, then pattern matching is carried out with the assumption that both of the patterns have energy minimums or no energy minimums.

Figure 48:
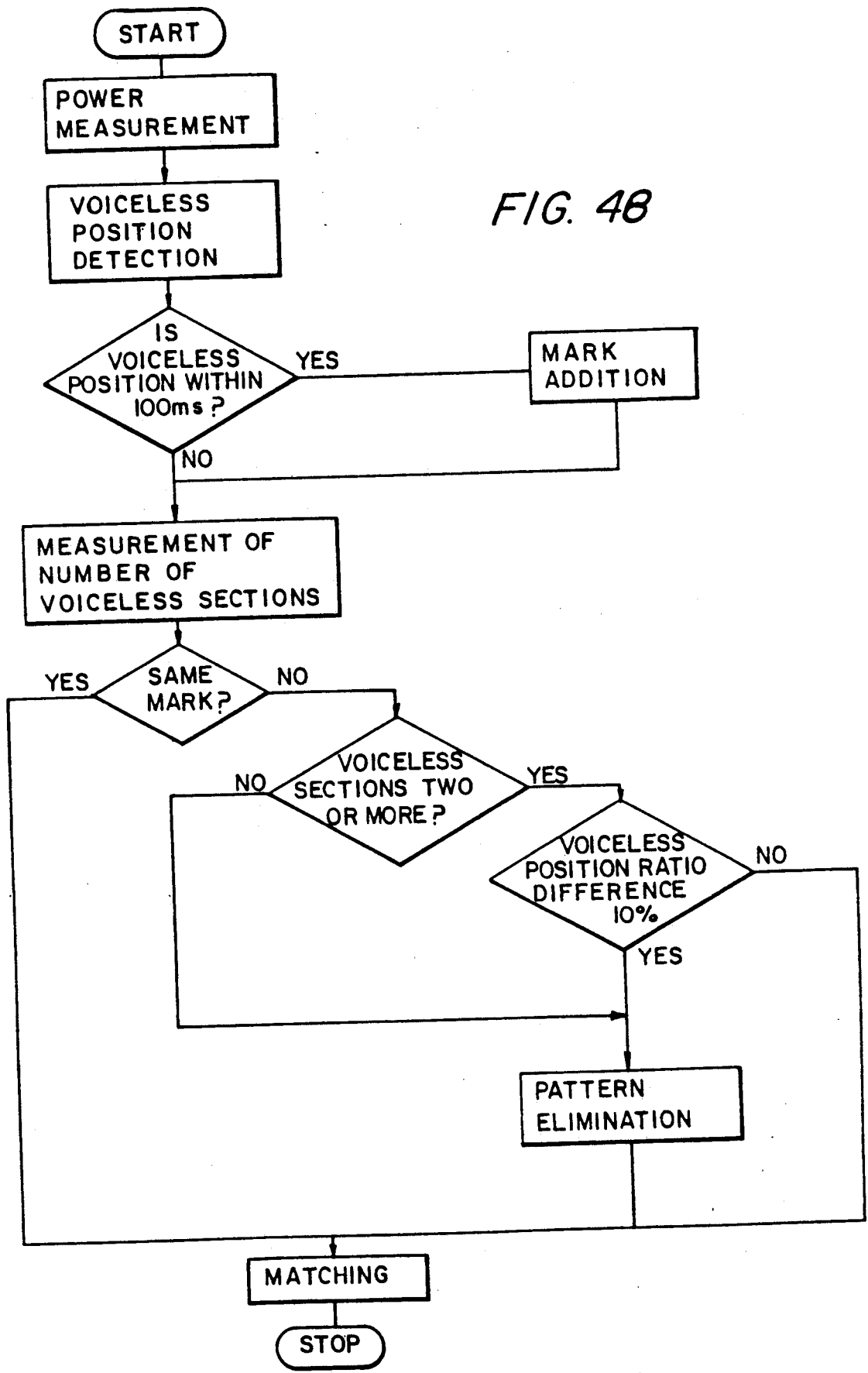
FIG. 48 is a flow chart showing a sequence of steps of a pattern comparing method constructed in accordance with a still further embodiment of the present invention.
Figure 49A:
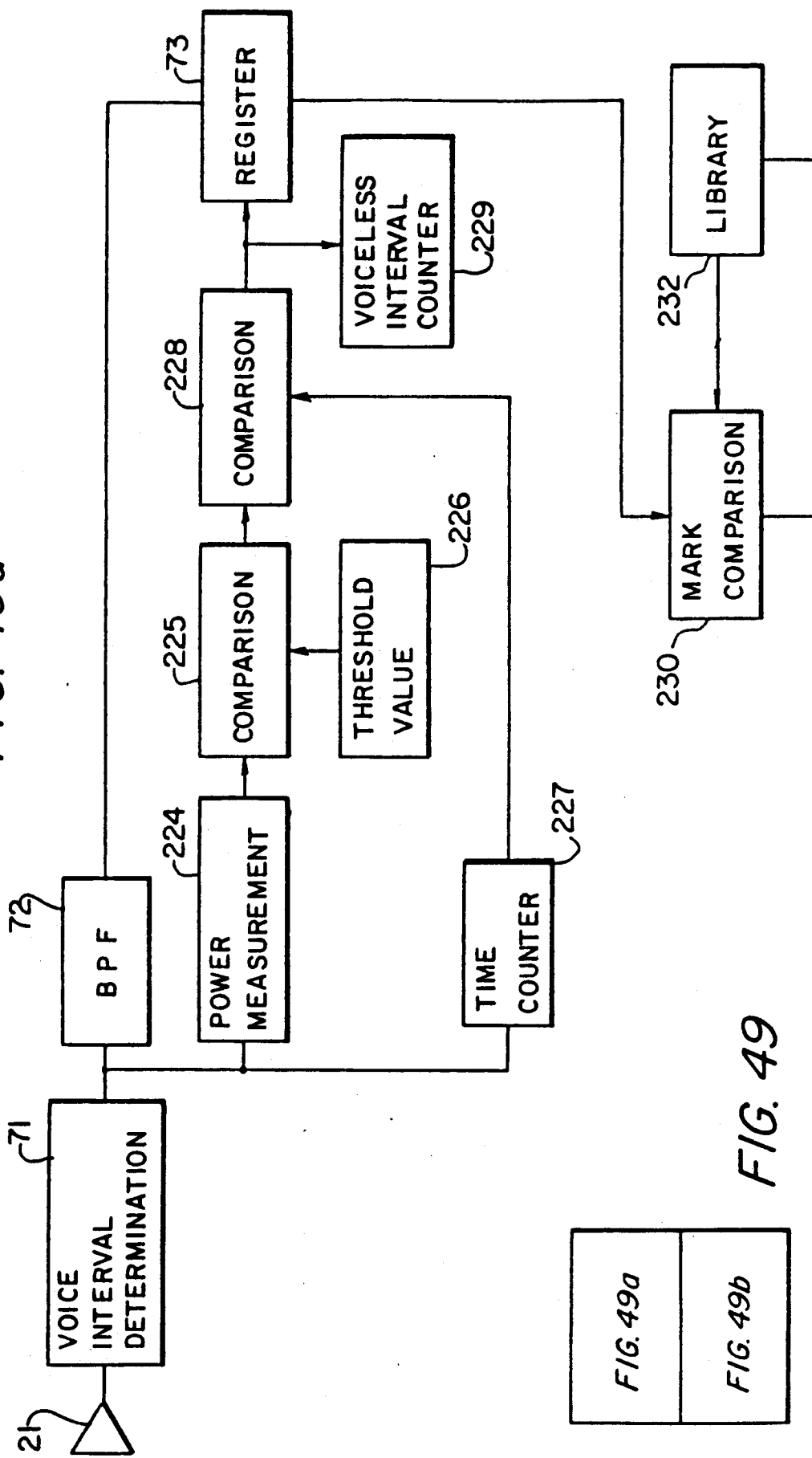
FIGS. 49a and 49b, when combined as shown in FIG. 49, define a schematic illustration showing mostly in block form a voice recognition system constructed to implement the method shown in FIG. 48.
Figure 49:
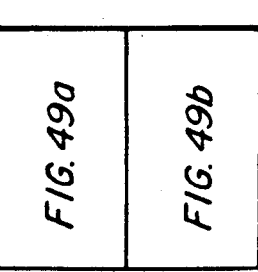
FIG. 49 is an illustration showing how to combine FIGS. 49a and 49b.
Figure 49B:
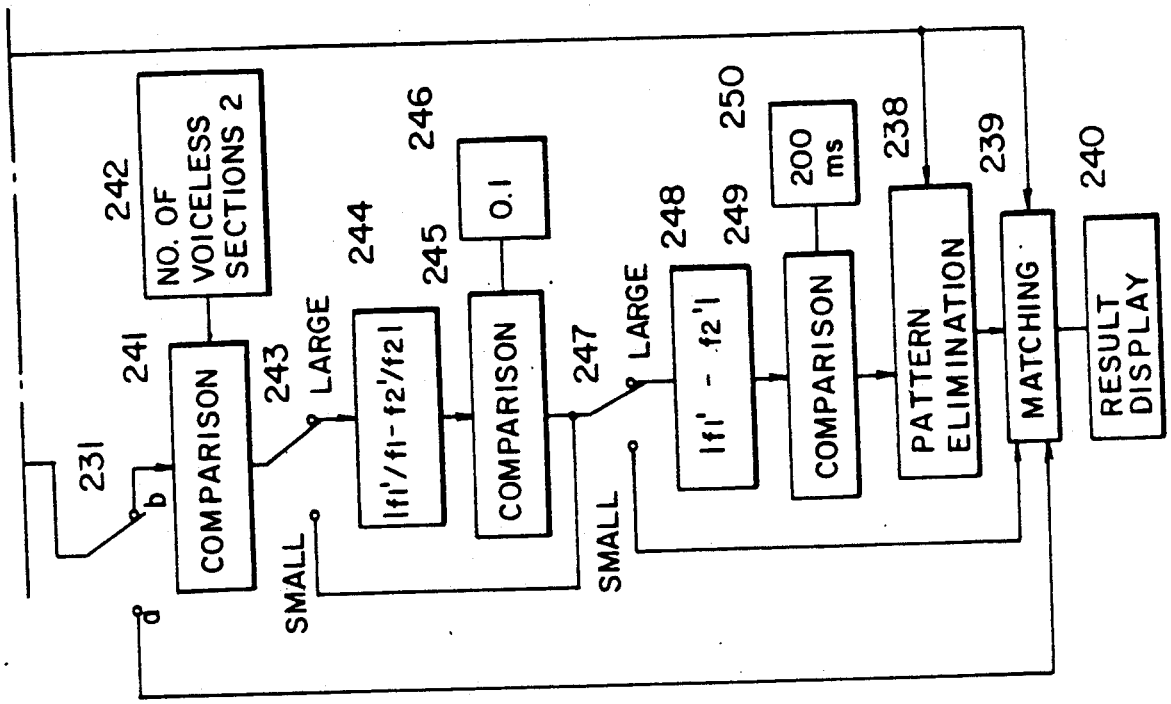

FIG. 48 shows a flow chart which is useful for understanding the embodiment for carrying out pattern matching by determining a ratio between the pattern length and the minimum position when a plurality of energy minimums are present. FIG. 49 schematically shows mostly in block form a voice recognition system suitable for implementing the method shown in FIG. 48. In the present embodiment, after examining the difference of voiceless position ratio, the absolute distance or time to a voiceless section is examined, and only if this difference is larger than 200 msec., it proceeds to the pattern eliminating unit 238. Of course, the particular values, such as 10% and 200 msec. indicated here are illustrative only, and other values can also be used as long as they can define the vicinity suitably.

Figure 50:
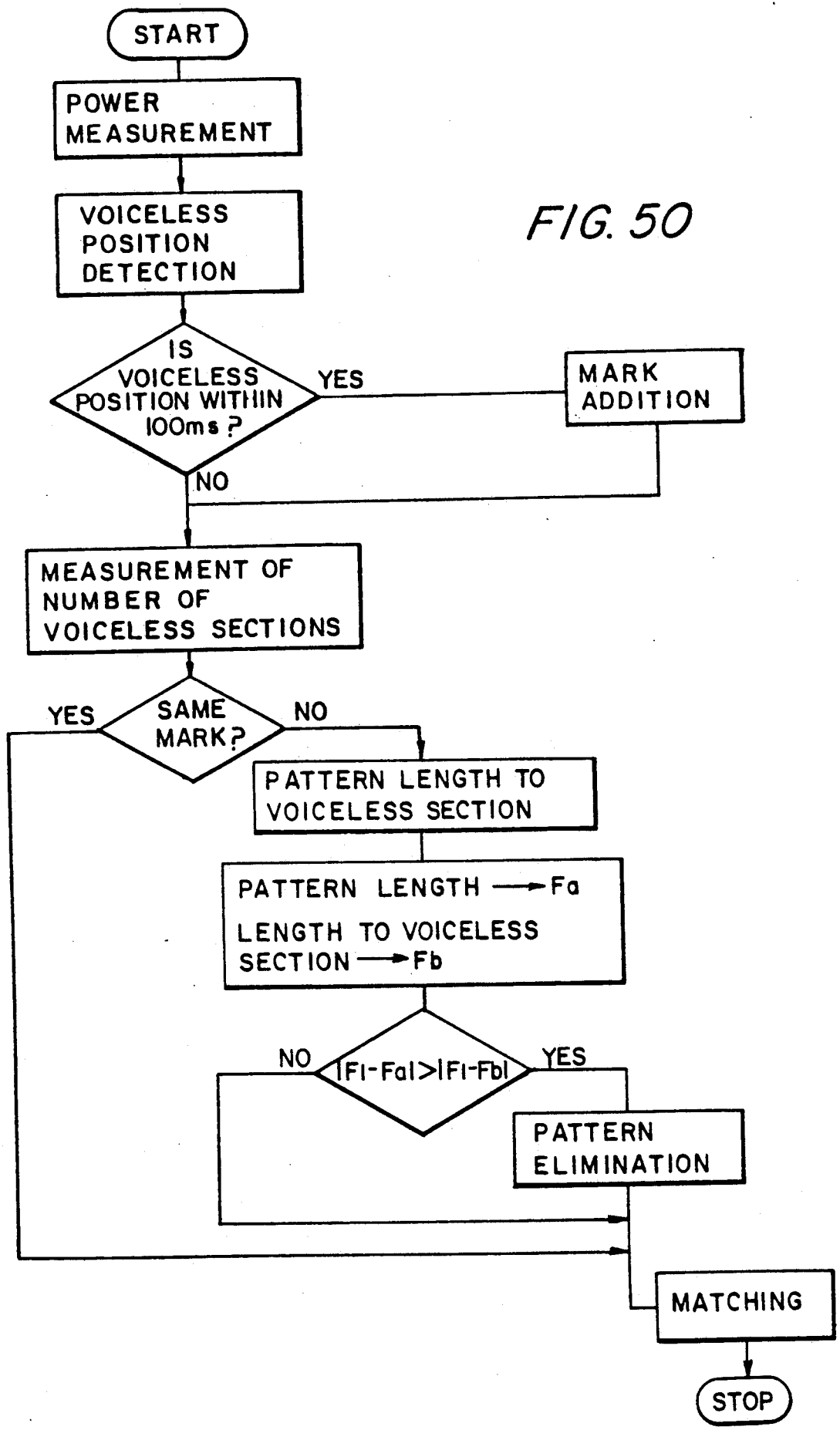
FIG. 50 is a flow chart showing a sequence of steps of a pattern comparing method constructed in accordance with a still further embodiment of the present invention.
Figure 51B:
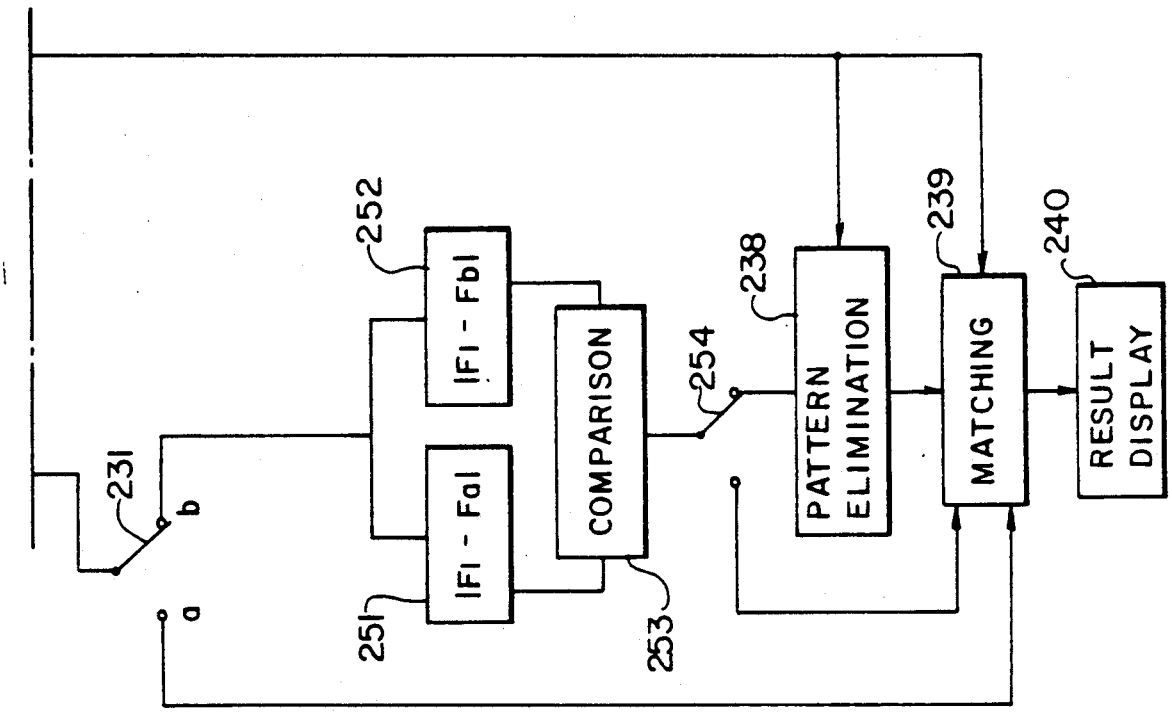

FIG. 50 shows a flow chart illustrating a sequence of steps of a pattern comparing method constructed in accordance with a still further embodiment of this aspect of the present invention. And, FIG. 51 illustrates mostly in block form a voice recognition system having a structure suitable for implementing the method shown in FIG. 50. Since this embodiment is similar in many respects to the previous embodiment shown in FIG. 49, like numerals are used to indicate like elements. In the present embodiment, in comparing two patterns, it is first checked whether or not an energy minimum is present in the vicinity of the front or tail end of a pattern. And, if an energy minimum is present in only one of the patterns, that portion of the pattern having such an energy minimum between the energy minimum and the front or tail end is eliminated, and, thereafter, the two patterns are compared for matching. In this case, in accordance with this embodiment, it is checked to see whether an input signal has an energy minimum or not. And, if the number of energy minimums differ between the input pattern and the reference pattern, the length between the energy minimum closest to the pattern end and a voiceless interval of the pattern having a larger number of energy minimums is subtracted from the pattern length of the pattern to obtain a value which is then compared with the pattern length of the other pattern. And, if the value thus obtained is closer to the pattern length of the other pattern, then that portion of the pattern having a larger number of energy minimums between the energy minimum and the pattern end is eliminated, and, then, the two patterns are compared for matching. That is, if a voiceless interval is present at the front end of an input pattern and it has a mark different from the mark of a reference pattern, the length from the front end to the voiceless interval of the input pattern is subtracted from the overall pattern length Fa of the input pattern to determine Fb. And, then, it is checked which of Fa and Fb is closer to the overall pattern length F1 of the reference pattern. And, only if Fb is closer to F1, it proceeds to the pattern eliminating unit 238.

Figure 59A:
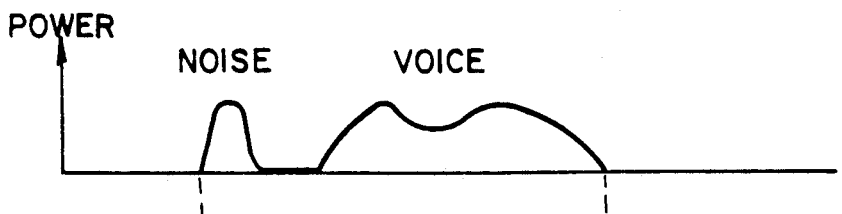
FIGS. 59a, 59b, 60a through 60c, and 61a through 61c are illustrations which are useful for explaining the problems to be solved by a further aspect of the present invention.
Figure 59B:
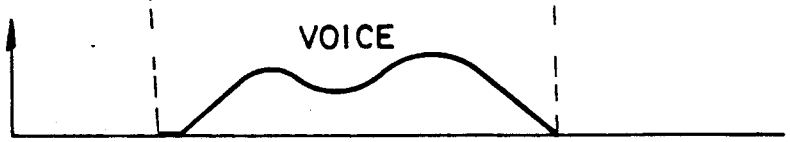

Now, a still further aspect of the present invention regarding the formation of a reference pattern particularly suitable for use in voice recognition will be described. As described previously, it is vitally important to form a reference voice pattern extremely high in quality so as to obtain an enhanced rate of recognition. As one method of forming such a reference pattern, there has been proposed to pronounce a number of times for the same word to produce a plurality of voice patterns which are then averaged to define a single reference pattern. With this technique, the statistical information of voice fluctuations can also be contained in the reference pattern; however, since the pronunciation must be repeated for a number of times so as to form a single reference pattern, even if one of the pronunciations had a poor detection of voice interval, it would cause the resulting reference pattern to be deteriorated in quality. Described more in detail in this respect with reference to FIGS. 59a and 59b, the pattern shown in FIG. 59a has a noise component introduced at the beginning of a voice and the pattern shown in FIG. 59b is a normal pattern. When taking an average between the two patterns, correspondence is made between the front end to front end and between the tail end to tail end. As a result, the noise component of the pattern shown in FIG. 59a comes to be added to the leading portion of the normal pattern shown in FIG. 59b. Therefore, the resulting averaged pattern becomes inferior in quality.

Figure 60A:
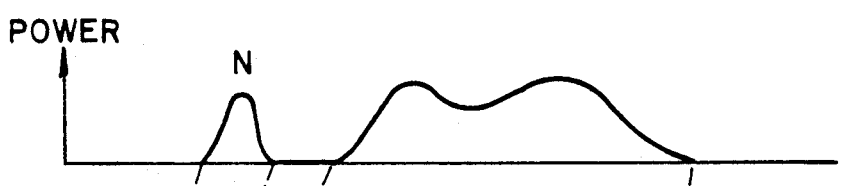
Figure 60B:
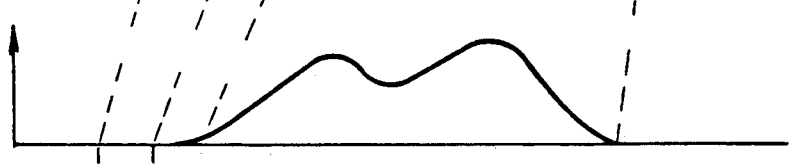
Figure 60C:
Figure 61A:
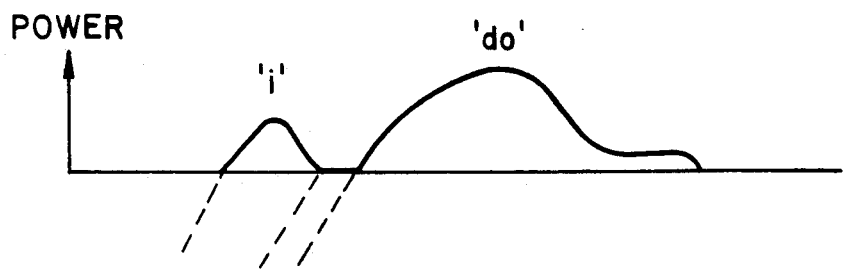
Figure 61B:
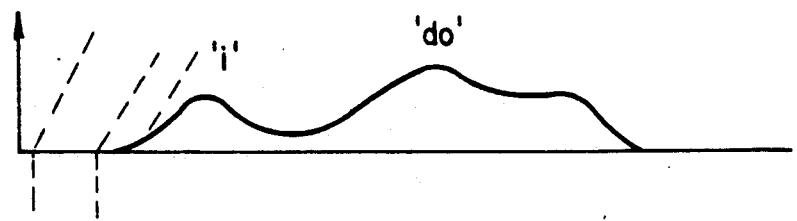
Figure 61C:
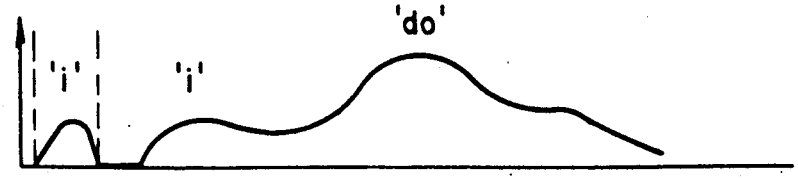

In order to cope with this situation, as described previously, one aspect of the present invention proposes a method in which the presence and absence of an energy minimum within a predetermined length from the front or tail end of a pattern is examined, and if such an energy minimum is present only in one of the two patterns to be compared, then that portion of the pattern having an energy minimum between the pattern end and the energy minimum is added to the pattern having no such energy minimum. However, according to such a method, as shown in FIG. 60, when taking an average between the pattern having a noise component N shown in FIG. 60a and the pattern having no noise component shown in FIG. 60b, the noise component N at the front end of the pattern of FIG. 60a is added to the pattern of FIG. 60b, and, then, the two patterns both having the noise component are averaged to thereby produce a pattern shown in FIG. 60c. According to this method, however, in the case were an energy minimum sometimes appear and sometimes does not appear when a certain word is pronounced, such as the case shown in FIG. 61a for the Japanese word "ido", meaning "movement" in English, or in the case where an energy minimum is shifted in position along the time axis near the threshold, such as the case shown in FIG. 61b, unnecessary information is added at the front or tail end of the pattern as shown in FIG. 61c, so that there is a case which produces a rather inferior reference pattern by using an averaging technique.

This aspect of the present invention is particularly addressed to solve such a problem and to provide an improved method and system for forming a reference pattern high in quality and particularly suitable for use in voice recognition. In accordance with this aspect of the present invention, a plurality of patterns are produced for a particular item of interest, such as a voice or word, and the plurality of patterns are processed to define a reference pattern. It is checked whether or not there is a pattern which has an energy minimum within a predetermined length from the front or tail end of the pattern. And, if there is a pattern having no such energy minimum, that portion of the pattern having an energy minimum between the energy minimum and the pattern end is added to the pattern having no such energy minimum. In this case, in accordance with this aspect of the present invention, a first predetermined length from the front or tail end of the pattern having no energy minimum within a second predetermined length from the front or tail end is compared for similarity with that portion of the pattern having an energy minimum between the front or tail end and the energy minimum and also with a block large in energy after or before the energy minimum, and the before-mentioned addition of pattern component is carried out only when the former similarity is smaller than the latter similarity.

Figure 52:
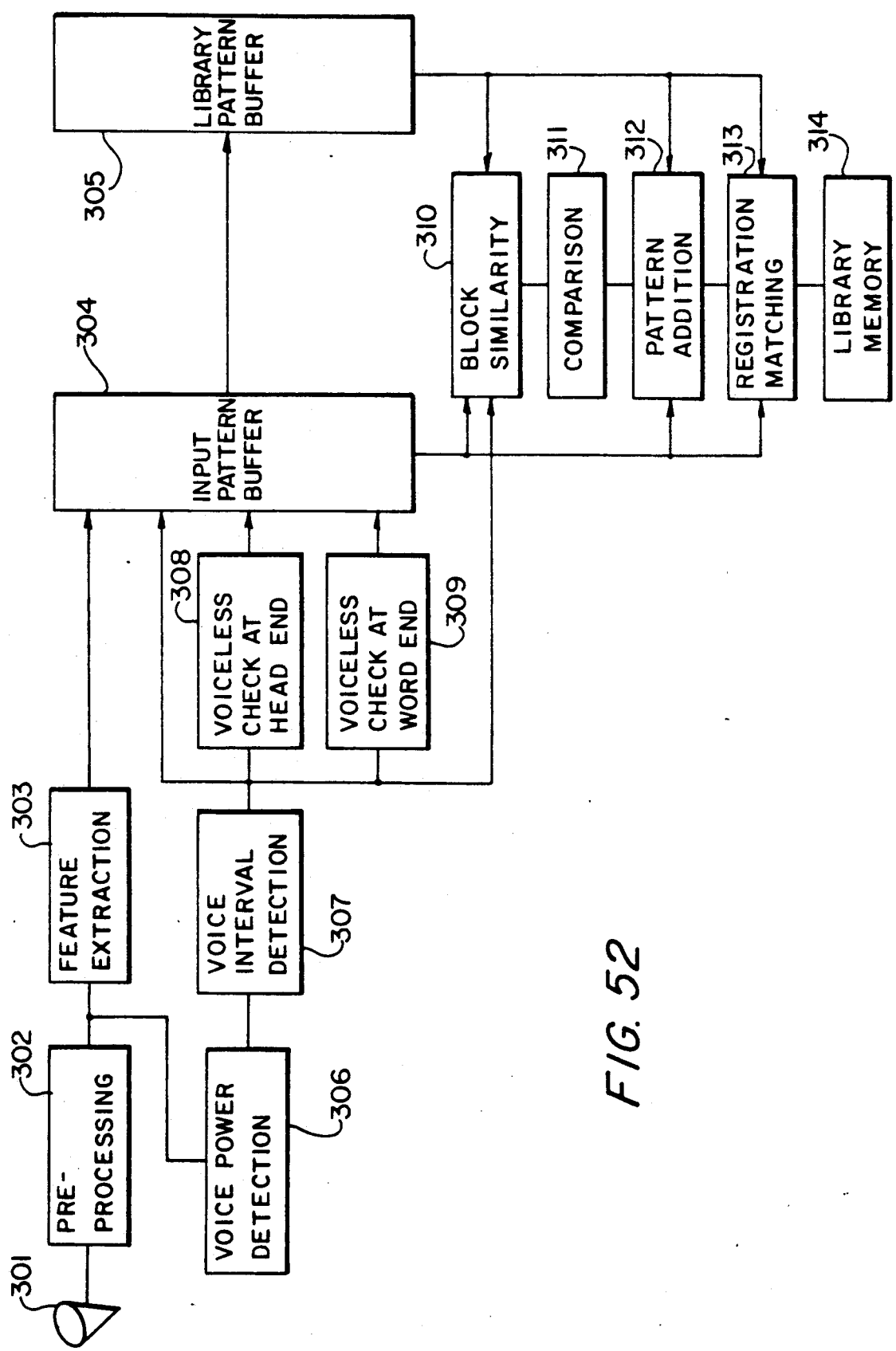
FIG. 52 is a voice recognition system constructed in accordance with a still further embodiment of the present invention.
Figure 53B:
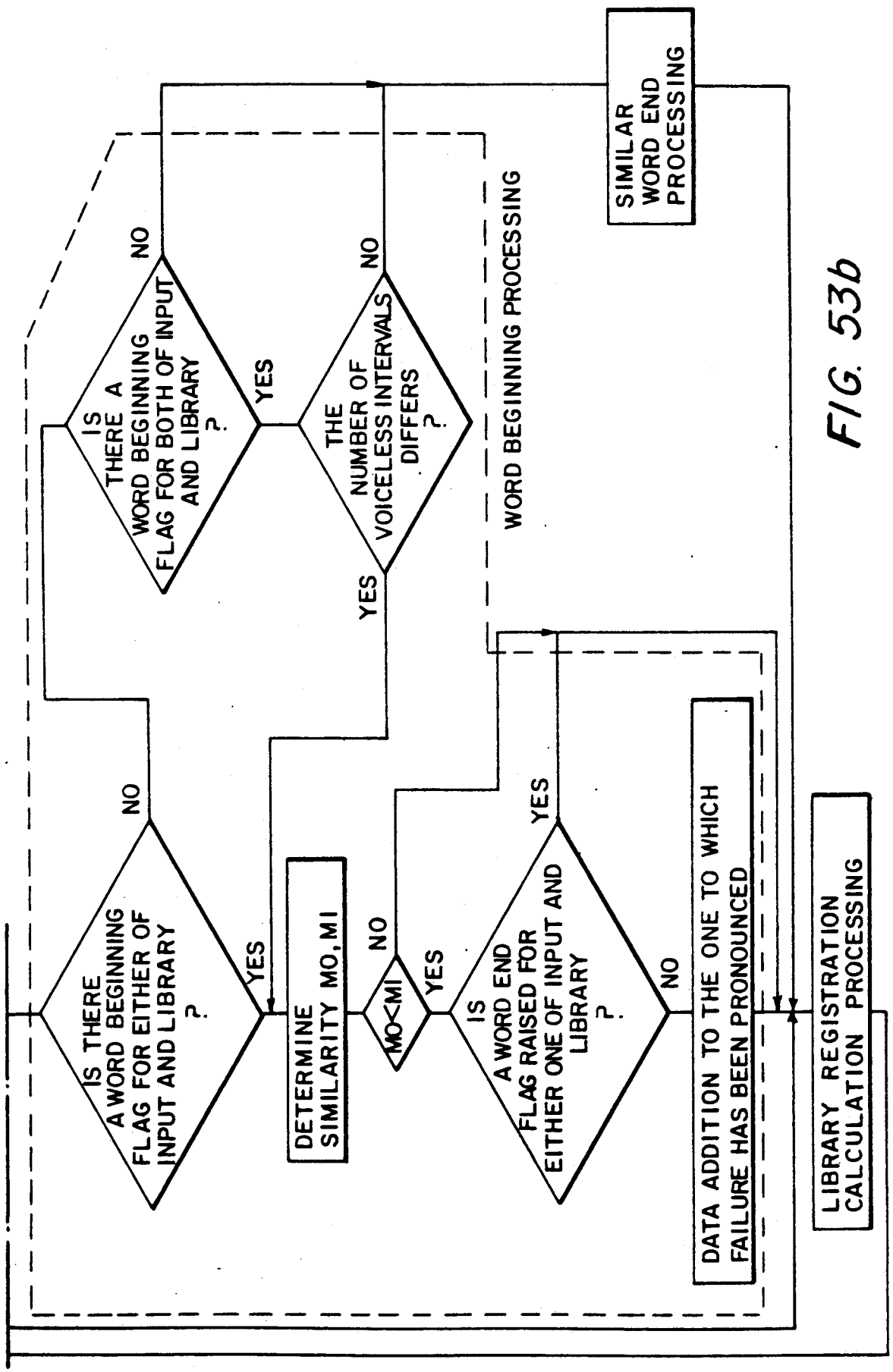
FIG. 53 illustrates the relationship of FIGS. 53a and 53b, which comprise a a flow chart which is useful for explaining the operation of the system shown FIG. 52.

Referring now to FIG. 52 which schematically shows mostly in block form a voice recognition system constructed in accordance with a still further aspect of the present invention and particularly suitable for use with the pattern comparing method of this aspect of the present invention. FIG. 53 is a flow chart which is useful for understanding the operation of the system shown in FIG. 52. As shown, the illustrated system includes a microphone 301, a pre-processing unit 302, a feature extracting unit 303, an input pattern buffer 304, a library pattern buffer 305, a voice power measuring unit 306, a voice interval detecting unit 307, a head end voiceless interval checking unit 308, a tail end voiceless interval checking unit 309, a block similarity matching unit 310, a comparator 311, a pattern adding unit 312, a registration matching unit 313 and a library memory 314. With this structure, a voice is input into the microphone 301 to produce a corresponding voice signal which is then processed suitably by the pre-processing unit 301, and, thereafter, a feature quantity of the voice is extracted by the feature extracting unit 303. As described before, use may be made of any desired feature quantity, such as power spectrum, LPC coefficients, or cepstrum, or any other feature quantity.

At the same time, the voice power is measured by the voice power measuring unit 306, and a voice interval is also detected by the voice interval detecting unit 307. The head end voiceless interval checking unit 308 checks to see whether or not a voiceless interval is present within a predetermined time length from the head or front end of the voice pattern, and, similarly, the tail end voiceless interval checking unit 309 checks to see whether or not a voiceless interval is present within a predetermined time interval from the tail end of the voice pattern. For the first pronunciation, the above-described process is carried out so that the resulting voice pattern is stored into the library pattern buffer 305. For the second pronunciation for the same word, the second voice is similarly processed and the resulting pattern is stored into the input pattern buffer 304. And, then, an averaging process between the first pattern in the library pattern buffer 305 and the second pattern in the input pattern buffer 304 is carried out to produce an averaged pattern which is thus stored into the library memory 314 as a reference pattern. For the third and following pronunciations for the same word, the averaging operation is carried out between the reference pattern and the input pattern.

As illustrated in FIG. 60a, when a noise component (e.g., sound of opening and closing of the mouth or lips, or background noise) has been introduced into the pattern at its head end, a flag is raised by the head end voiceless interval checking unit for the pattern shown in FIG. 60a. And, for the next input pattern shown in FIG. 60b, since there is no noise component, the noise component of the pattern of FIG. 60a is added at the front end of the pattern of FIG. 60b to form the pattern shown in FIG. 60c. Then, the two patterns are averaged to define a reference pattern high in quality. However, as shown in FIG. 61, in the case where the pattern shown in FIG. 61a has a voiceless interval within a predetermined length rom the head end and the pattern shown in FIG. 61b has no such voiceless interval, there will be formed an erroneous reference pattern as shown in FIG. 61c. In this case, the pattern shown in FIG. 61a does not have a noise component, though it has a voiceless interval within a predetermined length similarly with the case of FIG. 60a, in which case the noise component N has been introduced. This aspect of the present invention is particularly directed to solve this problem.

In accordance with this aspect of the present invention, as shown in FIG. 54, in the case where a voiceless interval is present within a predetermined length from the head end in one of the patterns and no such voiceless interval is present in the other pattern, the similarity M0 between the leading or head portions a and b of the respective patterns and also the similarity M1 between the leading portion b of the pattern having no voiceless interval shown in FIG. 54b and the block c after the voiceless interval of the pattern having a voiceless interval shown in FIG. 54a are determined. In the case of FIG. 54, since both of the patterns have syllables "i" and "do" without addition of noise component and loss of information, the similarity M0 is larger than the similarity M1. In such a case where the relation of M0 being larger than M1 holds, the averaging between the two patterns is carried out without addition of pattern component. On the other hand, when a noise component has been introduced at the head end as shown in FIG. 55a or the leading portion of the voice information has been lost as shown in FIG. 55b, the similarity M0 between the portions a and b should be smaller than the similarity M1 between the portions b and c. Thus, as long as the condition of M0 being smaller than M1 holds, the noise component of the pattern of FIG. 55a is added to the head end of the pattern of FIG. 55b.

Figure 57A:
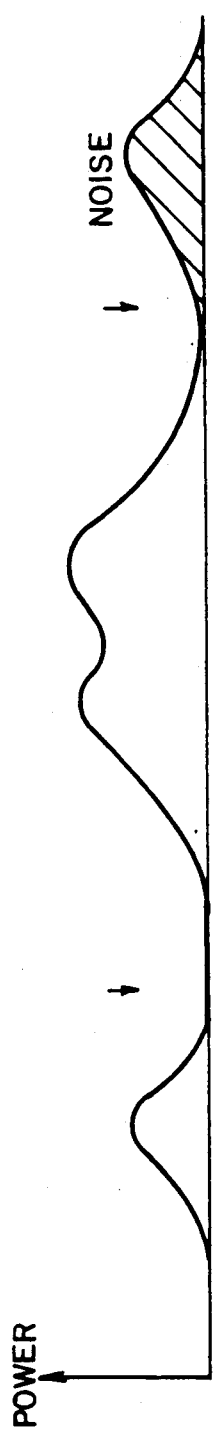
Figure 57B:
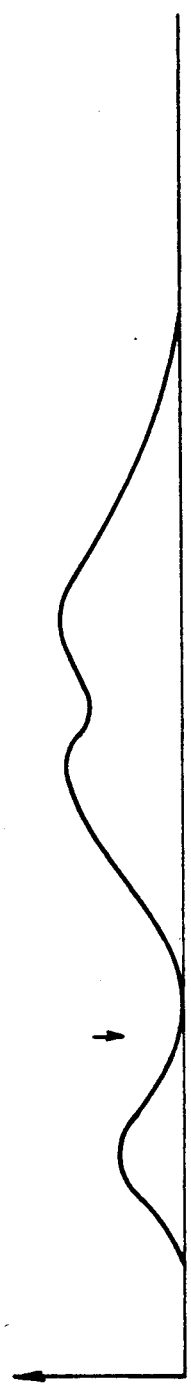
Figure 58A:
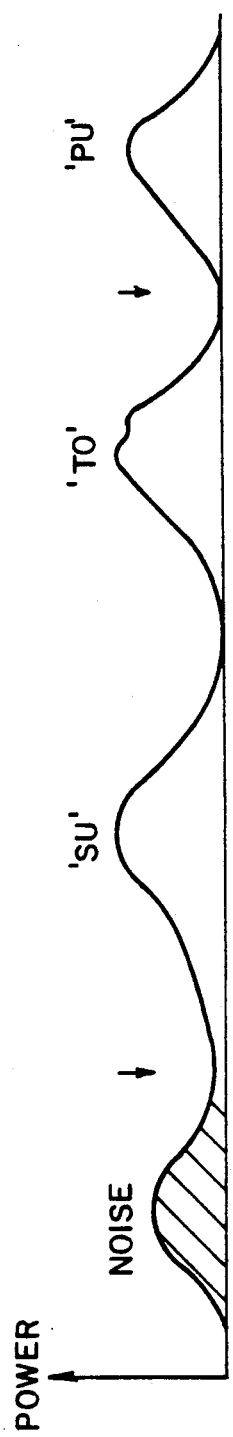
Figure 58B:

In the case shown in FIGS. 56a and 56b, both of the patterns have a voiceless interval within a predetermined length from the front end. In the pattern of FIG. 56a, a noise component has been introduced at the front end, and the similarity M0 should be smaller than the similarity M1. And, thus, the noise component of the pattern of FIG. 56a should be added to the front end of the pattern of FIG. 56b before averaging. Thus, in accordance with this aspect of the resent invention, in the case where each of the two patterns has a voiceless interval at the front end, if the number of voiceless intervals differ between the patters, such as the pattern of FIG. 56a having two voiceless intervals and the patter of FIG. 56b having only one voiceless interval, the two similarities between selected portions of the two patterns are calculated and it is determined whether or not to carry out pattern addition prior to averaging, as described above. It has been described with respect to the head end of a voice pattern; however, the similar processing can be carried out also for the tail end of a pattern. In the case of carrying out the above-described process for the head end, if one of the patterns has a voiceless interval within a predetermined length from the tail end, it is extremely difficult to determine whether to add a pattern component to the head end or to the tail end. Thus, in such a case, it is preferably so structured that the head end processing is not carried out even if the above-described conditions have been satisfied because the tail end processing result has not yet been known (FIG. 57); and the above described head end processing is carried out if both of the patterns have a voiceless interval within a predetermined length from the tail end (FIG. 58).

Figure 62:
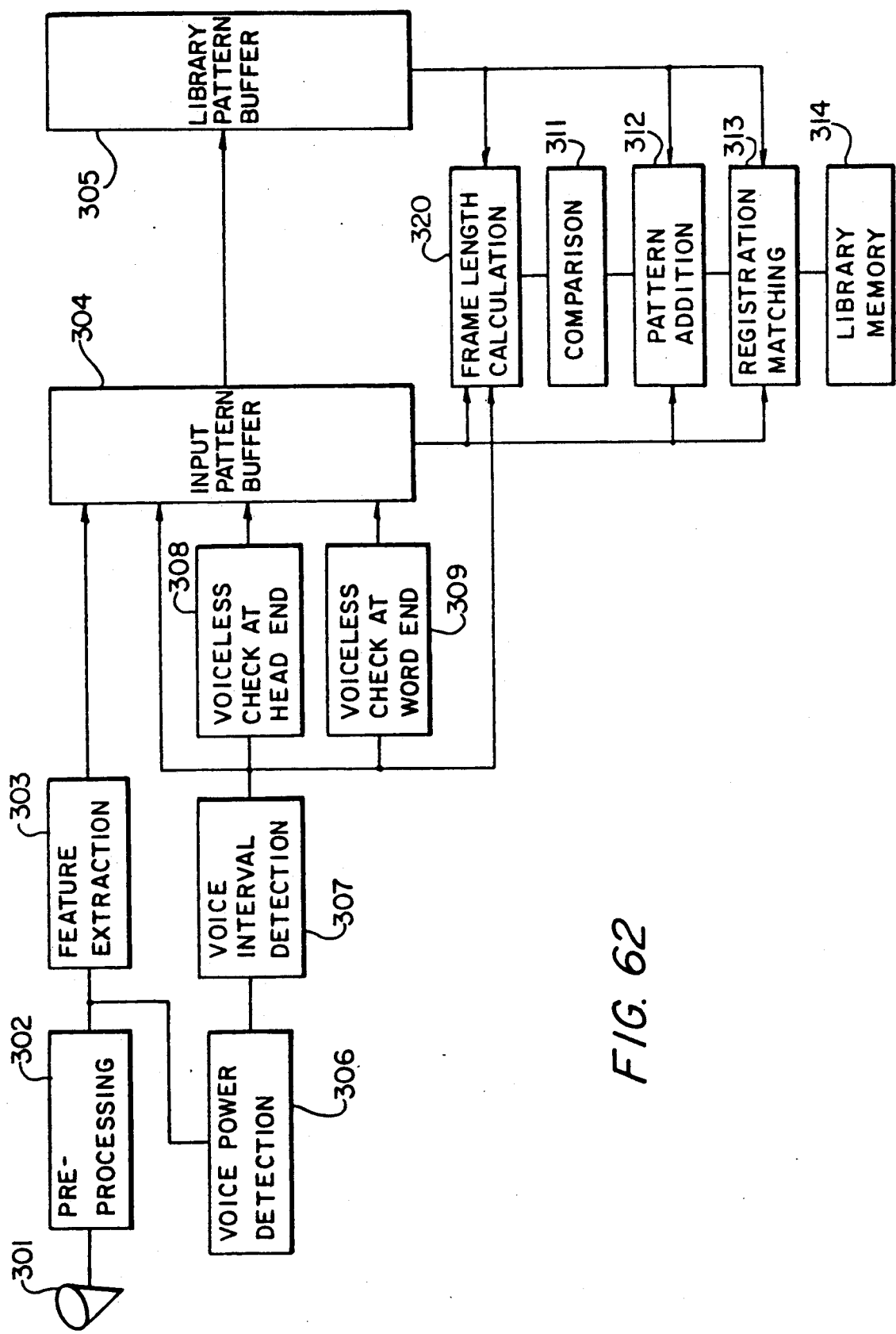
FIG. 62 is a schematic illustration showing mostly in block form a voice recognition system constructed in accordance with a still further aspect of the present invention.
Figure 63B:
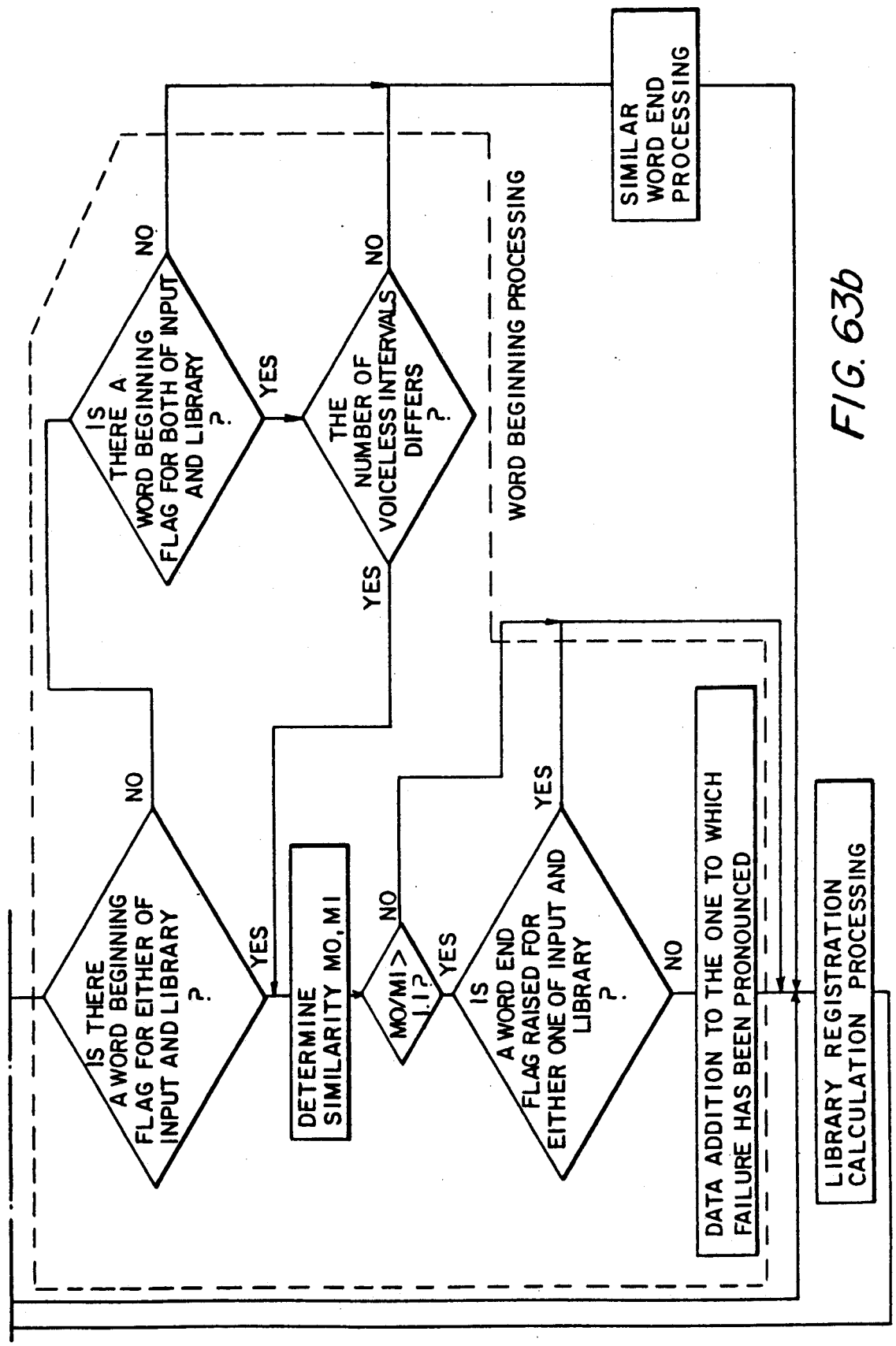
FIG. 63 illustrates the relationship of FIGS. 63a and 63b, which comprise a a flow chart which is useful for explaining the operation of the system shown in FIG. 62.

A still further aspect of the present invention will now be described below. This aspect of the present invention is very closely related to the other aspect of the present invention described immediately above. FIG. 62 schematically shows mostly in block form a voice recognition system constructed in accordance with a still further embodiment of this aspect of the present invention, and the present embodiment shown in FIG. 62 is similar in many respect to the embodiment shown in FIG. 52 so that like elements are indicated by like numerals. FIG. 63 shows a flow chart which is useful for understanding the operation of the system shown in FIG. 62. As shown, the present voice recognition system includes a microphone 301, a pre-processing unit 302, a feature extracting unit 303, an input pattern buffer 304, a library pattern buffer 305, a voice power measuring unit 306, a voice interval detecting unit 307, a head end voiceless interval checking unit 308, a tail end voiceless interval checking unit 309, a frame length arithmetic unit 320, a comparator 311, a pattern adding unit 312, a registration matching unit 313 and a library memory 314.

The basic operation of the above-described structure is very similar to the one described previously with reference to FIG. 52, so that reference should be made to the previous description with reference to FIG. 52.

In structure, the present embodiment shown in FIG. 62 differs from the embodiment shown in FIG. 52 by the provision of the frame length arithmetic or calculation unit 320.

In accordance with the present embodiment, as shown in FIG. 64, if a voiceless interval is present within a predetermined length from the front end in one of the two patterns to be compared as shown in FIG. 64a and no such voiceless interval is present in the other pattern as shown in FIG. 64b, the head portion of the pattern of FIG. 64a having a voiceless interval is added to the front end of the pattern of FIG. 64b having no voiceless interval only when the absolute value of the difference between the overall frame length x+nf of the pattern of FIG. 64b with the addition of the head portion of the patter of FIG. 64a and the frame length xf of the pattern of FIG. 64a is smaller than the absolute value of the difference between the original frame length nf of the pattern of FIG. 64 and the frame length of the pattern of FIG. 64a. This condition may be rephrased in the followed manner.

$$K_1 \times \text{absolute value of } (nf-xf) \text{ being larger than } k_2 \times \text{absolute value of } (x+nf-xf). \quad (1)$$

Here, $K_1$ and $K_2$ are constants which define the margins of differences and these are preferably set to satisfy the condition of $K_1/K_2 \approx 1.1$.

FIGS. 64 illustrates the case in which no addition of pattern component is carried out, i.e., $K_1 \times$ absolute value of (xf−nf) being smaller than $K_2 \times$ absolute value of (x+nf−xf), and FIG. 65 illustrates the case in which addition of pattern component should be carried out, i.e., $K_1 \times$ absolute value of (xf−nf) being larger than $K_2 \times$ absolute value of (x+nf−xf). In this manner, a portion of the pattern is added to the other pattern only when the difference in length between the two patterns is smaller with addition than without addition. With this technique, there can be obtained a reference pattern of high quality at all times.

Figures 66A, 66B:
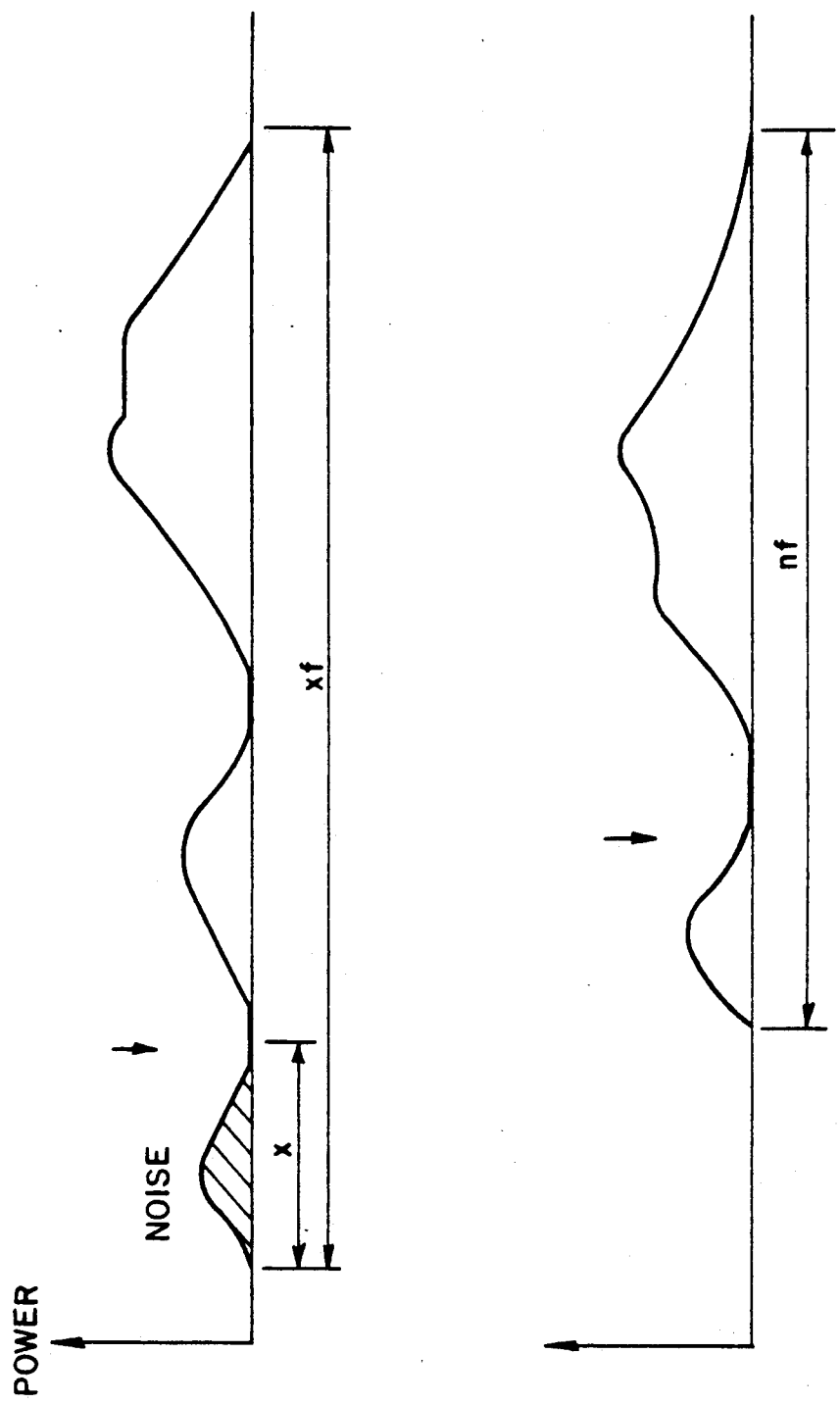

In the case shown in FIG. 66, both of the patterns have a voiceless interval within a predetermined length from the head end and the number of voiceless intervals differ between the two patterns. It is also apparent that the above-described relation will be satisfied for these two patterns shown in FIGS. 66a and 66b. Thus, in accordance with this aspect of the present invention, the head portion of the pattern of FIG. 66a is added to the head end of the pattern of FIG. 66b, and, then, averaging between the patterns is carried out. It should be noted that, although it has been described regarding the head end of a pattern, this aspect of the present invention is equally applicable to the tail end of a pattern. In addition, the arguments described with reference to FIGS. 57 and 58 in the previous embodiment hold also true for the present embodiment.

A still further aspect of the present invention relating to preliminary pattern matching will now be described. As the advancement of the voice recognition technology, a voice recognition system capable of recognizing approximately 1,000 words is now feasible. The basic scheme used in voice recognition is almost always pattern matching. As the number of words which can be recognized by a voice recognition system increases, the number of reference voice patterns to be registered for matching with an input, unknown voice pattern increases, which then requires a larger memory capacity. In addition, the time required for carrying out pattern matching is also increased because the degree of similarity between the input, unknown pattern and each of the reference patterns must be calculated. In order to cope with this problem, it has been proposed to adopt a preliminary selection scheme which limits the reference patterns to a smaller number of candidates by using certain features, and, then, pattern matching is carried out between the input pattern and each of the selected candidates which are fewer in number. Typically, the number of voiceless intervals present in each pattern or the duration of such a voiceless interval can be used as a feature for carrying out such a preliminary selection scheme.

Figure 71:
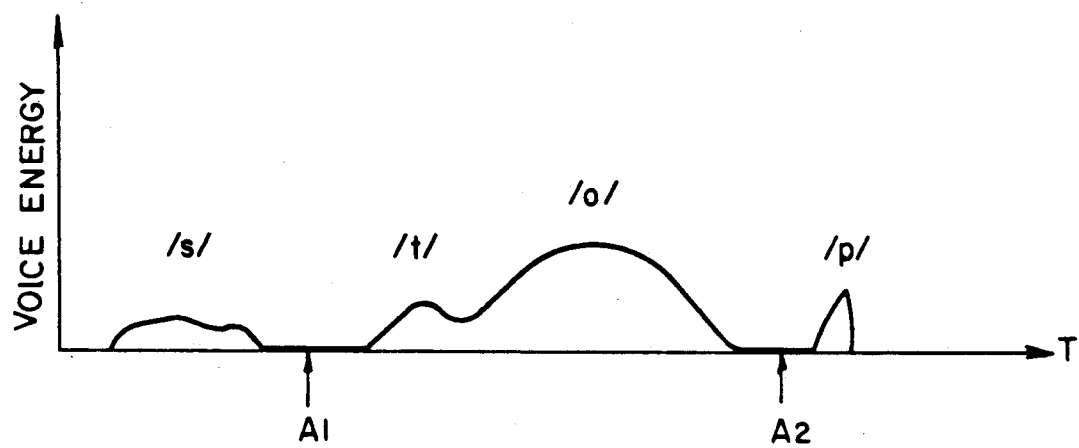
FIGS. 71 and 72 illustrations which are useful for explaining the operation of the structure shown in FIGS. 69 and 70.
Figure 72:
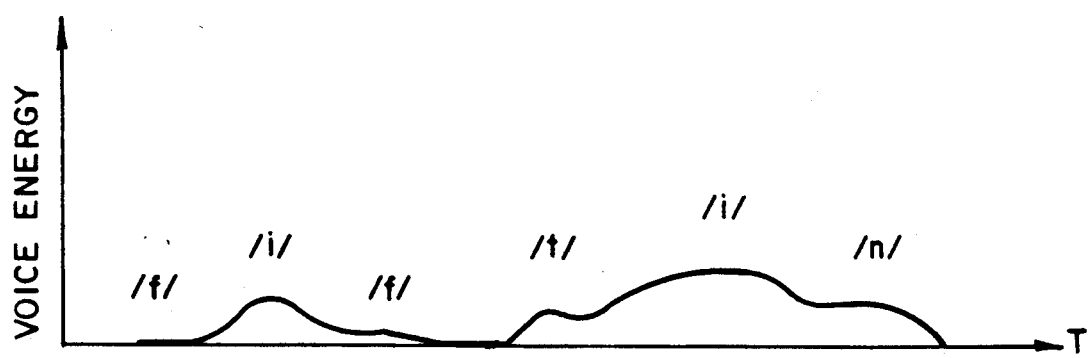

However, in the case of such a word as "stop" shown in FIG. 71, a consonant exists by itself at the head end or tail end of a voice, so that it is often the case that that portion of the voice after the voiceless interval $A_2$ at the tail end is lost and not detected. Therefore, the performance of the preliminary selection scheme varies depending on whether or not the number of voiceless intervals or the duration of a voiceless interval is detected properly. This problem exists not only for such a word as "stop" which has an independently pronounced consonant, but also for such a work as "fifteen" which has a weakly pronounced sound, such as /f/ in "fifteen", at the head or tail end of the voice, as shown in FIG. 72.

Figure 67:
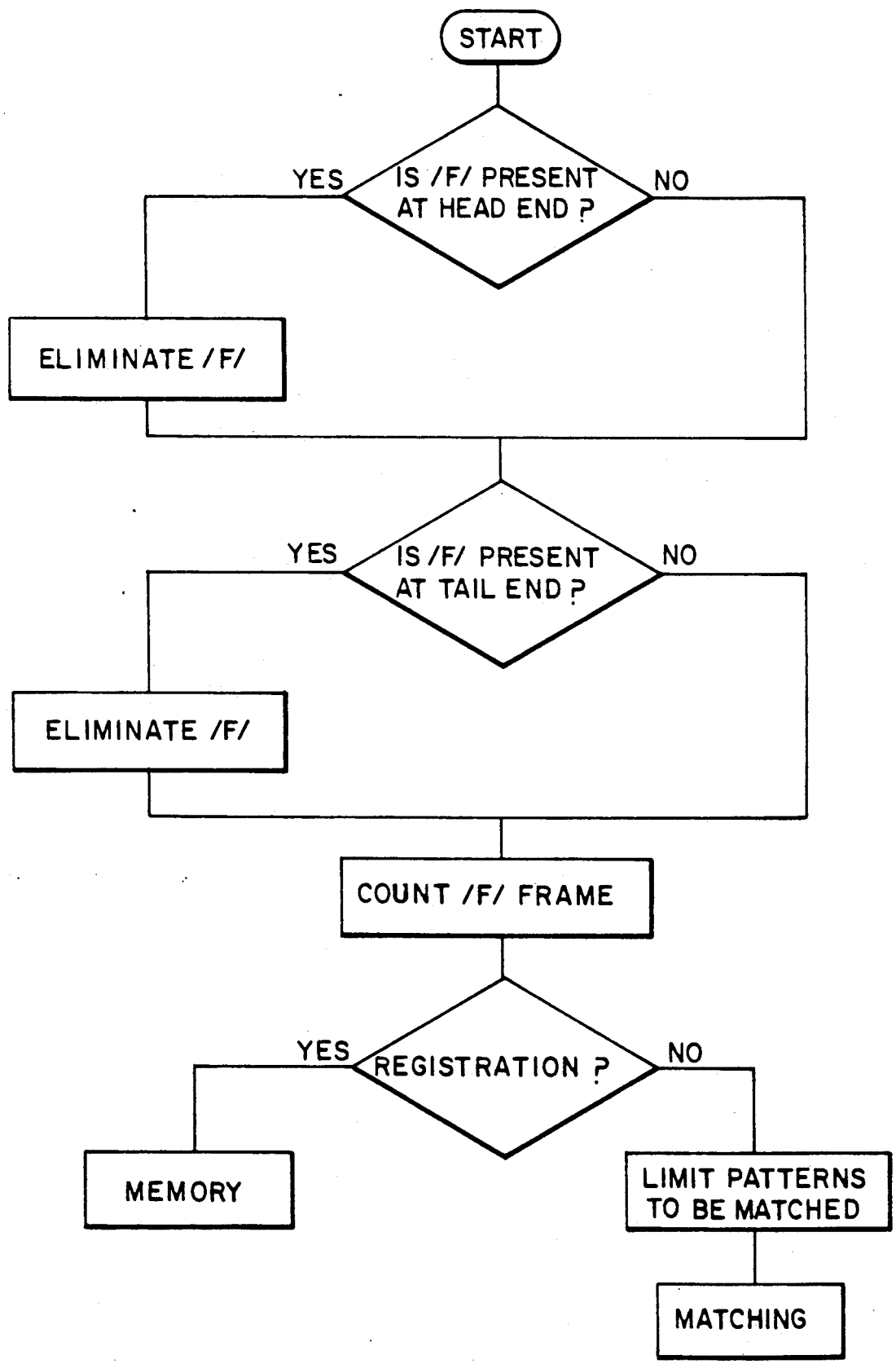
FIG. 67 is a flow chart showing a sequence of steps of a voice recognition method constructed in accordance with a still further embodiment of the present invention.
Figure 68:
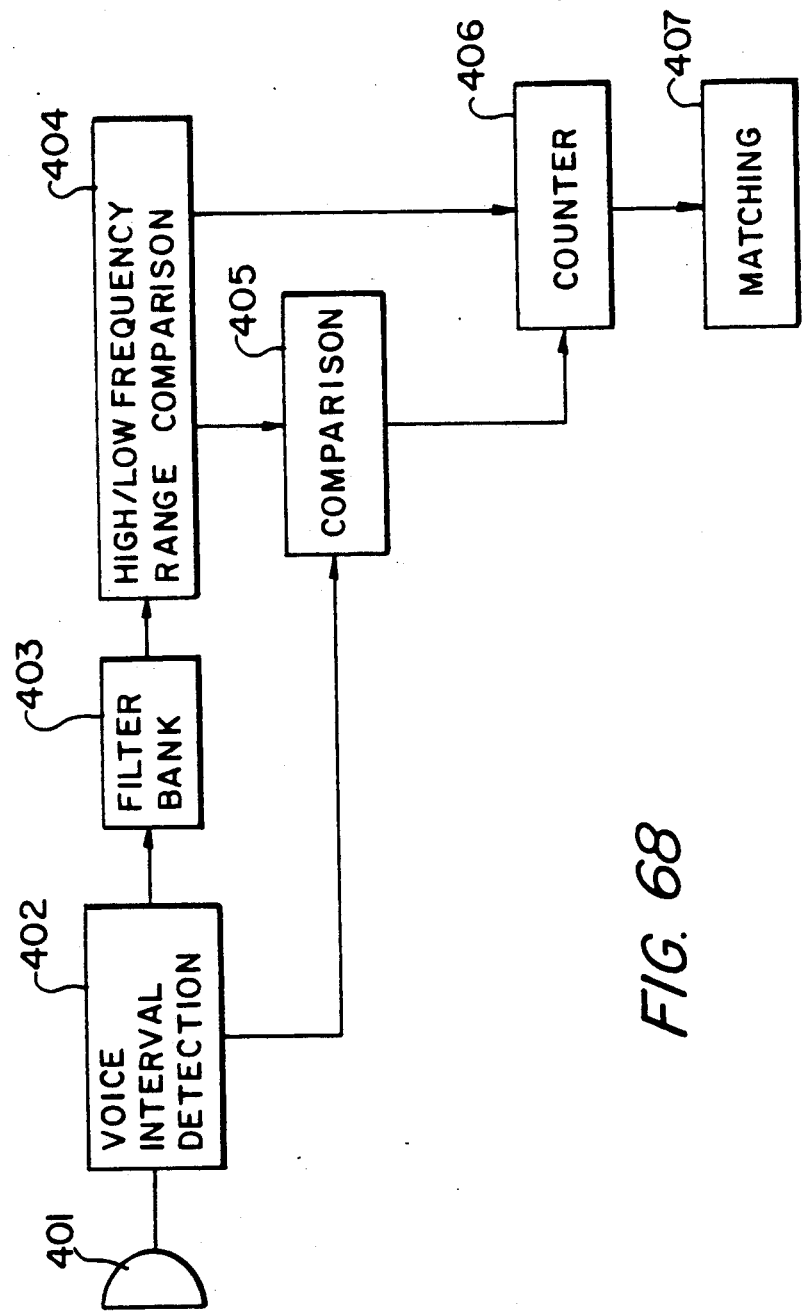
FIG. 68 is a schematic illustration showing mostly in block form a voice recognition system suitable to implement the method shown in FIG. 67.

This aspect of the present invention is particularly directed to solve such a problem as described above and has its object to provide a method and system for carrying out a preliminary selection of reference patterns accurately even if a voice interval has failed to be detected properly. FIG. 67 shows a flow chart showing a preliminary selection method suitable for use in voice recognition constructed in accordance with a still further embodiment of this aspect of the present invention, and FIG. 68 shows mostly in block form a preliminary selection system suitable for implementing the method shown in FIG. 67. As shown, the illustrated system includes a microphone 401, a voice interval detecting unit 402, a filter bank 403, a high/low frequency range comparator 404, a comparator 405, a counter 406 and a matching unit 407. With this structure, a first plurality of patterns are limited to a second plurality, which is smaller than the first plurality, of patterns by comparing the number of features possessed by the patterns and/or the duration of such a feature. If such a feature portion is present at the front or tail end of a pattern, this feature portion is removed from the pattern, and the number of feature portions and the duration of such a feature portion are determined to be used in the preliminary selection scheme.

As shown in FIG. 67, in the first place, it is checked to see whether or not sound /f/ is present at the head end of an input voice pattern, and, if there is, this /f/ sound is removed from the head end of the input pattern. Then, similarly, it is checked to see whether or not another /f/ sound is present at the tail end of the input pattern, and, if there is, this /f/ sound is removed from the tail end of the input pattern. Then, the number of /f/ sounds present in the remaining input pattern is counted. And, the thus counted number of /f/ sounds is stored together with an associated reference pattern in a library. In recognition mode, the number of /f/ sounds of an input pattern, which has been counted as described above, is compared with the stored number of /f/ sounds of each of the reference patterns to thereby preliminarily select possible candidates from the reference patterns stored in a library.

Described more in detail in this respect with reference to FIG. 68, a voice is input into the microphone 401 to produce a corresponding voice signal which is then supplied to the voice interval detecting unit 402 where voice information is extracted. Then, the voice signal is subjected to frequency analysis at the filter bank 403. In the illustrated embodiment, the filter bank 403 follows the voice interval detector 402 with respect to the direction of flow of a voice signal; however, the order of arrangement between these two elements can be switched, if desired. In addition, in the illustrated embodiment, as a feature quantity, use is made of the result of frequency analysis, i.e., power spectrum; however, use may also be made of any other desired quantity, such as LPC coefficients. In the illustrated embodiment, in order to detect sound /f/, it is checked whether or not the high frequency component is larger than the low frequency component. According to this method, not only sound /f/ but also other sounds, such as /s/, having the similar characteristic are all detected; however, this does not present any significant problem and all of these sounds can be handled as a unit.

As an alternative method of detecting sound /f/, a pattern of a sound similar to /f/ is registered and matching between this pattern and an input pattern may be carried out. The comparator 405 determines whether a sound, which may possibly be a /f/ sound, starts upon detection of a rising end of a voice by the voice interval detecting unit 402 or whether a sound, which may possibly be a /f/ sound, has continuously existed upon termination of a voice, and the length of such a sound and the number of such sounds are counted by the counter 406. In this case, it may be so structured to start the counter 406 upon detection of /f/ sound and to stop the counter 406 upon detection of a sound other than /f/ sound.

Figure 69:
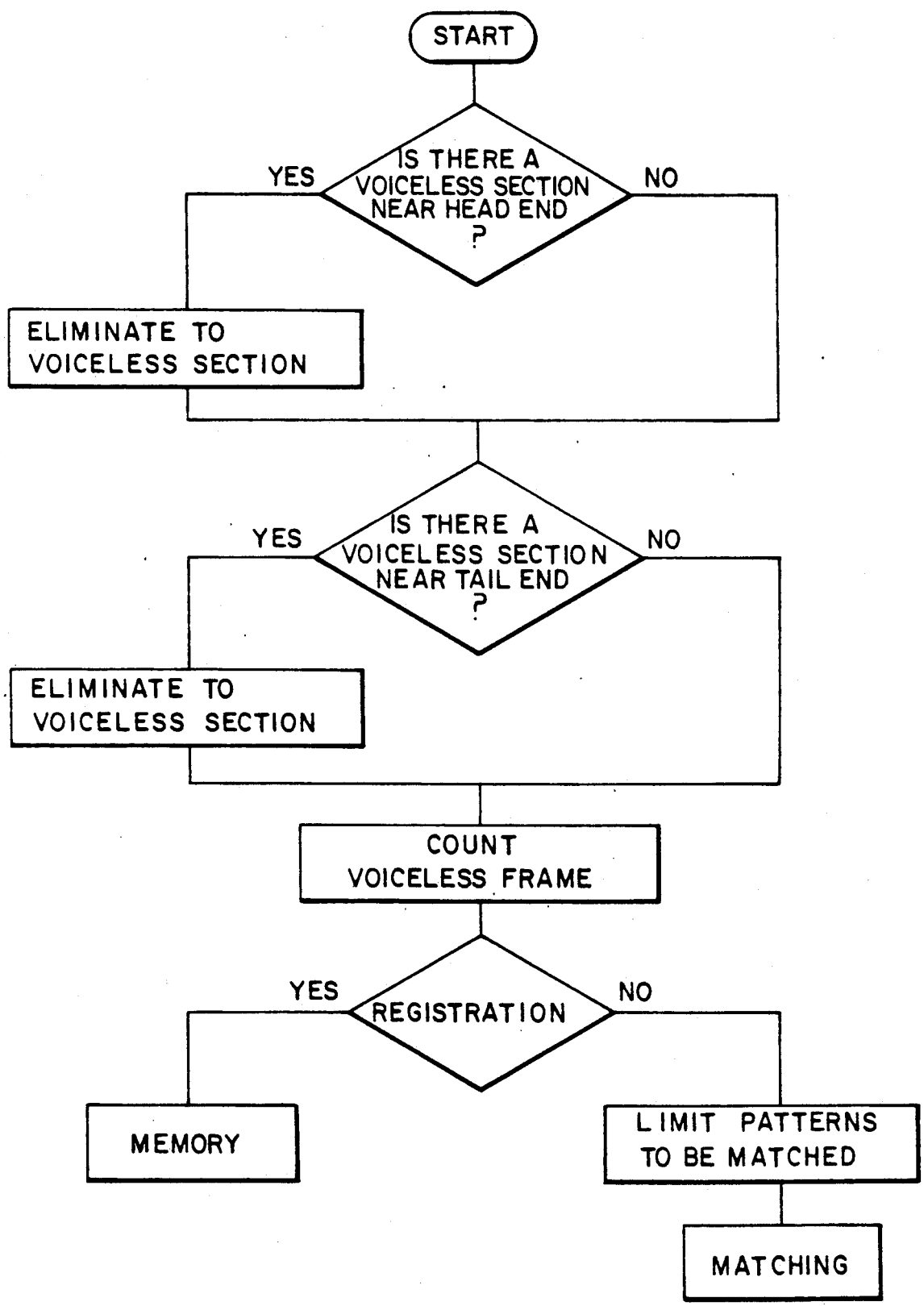
FIG. 69 is a flow chart showing a sequence of steps of a voice recognition method constructed in accordance with a still further embodiment of the present invention.
Figure 70:
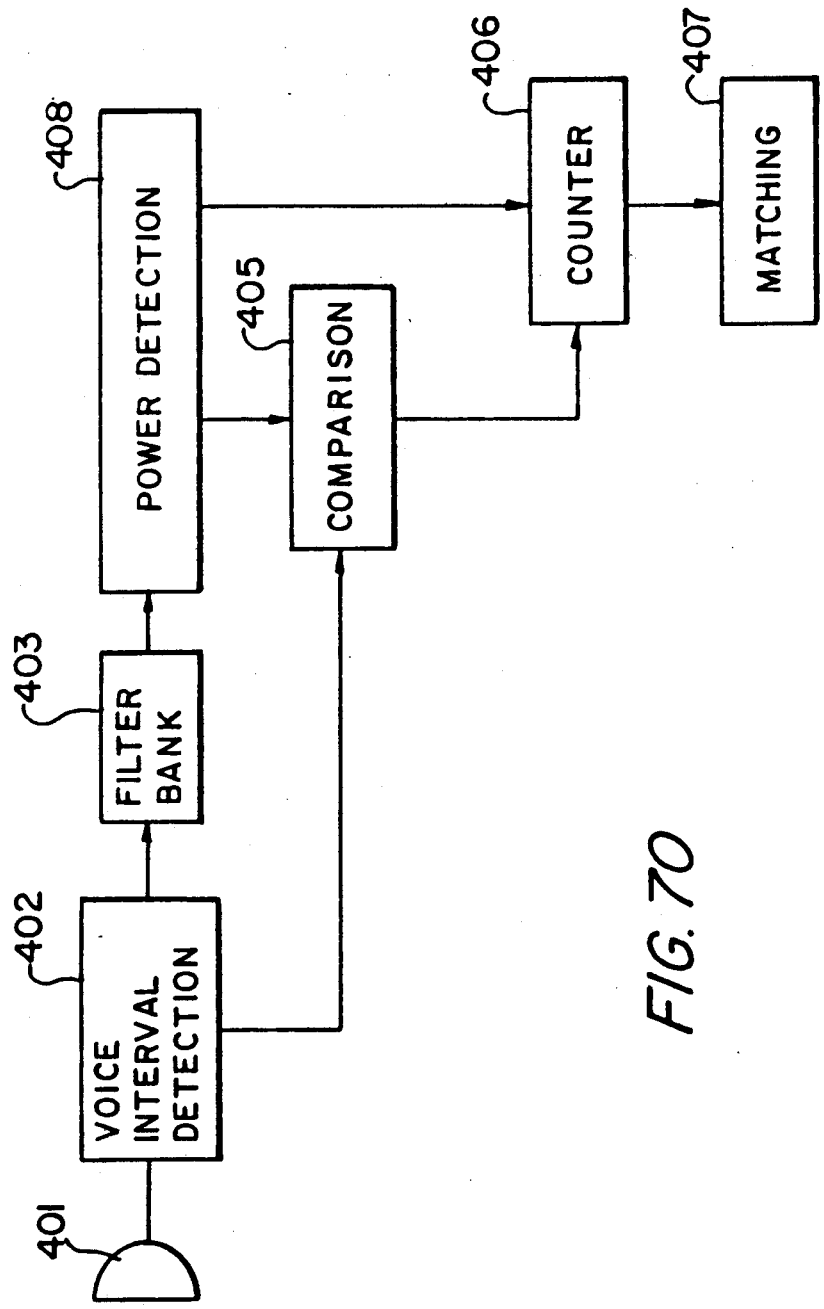
FIG. 70 is a schematic illustration showing mostly in block form a voice recognition system suitable to implement the method shown in FIG. 69.

FIG. 69 shows a flow chart of a preliminary selection method particularly suitable for use in voice recognition and constructed in accordance with a still further embodiment of the present invention. And, FIG. 70 schematically illustrates mostly in block form a preliminary selection system suitable for implementing the method shown in FIG. 69. In this embodiment, if a predetermined feature portion is present in the vicinity of the front or tail end of a pattern, this feature portion is removed from the pattern, and the number of other feature portions or the duration of such a feature portion in the remaining portion of the pattern is determined. Then, using the thus obtained information, preliminary selection is carried out to limit the number of reference patterns to be used for pattern matching. Since the embodiment shown in FIG. 70 is similar in many respect to the embodiment shown in FIG. 69, like numerals are used to indicate like elements. In the case of such a sound as /f/ sound, ti is often located near the front or tail end of a voice, and, when a consonant is pronounced by itself, a voiceless interval exists before or after such a consonant. In the present embodiment, as shown in FIG. 70, instead of the high/low frequency range comparator 404 of the embodiment shown in FIG. 68, provision is made of a power detecting unit 408 which is used to determine the location of a voiceless interval. Thus, a voiceless interval is determined based on the magnitude of voice power. If such a voiceless interval is located within 0.1–0.2 seconds from the head or tail end of the voice, it is determined that the voice pattern has a structure as shown in FIG. 71. As a result, that portion is removed from the voice pattern, and it is checked to see how many voiceless intervals are present in the remaining portion of the voice pattern or how long the voiceless interval continues in the remaining portion of the voice pattern, and, then, such data is stored together with the associated voice pattern, In the recognition mode, an input pattern is similarly processed to determine its number of voiceless intervals and/or the duration of a voiceless interval, and these data are used to compare with the stored data of registered reference patterns to thereby limit the reference patterns to select possible candidates. And, then, each of these candidates is fully compared with the input pattern by pattern matching to select the one candidate having the highest degree of similarlity. In this manner, the identity of the input pattern or voice can be recognized.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for forming a reference voice pattern to be stored in a library for use in identifying an unknown input sound, the method comprising the steps of:
   (a) inputting a first sound pronounced for a particular letter combination by a speaker to form a first voice pattern, said first voice pattern represented by a sound energy level as a function of time;
   (b) examining said first voice pattern to determine whether or not an intermediate voiceless interval is present within a predetermined time period at least from either a beginning or terminating end of said first voice pattern;
   (c) inputting a second sound pronounced for the same particular letter combination by a speaker to form a second voice pattern, said second voice pattern represented by a sound energy level as a function of time;
   (d) examining said second voice pattern to determine whether or not an intermediate voiceless interval is present within said predetermined time period at least from either a beginning or terminating end of said second voice pattern; and
   (e) combining said first and second voice patterns to define said reference voice pattern:
   wherein, if
   (1) either of said first and second voice patterns has a voiced portion in said predetermined time period: and
   (2) the other of said first and second voice patterns does not have a corresponding voiced portion in said predetermined time period,
   the combining step includes adding the voiced portion to said other of said first and second voice patterns.

2. The method of claim 1, further the steps of:
performing steps (c) and (d) with third through n-th sounds and third through n-th voice patterns, $n \geq 3$, thereby achieving superposition of three or more voice patterns.

3. The method of claim 1, wherein said first and second sounds are pronounced by the same speaker.

4. The method of claim 1, wherein said particular letter combination defines a word.

5. The method of claim 1, wherein said examining steps comprise:
examining for an interval in which a sound energy level is equal to a predetermined threshold level.

6. The method of claim 1, wherein said adding step comprises:
multiplying said voiced portion by 2 when said first and second voice patterns are combined.

7. The method of claim 1, wherein said predetermined time period comprises a period of between approximately 100 and 200 milliseconds.

8. A method for comparing a first voice pattern with a second voice pattern, each of which voice patterns is represented by a voice energy level as a function of time, so as to determine a degree of similarity therebetween, the method comprising the steps of:
examining each of said first and second voice patterns to determine if only one of said first and second voice patterns has an intermediate voiceless interval within a predetermined time period at least from either a beginning or terminating end of the voice patterns;
deleting a voiced portion from one of said voice patterns if only one of the voice patterns has such an intermediate voiceless interval; and
comparing said first and second voice patterns after said deleting step to thereby determine the degree of similarity between the voice patterns.

9. The method of claim 8, wherein said examining step comprises:
examining (a) a reference voice pattern stored in a library and examining (b) a voice pattern produced form an unknown, input sound;
wherein either of (a) said reference voice pattern stored in said library or (b) said voice pattern produced from said unknown, input sound may be the first voice pattern, and
wherein the other of (a) said reference voice pattern stored in said library and (b) said voice pattern produced from said unknown, input sound is the second voice pattern.

10. The method of claim 8, wherein said examining step comprises:
examining for a time interval in which a sound energy level is equal to a predetermined level.

11. The method of claim 8, wherein:
said predetermined time period comprises a period of between approximately 100 and 200 milliseconds.

* * * * *